US009137107B2

(12) United States Patent
Koponen et al.

(10) Patent No.: US 9,137,107 B2
(45) Date of Patent: *Sep. 15, 2015

(54) PHYSICAL CONTROLLERS FOR CONVERTING UNIVERSAL FLOWS

(71) Applicant: Nicira, Inc., Palo Alto, CA (US)

(72) Inventors: Teemu Koponen, San Francisco, CA (US); Pankaj Thakkar, Santa Clara, CA (US); Natasha Gude, San Francisco, CA (US); W. Andrew Lambeth, San Mateo, CA (US); Amar Padmanabhan, Menlo Park, CA (US); Alan Shieh, Menlo Park, CA (US); Jeremy Stribling, San Francisco, CA (US); Alexander Yip, Menlo Park, CA (US); Ronghua Zhang, San Jose, CA (US); Martin Casado, Portola Valley, CA (US)

(73) Assignee: NICIRA, INC., Palo Alto, CA (US)

(*) Notice: Subject to any disclaimer, the term of this patent is extended or adjusted under 35 U.S.C. 154(b) by 223 days.

This patent is subject to a terminal disclaimer.

(21) Appl. No.: 13/660,999

(22) Filed: Oct. 25, 2012

(65) Prior Publication Data

US 2013/0117428 A1 May 9, 2013

Related U.S. Application Data

(63) Continuation-in-part of application No. 13/589,077, filed on Aug. 17, 2012, and a continuation-in-part of application No. 13/589,078, filed on Aug. 17, 2012.

(60) Provisional application No. 61/684,693, filed on Aug. 17, 2012, provisional application No. 61/647,516, (Continued)

(51) Int. Cl.
*G06F 15/173* (2006.01)
*H04L 12/24* (2006.01)

(52) U.S. Cl.
CPC ........... *H04L 41/0813* (2013.01); *H04L 41/00* (2013.01); *H04L 41/042* (2013.01)

(58) Field of Classification Search
CPC .......................... H04L 41/0813; H04L 41/04
USPC ........................................................ 709/223
See application file for complete search history.

(56) References Cited

U.S. PATENT DOCUMENTS

| 5,504,921 | A | 4/1996 | Dev et al. |
| 5,550,816 | A | 8/1996 | Hardwick et al. |

(Continued)

FOREIGN PATENT DOCUMENTS

| AU | 2012328697 | 4/2014 |
| AU | 2012328699 | 4/2014 |

(Continued)

OTHER PUBLICATIONS

Wang et al., Analysis and Implementation of an Open Programmable Router based on Forwarding and Control Element Separation, Sep. 2008, Journal of Computer Science and Technology, pp. 769-779.*

(Continued)

*Primary Examiner* — Hee Soo Kim
(74) *Attorney, Agent, or Firm* — Adeli LLP

(57) ABSTRACT

Some embodiments provide a network control system for generating physical control plane data for managing first and second managed forwarding elements that implement forwarding operations associated with a first logical datapath set. The system includes a first controller instance for converting logical control plane data for the first logical datapath set to universal physical control plane (UPCP) data. The system includes a second controller instance for converting UPCP data to customized physical control plane (CPCP) data for the first managed forwarding element but not the second managed forwarding element. Each controller instance includes a network information base (NIB) storage for storing data and exchanging data with the other controller instance.

29 Claims, 44 Drawing Sheets

Related U.S. Application Data filed on May 16, 2012, provisional application No. 61/635,226, filed on Apr. 18, 2012, provisional application No. 61/635,056, filed on Apr. 18, 2012, provisional application No. 61/610,135, filed on Mar. 13, 2012, provisional application No. 61/599,941, filed on Feb. 17, 2012, provisional application No. 61/595,027, filed on Feb. 4, 2012, provisional application No. 61/577,085, filed on Dec. 18, 2011, provisional application No. 61/551,427, filed on Oct. 25, 2011, provisional application No. 61/551,425, filed on Oct. 25, 2011.

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 6,055,243 A | 4/2000 | Vincent et al. |
| 6,104,699 A | 8/2000 | Holender et al. |
| 6,366,582 B1 | 4/2002 | Nishikado et al. |
| 6,366,657 B1 | 4/2002 | Yagel et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,894,983 B1 | 5/2005 | Lederman et al. |
| 6,941,487 B1 | 9/2005 | Balakrishnan et al. |
| 6,963,585 B1 | 11/2005 | Le Pennec et al. |
| 7,042,912 B2 | 5/2006 | Ashwood Smith et al. |
| 7,046,630 B2 | 5/2006 | Abe et al. |
| 7,096,228 B2 | 8/2006 | Theimer et al. |
| 7,120,728 B2 | 10/2006 | Krakirian et al. |
| 7,197,572 B2 | 3/2007 | Matters et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,342,916 B2 | 3/2008 | Das et al. |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,578,003 B2 | 11/2013 | Brandwine et al. |
| 8,612,627 B1 | 12/2013 | Brandwine |
| 8,621,058 B2 | 12/2013 | Eswaran et al. |
| 8,644,188 B1 | 2/2014 | Brandwine et al. |
| 8,705,513 B2 | 4/2014 | Van Der Merwe et al. |
| 8,762,501 B2 | 6/2014 | Kempf et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0069972 A1 | 4/2003 | Yoshimura et al. |
| 2003/0204768 A1 | 10/2003 | Fee |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0083953 A1 | 4/2005 | May |
| 2005/0132044 A1 | 6/2005 | Guingo et al. |
| 2006/0026225 A1 | 2/2006 | Canali et al. |
| 2006/0028999 A1 | 2/2006 | Iakobashvili et al. |
| 2006/0092976 A1* | 5/2006 | Lakshman et al. ............ 370/469 |
| 2006/0182033 A1 | 8/2006 | Chen et al. |
| 2006/0182037 A1 | 8/2006 | Chen et al. |
| 2006/0193266 A1 | 8/2006 | Siddha et al. |
| 2006/0221961 A1 | 10/2006 | Basso et al. |
| 2007/0220358 A1 | 9/2007 | Goodill et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0071900 A1 | 3/2008 | Hecker et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0113031 A1 | 4/2009 | Ruan et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1* | 11/2009 | Lambeth et al. ................ 711/6 |
| 2009/0300210 A1 | 12/2009 | Ferris |
| 2009/0303880 A1 | 12/2009 | Maltz et al. |
| 2010/0046530 A1 | 2/2010 | Hautakorpi et al. |
| 2010/0046531 A1 | 2/2010 | Louati et al. |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0165877 A1 | 7/2010 | Shukla et al. |
| 2010/0169467 A1 | 7/2010 | Shukla et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |

(56) References Cited

U.S. PATENT DOCUMENTS

| | | |
|---|---|---|
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0261825 A1 | 10/2011 | Ichino |
| 2011/0296052 A1 | 12/2011 | Guo et al. |
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0147894 A1 | 6/2012 | Mulligan et al. |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0058346 A1 | 3/2013 | Sridharan et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0117429 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |
| 2013/0227097 A1 | 8/2013 | Yasuda et al. |
| 2013/0332602 A1 | 12/2013 | Nakil et al. |
| 2013/0332619 A1 | 12/2013 | Xie et al. |
| 2014/0016501 A1 | 1/2014 | Kamath et al. |

FOREIGN PATENT DOCUMENTS

| | | |
|---|---|---|
| CA | 2849930 | 5/2013 |
| EP | 0737921 | 10/1996 |
| EP | 1653688 | 5/2006 |
| EP | 2748977 | 7/2014 |
| EP | 2748990 | 7/2014 |
| JP | 2003-069609 | 3/2003 |
| JP | 2003-124976 | 4/2003 |
| JP | 2003-318949 | 11/2003 |
| JP | 2006-229967 | 8/2006 |
| WO | WO 2005/112390 | 11/2005 |
| WO | WO 2008/095010 | 8/2008 |
| WO | WO 2012/093429 | 7/2012 |
| WO | WO 2013/184846 | 12/2013 |

OTHER PUBLICATIONS

Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.

Foster, Nate, et al., "Frenetic: A Network Programming Language," ICFP '11, Sep. 19-21, 2011, 13 pages, Tokyo, Japan.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.

Loo, Boon Thau, et al., "Declarative Routing: Extensible Routing with Declarative Queries," In Proc. of SIGCOMM, Aug. 21-26, 2005, 14 pages, Philadelphia, PA, USA.

Loo, Boon Thau, et al., "Implementing Declarative Overlays," In Proc. of SOSP, Oct. 2005, 16 pages, Brighton, UK.

Shenker, Scott, et al., "The Future of Networking, and the Past of Protocols," Dec. 2, 2011, pp. 1-30, USA.

Portions of Prosecution History of U.S. Appl. No. 13/589,077, Jul. 21, 2014, Koponen, Teemu, et al.

Portions of Prosecution History of U.S. Appl. No. 13/661,010, Aug. 12, 2014, Koponen, Teemu, et al.

International Preliminary Report on Patentability and Written Opinion for PCT/US2012/062004, May 8, 2014, Nicira, Inc.

International Preliminary Report on Patentability and Written Opinion for PCT/US2012/062005, May 8, 2014, Nicira, Inc.

International Preliminary Report on Patentability and Written Opinion for PCT/US2012/062007, May 8, 2014, Nicira, Inc.

Wang, Wei-Ming, et al., "Analysis and Implementatiopn of an Open Programmable Router Based of Forwarding and Control Element Separation," Journal of Computer Science and Technology, Sep. 2008, pp. 769-779, vol. 23, No. 5.

Das, Suarav, et al., "Unifying Packet and Circuit Switched Networks with OpenFlow," Dec. 7, 2009, 10 pages.

Das, Suarav, et al. "Simple Unified Control for Packet and Circuit Networks," Month Unknown, 2009, pp. 147-148, IEEE.

WO 2013/063329 with International Search Report, May 2, 2013, Nicira, Inc.

WO 2013/063330 with International Search Report, May 2, 2013, Nicira, Inc.

WO 2013/063332 with International Search Report, May 2, 2013, Nicira, Inc.

Adya, Atul, et al., "Cooperative Task Management without Manual Stack Management," Jun. 2002, 14 pages, Proceedings of the USENIX Annual Technical Conference, Monterey, CA, USA.

Andersen, David, et al., "Resilient Overlay Networks," Oct. 2001, 15 pages, 18th ACM Symp. On Operating Systems Principles (Sosp), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building a Fast, Virtualized Data Plane with Programmable Hardware," Aug. 17, 2009, pp. 1-8, VISA'09, Barcelona, Spain, ACM.

Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/enUS/Products/ps9902/index.html.

Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown, "HP OpenView Enterprise Management Starter Solution," Jun. 2006, p. 1-4, Hewlett-Packard Development Company, HP.

Author Unknown, "HP OpenView Operations 8.0 for UNIX Developer's Toolkit," Month Unlknown, 2004, pp. 1-4, Hewlett-Packard Development Company, HP.

Author Unknown , "HP Web Jetadmin Integration into HP OpenView Network Node Manager," Feb. 2004, pp. 1-12, HP.

Author Unknown , "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown , "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.

(56) References Cited

OTHER PUBLICATIONS

Author Unknown, "Open vSwitch, An Open Virtual Switch," Date Unknown but prior to Dec. 30, 2010, 2 pages, http://www.openvswitch.org, Open vSwitch.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol Ox01), Dec. 31, 2009, pp. 1-42, Open Networking Foundation.
Author Unknown, "Single Root I/O Virtualization and Sharing Specification, Revision 1.0," Sep. 11, 2007, pp. 1-84, PCI-SIG.
Author Unknown, "Virtual Machine Device Queues," White Paper, Month Unknown, 2007, pp. 1-4, Intel Corporation.
Author Unknown, "VMare for Linux Networking Support," Date Unknown but prior to Nov. 17, 1999, pp. 1-5, VMWare, Inc.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation, Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Cooper, Brian F., et al., "PNUTS: Yahoo!'s Hosted Data Serving Platform," VLDB'08, Aug. 24-30, 2008, pp. 1-12, ACM, Auckland, New Zealand.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, a., "A Path Computation Element (PCS) —Based Architecture," Aug. 2006, pp. 1-41, RFC 4655.
Fischer, Anna, "[PATCH][RFC] net/bridge: add basic VEPA support," Jun. 2009, pp. 1- 5, GMANE Org.

Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hamilton, James, et al., "Datacenter Networks Are in My Way," Principals of Amazon Series, Oct. 28, 2010, pp. 1-14.
Hinrichs, Timothy L., et al., "Practical Declarative Network Management," WREN'09, Aug. 21, 2009, pp. 1-10, Barcelona, Spain.
Hunt, Patrick, et al., "ZooKeeper: Wait-free Coordination for Internet-Scale Systems," Proc. Of Usenix Annual Technical Conference, Month Unknown, 2010, pp. 1-14.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. On Computer Systems, Aug. 2000, 34 pages, vol. 18, No. 3.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr., 2008, pp. 69-74, vol. 38, No. 2.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. Of SIGCOMM, Aug. 17-21, 2009, pp. 1-12.
Pelissier, Joe, "Network Interface Virtualization Review," Jan. 2009, pp. 1-38.
Pelissier, Joe, "VNTag 101," May, 2008, pp. 1-87.
Pettit, Justin, et al., "Virtual Switching in an Era of Advanced Edges," Sep. 2010, 7 pages.
Pfaff, Ben., et al., "Extending Networking into the Virtualization Layer," Proc. Of HotNets, Oct., 2009, pp. 1-6.
Rosen, E., et al., "Applicability Statement for BGP/MPLS IP Virtual Private Networks (VPNs)," The Internet Society, RFC 4365, Feb. 2006, pp. 1-32.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.

(56) References Cited

OTHER PUBLICATIONS

Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," Proc. HotNets, Month Unknown, 2009, 6 pages.
Touch, J., et al., "Transparent Interconnection of Lots of Links (TRILL): Problem and Applicability Statement," May 2009, pp. 1-17, IETF Trust, RFC 5556.
Turner, Jonathan S., "A Proposed Architecture for the GENI Backbone Platform," ANCS'06, Dec. 3-5, 2006, 10 pages, ACM, San Jose, California, USA.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Yang, L., et al., "Forwarding and Control Element Separation (ForCES) Framework," Apr. 2004, pp. 1-40, The Internet Society.
Yu, Minlan, et al., "Scalable Flow-Based Networking with DIFANE," in Proc. SIGCOMM Aug. 2010, 16 pages.
Updated portions of prosecution history of U.S. Appl. No. 13/589,077, Jan. 20, 2015, Koponen, Teemu, et al.
Portions of prosecution history of U.S. Appl. No. 13/589,078, Jan. 23, 2015, Koponen, Teemu, et al.
Portions of prosecution history of U.S. Appl. No. 13/756,501, Mar. 17, 2015, Koponen, Teemu, et al.
Portions of prosecution history of U.S. Appl. No. 13/756,500, Mar. 27, 2015, Koponen, Teemu, et al.
Portions of prosecution history of U.S. Appl. No. 13/756,487, Mar. 18, 2015, Koponen, Teemu, et al.
Portions of prosecution history of commonly owned U.S. Appl. No. 13/661,002, Mar. 13, 2015, Koponen, Teemu, et al.
Updated portions of prosecution history of commonly owned U.S. Appl. No. 13/661,010, Feb. 23, 2015, Koponen, Teemu, et al.
Portions of prosecution history of AU2012328697, Mar. 2, 2015 (mailing date), Nicira, Inc.
Portions of prosecution history of EP12843934.6, Oct. 6, 2015 (mailing date), Nicira, Inc.
Portions of prosecution history of AU2012328699, Mar. 25, 2014 (mailing date), Nicira, Inc.
Raganai, Chaparadza, et al., "An Architectural Reference Model for Autonomic Networking Cognitive Networking and Self-Management," Mar. 2012, 179 pages, The European Telecommunications Standards Institute, Sophia-Antipolis, France.
Portions of prosecution history of EP12844417.1, Oct. 7, 2014 (mailing date), Nicira, Inc.

\* cited by examiner

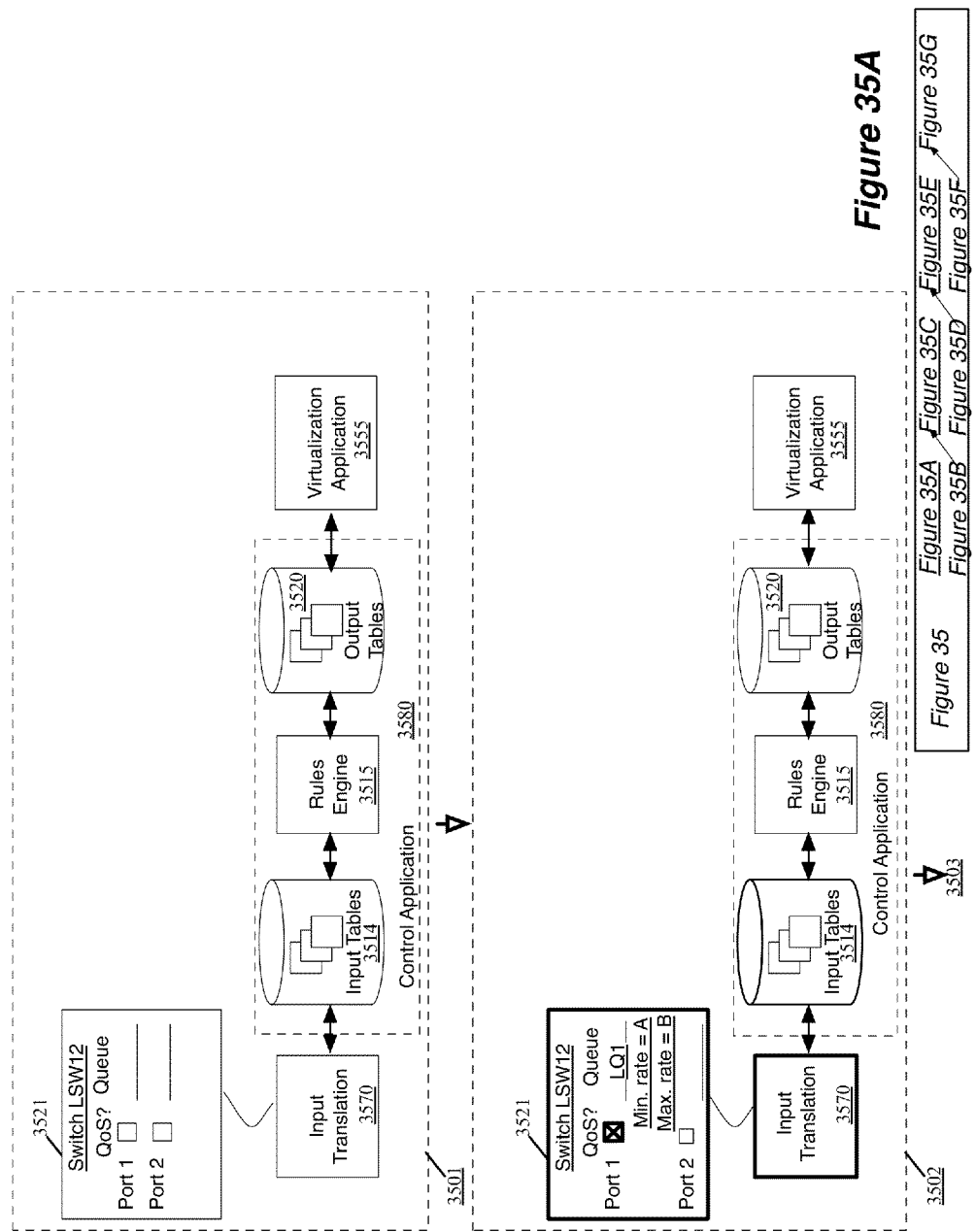

PHYSICAL CONTROLLERS FOR CONVERTING UNIVERSAL FLOWS

CLAIM OF BENEFIT TO PRIOR APPLICATIONS

This application is a continuation-in-part application of U.S. patent application Ser. No. 13/589,077, filed on Aug. 17, 2012; and U.S. patent application Ser. No. 13/589,078, filed on Aug. 17, 2012. U.S. patent application Ser. No. 13/589,077 and U.S. patent application Ser. No. 13/589,078 claim the benefit of U.S. Provisional Application 61/551,425, filed Oct. 25, 2011; U.S. Provisional Application 61/551,427, filed Oct. 25, 2011; U.S. Provisional Application 61/577,085, filed Dec. 18, 2011; U.S. Provisional Application 61/595,027, filed Feb. 4, 2012; U.S. Provisional Application 61/599,941, filed Feb. 17, 2012; U.S. Provisional Application 61/610,135, filed Mar. 13, 2012; U.S. Provisional Application 61/635,056, filed Apr. 18, 2012; U.S. Provisional Application 61/635,226, filed Apr. 18, 2012; and U.S. Provisional Application 61/647,516, filed May 16, 2012. This application claims the benefit of U.S. Provisional Application 61/551,425, filed Oct. 25, 2011; U.S. Provisional Application 61/551,427, filed Oct. 25, 2011; U.S. Provisional Application 61/577,085, filed Dec. 18, 2011; U.S. Provisional Application 61/595,027, filed Feb. 4, 2012; U.S. Provisional Application 61/599,941, filed Feb. 17, 2012; U.S. Provisional Application 61/610,135, filed Mar. 13, 2012; U.S. Provisional Application 61/635,056, filed Apr. 18, 2012; U.S. Provisional Application 61/635,226, filed Apr. 18, 2012; U.S. Provisional Application 61/647,516, filed May 16, 2012; and U.S. Provisional Application 61/684,693, filed Aug. 17, 2012. U.S. Provisional Applications 61/551,425, 61/551,427, 61/577,085, 61/595,027, 61/599,941, 61/610,135, 61/635,056, 61/635,226, 61/647,516, and 61/684,693 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within a layer 2 (L2) domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments of the invention provide a network control system that allows several different logical datapath (LDP) sets to be specified for several different users through one or more shared forwarding elements without allowing the different users to control or even view each other's forwarding logic. These shared forwarding elements are referred to below as managed switching elements or managed forwarding elements as they are managed by the network control system in order to implement the LDP sets.

In some embodiments, the network control system includes one or more controllers (also called controller instances below) that allow the system to accept LDP sets from users and to configure the switching elements to implement these LDP sets. These controllers allow the system to virtualize control of the shared switching elements and the logical networks that are defined by the connections between these shared switching elements, in a manner that prevents the different users from viewing or controlling each other's LDP sets and logical networks while sharing the same switching elements.

In some embodiments, each controller instance is a device (e.g., a general-purpose computer) that executes one or more modules that transform the user input from a logical control plane (LCP) data to a logical forwarding plane (LFP) data, and then transform the LFP data to physical control plane data. These modules in some embodiments include a control module and a virtualization module. A control module allows a user to specify and populate a logical datapath set (LDPS), while a virtualization module implements the specified LDPS by mapping the LDPS onto the physical switching infrastructure. In some embodiments, the control and virtualization modules are two separate applications, while in other embodiments they are part of the same application.

In some of the embodiments, the control module of a controller receives from a user or another source LCP data (e.g., data that describes the connections associated with a logical switching element) that describes a LDPS. The control module then converts this data to LFP data that is then supplied to the virtualization module. The virtualization module then generates the physical control plane data from the LFP data. The physical control plane data is propagated to the managed switching elements. In some embodiments, the control and virtualization modules use an nLog engine to generate LFP data from LCP data and physical control plane data from the LFP data.

The network control system of some embodiments uses different controllers to perform different tasks. For instance, in some embodiments, the network control system uses three types of controllers. The first controller type is an application protocol interface (API) controller. API controllers are responsible for receiving configuration data and user queries from a user through API calls and responding to the user queries. The API controllers also disseminate the received configuration data to the other controllers. As such, the API controllers of some embodiments serve as the interface between users and the network control system. In some embodiments, a second type of controller is a logical controller, which is responsible for implementing LDP sets by computing universal flow entries that are generic expressions of flow entries for the managed switching element that realize the LDP sets. A logical controller in some embodiments does not interact directly with the physical switching elements, but pushes the universal flow entries to a third type of controller, a physical controller.

Physical controllers in different embodiments have different responsibilities. In some embodiments, the physical controllers generate customized flow entries from the universal flow entries and push these customized flow entries down to the managed switching elements. In some such embodiments, several physical controllers generate customized flow entries for some managed switching elements, while directing other physical controllers to generate such flow entries for other managed switching elements. In yet other embodiments, physical controllers relay universal flows to the managed switching elements that the physical controllers are responsible for managing so that the managed switching elements customize the flow entries.

Depending on the size of the deployment managed by a controller cluster (i.e., several controllers), any number of each of the three types of controller may exist within the cluster. In some embodiments, a leader controller has the responsibility of partitioning the load over all the controllers and effectively assigning a list of LDP sets for each logical controller to manage and a list of physical switching elements for each physical controller to manage. In some embodiments, the API responsibilities are executed at each controller in the cluster. However, similar to the logical and physical responsibilities, some embodiments only run the API responsibilities on a subset of controllers. This subset, in some such embodiments, only performs API processing, which results in better isolation between the API operations and the rest of the system.

In some embodiments, one of the software tools that allows the system to virtualize control of a set of switching elements (i.e., to allow several users to share the same switching elements without viewing or controlling each other's LDP sets) is an intermediate data storage structure that (1) stores the state of the network, (2) receives and records modifications to different parts of the network from different users, and (3), in some embodiments, provides different views of the state of the network to different users. For instance, in some embodiments, the intermediate data storage structure is a network information base (NIB) data structure that stores the state of the network that is defined by one or more switching elements. The system uses this NIB data structure as an intermediate storage structure for reading the state of the network and writing modifications to the state of the network. In some embodiments, the NIB also stores the logical configuration and the logical state for each user-specified LDPS. In these embodiments, the information in the NIB that represents the state of the actual switching elements accounts for only a subset of the total information stored in the NIB.

In some embodiments, the system has (1) a network operating system (NOS) to create and maintain the NIB storage structure, and (2) one or more applications that run on top of the NOS to specify logic for reading values from and writing values to the NIB. When the NIB is modified in order to effectuate a change in the switching logic of a switching element, the NOS of some embodiments also propagates the modification to the switching element.

The system of different embodiments uses the NIB differently to virtualize access to the shared switching elements and network. In some embodiments, the system provides different views of the NIB to different users in order to ensure that different users do not have direct view and control over each other's switching logic. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serve as abstractions of the actual switching elements and their attributes. As further described below, some of these higher layer elements are used in some embodiments to show different abstract switching elements and/or switching element attributes to different users in a network control system.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 35A-35G conceptually illustrate an example of enabling QoS for a port of a logical switch.

DETAILED DESCRIPTION

Figure 1:
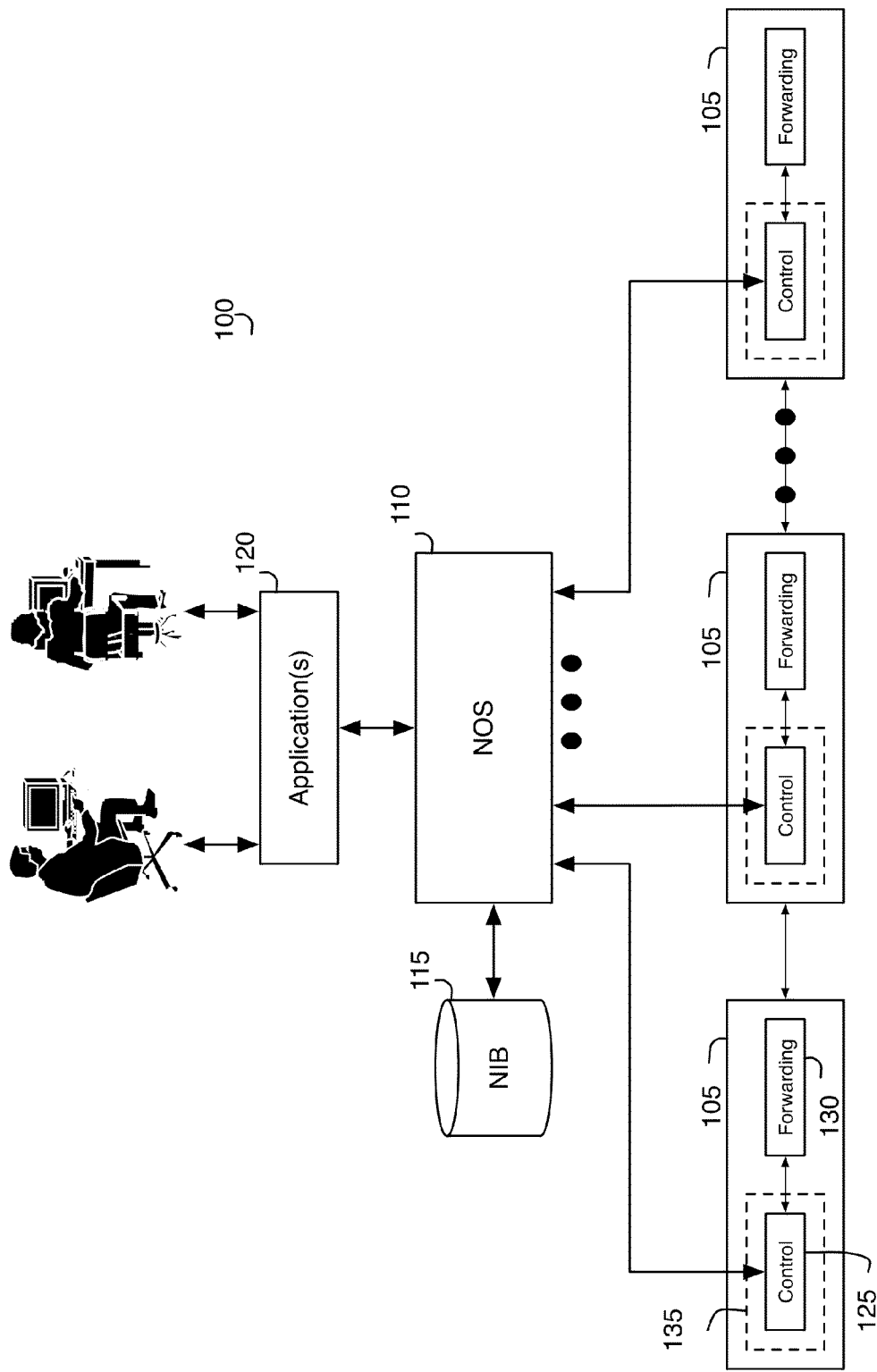
FIG. 1 illustrates a virtualized network system of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some of the embodiments described below are implemented in a novel network control system that is formed by one or more controllers (controller instances) for managing several managed switching elements. In some embodiments, the control application of a controller receives logical control plane (LCP) data (e.g., network control plane), and converts this data to logical forwarding plane (LFP) data that is then supplied to the virtualization application. The virtualization application then generates the physical control plane data from the LFP data. The physical control plane data is propagated to the managed switching elements.

In some embodiments, the controller instance uses a network information base (NIB) data structure to send the physical control plane data to the managed switching elements. A controller instance of some embodiments uses an nLog engine to generate LFP data from LCP data and physical control plane data from the LFP data. The controller instances of some embodiments communicate with each other to exchange the generated logical and physical data. In some embodiments, the NIB data structure may serve as a communication medium between different controller instances.

Several examples of such systems are described below in Section I. Section II then describes the software architecture of a NOS instance. Section III describes generation and customization of universal flows. Finally, Section IV describes the computer systems and processes used to implement some embodiments of the invention.

I. Network Control System Network Control System

Some embodiments of the invention provide a method that allows several different LDP sets to be specified for several different users through one or more shared switching elements without allowing the different users to control or even view each other's switching logic. In some embodiments, the method provides a set of software tools that allows the system to accept LDP sets from users and to configure the switching elements to implement these LDP sets. These software tools allow the method to virtualize control of the shared switching elements and the network that is defined by the connections between these shared switching elements, in a manner that prevents the different users from viewing or controlling each other's LDP sets while sharing the same switching elements.

In some embodiments, one of the software tools that the method provides that allows it to virtualize control of a set of switching elements (i.e., to enable the method to allow several users to share the same switching elements without viewing or controlling each other's LDP sets) is an intermediate data storage structure that (1) stores the state of the network, (2) receives modifications to different parts of the network from different users, and (3), in some embodiments, provide different views of the state of the network to different users. For instance, in some embodiments, the intermediate data storage structure is a network information base (NIB) data structure that stores the state of the network that is defined by one or more switching elements. In some embodiments, the NIB also stores the logical configuration and the logical state for each user specified LDPS. In these embodiments, the information in the NIB that represents the state of the actual switching elements accounts for only a subset of the total information stored in the NIB.

The method of some embodiments uses the NIB data structure to read the state of the network and to write modifications to the state of the network. When the data structure is modified in order to effectuate a change in the switching logic of a switching element, the method propagates the modification to the switching element.

In some embodiments, the method is employed by a virtualized network control system that (1) allows users to specify different LDP sets, (2) maps these LDP sets to a set of switching elements managed by the control system. In some embodiments, the network infrastructure switching elements includes virtual or physical network switches, software switches (e.g., Open vSwitch), routers (for L3 routing), and/or other switching devices, as well as any other network elements (such as load balancers, etc.) that establish connections between these switches, routers, and/or other switching devices. Such switching elements (e.g., physical switching elements, such as physical switches or routers) are implemented as software switches in some embodiments. Software switches are switches that are implemented by storing the switching tables in the memory of a standalone computer instead of an off the shelf switch. In some embodiments, the standalone computer may also be executing a hypervisor and one or more virtual machines on top of that hypervisor These switches are referred to as managed switching elements or managed forwarding elements as they are managed by the network control system in order to implement the LDP sets. In some embodiments, the control system manages these switching elements by pushing physical control plane data to them, as further described below. Switching elements generally receive data (e.g., a data packet) and perform one or more processing operations on the data, such as dropping a received data packet, passing a packet that is received from one source device to another destination device, processing the packet and then passing it a destination device, etc. In some embodiments, the physical control plane data that is pushed to a switching element is converted by the switching element (e.g., by a general purpose processor of the switching element) to physical forwarding plane data that specify how the switching element (e.g., how a specialized switching circuit of the switching element) processes data packets that it receives.

The network control system of some embodiments includes (1) a network operating system (NOS) that creates and maintains the NIB storage structure, and (2) one or more applications that run on top of the NOS to specify control logic for reading values from and writing values to the NIB. The NIB of some of these embodiments serves as a communication channel between the different controller instances and, in some embodiments, a communication channel between different processing layers of a controller instance.

FIG. 1 illustrates a virtualized network system 100 of some embodiments of the invention. This system allows multiple users to create and control multiple different sets of logical datapaths on a shared set of network infrastructure switching elements (e.g., switches, virtual switches, software switches, etc.). In allowing a user to create and control the user's set of logical datapaths (i.e., the user's switching logic), the system does not allow the user to have direct access to another user's set of logical datapaths in order to view or modify the other user's switching logic. However, the system does allow different users to pass packets through their virtualized switching logic to each other if the users desire such communication.

As shown in FIG. 1, the system 100 includes one or more switching elements 105, a network operating system 110, a network information base 115, and one or more applications 120. The switching elements include N switching devices (where N is a number equal to 1 or greater) that form the network infrastructure switching elements of the system 100.

In some embodiments, the network infrastructure switching elements includes virtual or physical network switches, software switches (e.g., Open vSwitch), routers, and/or other switching devices, as well as any other network elements (such as middleboxes, etc.) that establish connections between these switches, routers, and/or other switching devices. All such network infrastructure switching elements are referred to below as switching elements or forwarding elements.

The virtual or physical switching devices 105 typically include control switching logic 125 and forwarding switching logic 130. In some embodiments, a switch's control logic 125 specifies (1) the rules that are to be applied to incoming packets, (2) the packets that will be discarded, and (3) the packet processing methods that will be applied to incoming packets. The virtual or physical switching elements 105 use the control logic 125 to populate tables governing the forwarding logic 130. The forwarding logic 130 performs lookup operations on incoming packets and forwards the incoming packets to destination addresses.

As further shown in FIG. 1, the system 100 includes one or more applications 120 through which switching logic (i.e., sets of logical datapaths) is specified for one or more users (e.g., by one or more administrators or users). The network operating system (NOS) 110 serves as a communication interface between (1) the switching elements 105 that perform the physical switching for any one user, and (2) the applications 120 that are used to specify switching logic for the users. In this manner, the application logic determines the desired network behavior while the NOS merely provides the primitives needed to access the appropriate network state. In some embodiments, the NOS 110 provides a set of Application Programming Interfaces (API) that provides the applications 120 programmatic access to the network switching elements 105 (e.g., access to read and write the configuration of network switching elements). In some embodiments, this API set is data-centric and is designed around a view of the switching infrastructure, allowing control applications to read and write state to any element in the network.

To provide the applications 120 programmatic access to the switching elements, the NOS 110 needs to be able to control the switching elements 105 itself. The NOS uses different techniques in different embodiments to control the switching elements. In some embodiments, the NOS can specify both control and forwarding switching logic 125 and 130 of the switching elements. In other embodiments, the NOS 110 controls only the control switching logic 125 of the switching elements, as shown in FIG. 1. In some of these embodiments, the NOS 110 manages the control switching logic 125 of a switching element through a commonly known switch-access interface that specifies a set of APIs for allowing an external application (such as a network operating system) to control the control plane functionality of a switching element. Two examples of such known switch-access interfaces are the OpenFlow interface and the Open Virtual Switch (OVS) interface, which are respectively described in the following two papers: McKeown, N. (2008). *OpenFlow: Enabling Innovation in Campus Networks* (which can be retrieved from http://www.openflowswitch.org//documents/openflow-wp-latest.pdf), and Pettit, J. (2010). *Virtual Switching in an Era of Advanced Edges* (which can be retrieved from http://openvswitch.org/papers/dccaves2010.pdf). These two papers are incorporated herein by reference.

FIG. 1 conceptually illustrates the use of switch-access APIs through the depiction of halos 135 around the control switching logic 125. Through these APIs, the NOS can read and write entries in the control plane flow tables. The NOS' connectivity to the switching elements' control plane resources (e.g., the control plane tables) is implemented in-band (i.e., with the network traffic controlled by NOS) in some embodiments, while it is implemented out-of-band (i.e., over a separate physical network) in other embodiments. There are only minimal requirements for the chosen mechanism beyond convergence on failure and basic connectivity to the NOS, and thus, when using a separate network, standard IGP protocols such as IS-IS or OSPF are sufficient.

In order to define the control switching logic 125 for physical switching elements, the NOS of some embodiments uses the Open Virtual Switch protocol to create one or more control tables within the control plane of a switch element. The control plane is typically created and executed by a general purpose CPU of the switching element. Once the system has created the control table(s), the system then writes flow entries to the control table(s) using the OpenFlow protocol. The general purpose CPU of the physical switching element uses its internal logic to convert entries written to the control table(s) to populate one or more forwarding tables in the forwarding plane of the switch element. The forwarding tables are created and executed typically by a specialized switching chip of the switching element. Through its execution of the flow entries within the forwarding tables, the switching chip of the switching element can process and route packets of data that it receives.

To enable the programmatic access of the applications 120 to the switching elements 105, the NOS also creates the network information base (NIB) 115. The NIB is a data structure in which the NOS stores a copy of the switch-element states tracked by NOS. The NIB of some embodiments is a graph of all physical or virtual switch elements and their interconnections within a physical network topology and their forwarding tables. For instance, in some embodiments, each switching element within the network infrastructure is represented by one or more data objects in the NIB. However, in other embodiments, the NIB stores state information about only some of the switching elements. For example, as further described below, the NIB in some embodiments only keeps track of switching elements at the edge of a network infrastructure. In yet other embodiments, the NIB stores state information about edge switching elements in a network as well as some non-edge switching elements in the network that facilitate communication between the edge switching elements. In some embodiments, the NIB also stores the logical configuration and the logical state for each user specified LDPS. In these embodiments, the information in the NIB that represents the state of the actual switching elements accounts for only a subset of the total information stored in the NIB.

In some embodiments, the NIB 115 is the heart of the NOS control model in the virtualized network system 100. Under one approach, applications control the network by reading from and writing to the NIB. Specifically, in some embodiments, the application control logic can (1) read the current state associated with network entity objects in the NIB, (2) alter the network state by operating on these objects, and (3) register for notifications of state changes to these objects. Under this model, when an application 120 needs to modify a record in a table (e.g., a control plane flow table) of a switching element 105, the application 120 first uses the NOS' APIs to write to one or more objects in the NIB that represent the table in the NIB. The NOS then acting as the switching element's controller propagates this change to the switching element's table. The NIB and NOS of a virtualized network system are further described in U.S. patent application Ser. No. 13/177,529, filed Jul. 6, 2011. U.S. patent application Ser. No. 13/177,529 is incorporated herein by reference.

Figure 2:
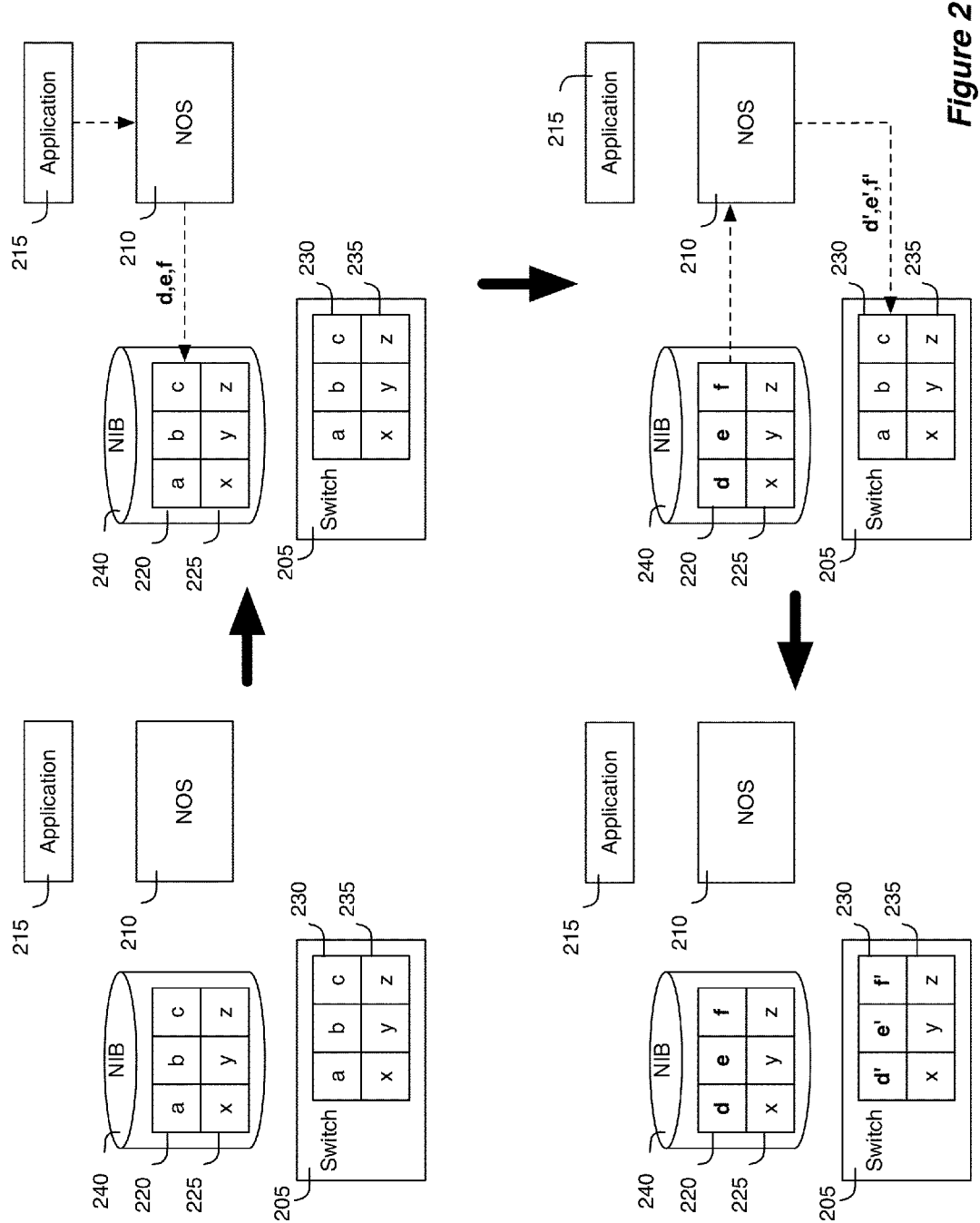
FIG. 2 illustrates an example of switch controller functionality of the network operating system (NOS) of some embodiments.

FIG. 2 presents one example that illustrates this switch controller functionality of the NOS 110. In particular, this figure illustrates in four stages the modification of a record (e.g., a flow table record) in a switch 205 by an application 215 and a NOS 210. In this example, the switch 205 has two switch logic records 230 and 235. As shown in stage one of FIG. 2, a NIB 240 stores two records 220 and 225 that correspond to the two switch logic records 230 and 235 of the switch. In the second stage, the application uses the NOS' APIs to write three new values d, e, and f in the record 220 of the NIB to replace three previous values a, b, and c.

Next, in the third stage, the NOS uses the set of switch-access APIs to write a new set of values into the switch. In some embodiments, the NIB performs a translation operation that modifies the format of the records before writing these records into the NIB. These operations are pictorially illustrated in FIG. 2 by showing the values d, e, f translated into d', e', f', and the writing of these new values into the switch 205. Alternatively, in some embodiments, one or more sets of values are kept identically in the NIB and the switching element, which thereby causes the NOS 210 to write the NIB values directly to the switch 205 unchanged.

In yet other embodiments, the NOS' translation operation might modify the set of values in the NIB (e.g., the values d, e, f) into a different set of values with fewer values (e.g., values x and y, where x and y might be a subset of d, e, and f, or completely different) or additional values (e.g., the w, x, y, z, where w, x, y, and z might be a super set of all or some of d, e, and f, or completely different). The NOS in these embodiments would then write this modified set of values (e.g., values x and y, or values w, x, y and z into the switching element).

The fourth stage finally shows the switch 205 after the old values a, b, and c have been replaced in the switch control record 230 with the values d', e', and f'. Again, in the example shown in FIG. 2, the NOS of some embodiments propagates NIB records to the switches as modified versions of the records that were written to the NIB. In other embodiments, the NOS applies processing (e.g., data transformation) to the NIB records before the NOS propagates the NIB records to the switches, and such processing changes the format, content and quantity of data written to the switches.

A. Different NIB Views

In some embodiments, the virtualized system 100 of FIG. 1 provides different views of the NIB to different users in order (1) to ensure that different users do not have direct view and control over each other's switching logic and (2) to provide each user with a view of the switching logic at an abstraction level that is desired by the user. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serves as abstractions of the actual switching elements and their attributes. As further described below, some of these higher layer elements are used in some embodiments to show different abstract switching elements and/or switching element attributes to different users in a network control system. In other words, the NOS of some embodiments generates the multi-layer, hierarchical NIB data structure, and the NOS or an application that runs on top of the NOS shows different users different views of different parts of the hierarchical levels and/or layers, in order to provide the different users with virtualized access to the shared switching elements and network.

Figure 3:
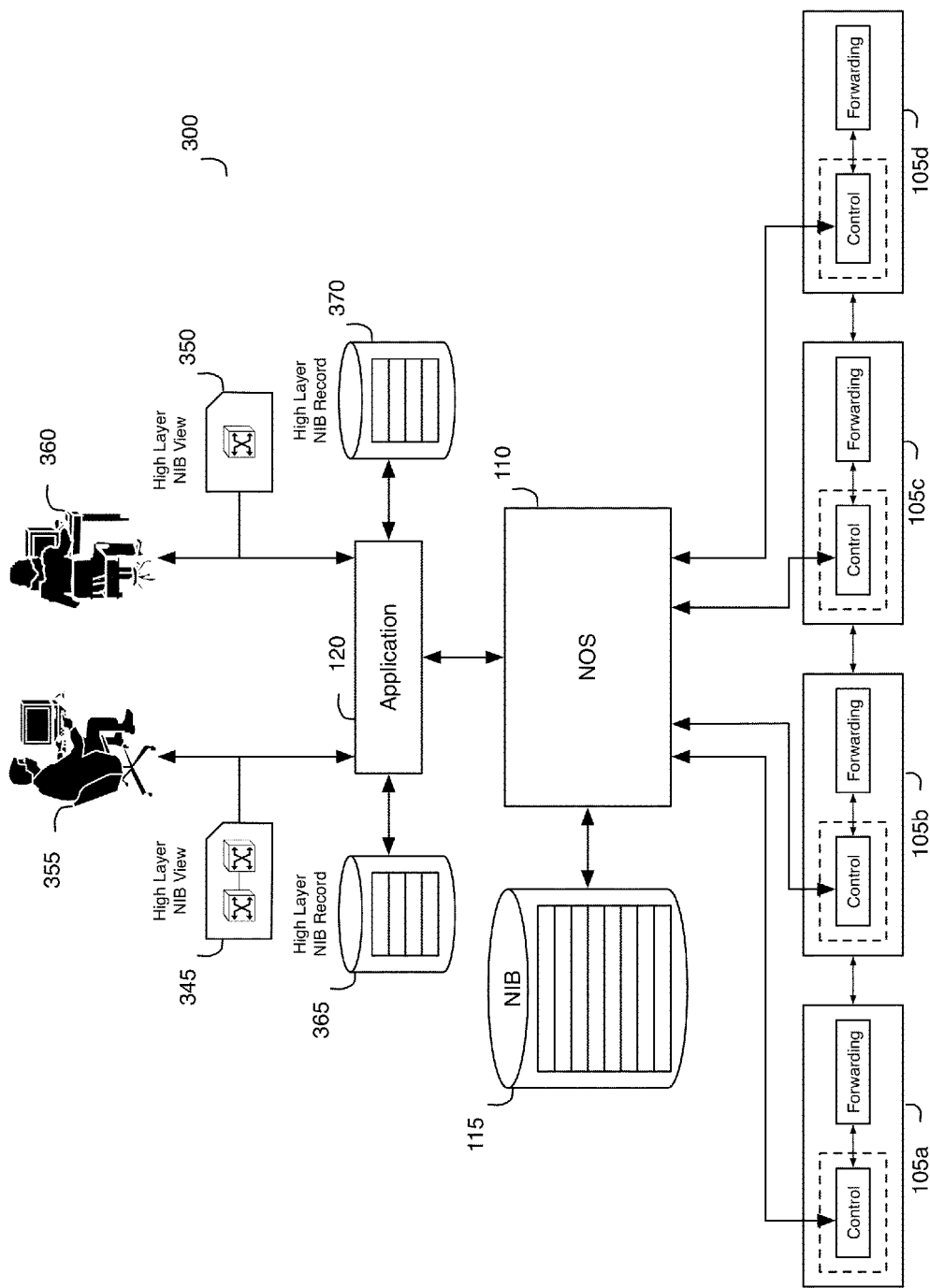
FIG. 3 illustrates an example of displaying different network information base (NIB) views to different users.

FIG. 3 illustrates an example of displaying different NIB views to different users. Specifically, this figure illustrates a virtualized switching system 300 that includes several switching elements that are shared by two users. The system 300 is similar to the system 100 of FIG. 1, except that the system 300 is shown to include four switching elements 105a-105d and one application 120, as opposed to the more general case of N switching elements 105 and M (where M is a number greater than or equal to 1) applications in FIG. 1. The number of switching elements and the use of one application are purely exemplary. Other embodiments might use more or fewer switching elements and applications. For instance, instead of having the two users interface with the same application, other embodiments provide two applications to interface with the two users.

In system 300, the NIB 115 stores sets of data records for each of the switching elements 105a-105d. In some embodiments, a system administrator can access these four sets of data through an application 120 that interfaces with the NOS. However, other users that are not system administrators do not have access to all of the four sets of records in the NIB, because some switch logic records in the NIB might relate to the logical switching configuration of other users.

Instead, each non system-administrator user can only view and modify the switching element records in the NIB that relate to the logical switching configuration of the user. FIG. 3 illustrates this limited view by showing the application 120 providing a first layered NIB view 345 to a first user 355 and a second layered NIB view 350 to a second user 360. The first layered NIB view 345 shows the first user data records regarding the configuration of the shared switching elements 105a-105d for implementing the first user's switching logic and the state of this configuration. The second layered NIB view 350 shows the second user data records regarding the configuration of the shared switching elements 105a-105d for implementing the second user's switching logic and the state of this configuration. In viewing their own logical switching configuration, neither user can view the other user's logical switching configuration.

In some embodiments, each user's NIB view is a higher level NIB view that represents an abstraction of the lowest level NIB view that correlates to the actual network infrastructure that is formed by the switching elements 105a-105d. For instance, as shown in FIG. 3, the first user's layered NIB view 345 shows two switches that implement the first user's logical switching configuration, while the second user's layered NIB view 350 shows one switch that implements the second user's logical switching configuration. This could be the case even if either user's switching configuration uses all four switching elements 105a-105d. However, under this approach, the first user perceives that his computing devices are interconnected by two switching elements, while the second user perceives that her computing devices are interconnected by one switching element.

The first layered NIB view is a reflection of a first set of data records 365 that the application 120 allows the first user to access from the NIB, while the second layered NIB view is a representation of a second set of data records 370 that the application 120 allows the second user to access from the NIB. In some embodiments, the application 120 retrieves the two sets of data records 365 and 370 from the NIB and maintains these records locally, as shown in FIG. 3. In other embodiments, however, the application does not maintain these two sets of data records locally. Instead, in these other embodiments, the application simply provides the users with an interface to access the limited set of first and second data records from the NIB 115. Also, in other embodiments, the system 300 does not provide switching element abstractions in the higher layered NIB views 345 and 350 that it provides to the users. Rather, it simply provides views to the limited first and second set of data records 365 and 370 from the NIB.

Irrespective of whether the application maintains a local copy of the first and second data records or whether the application only provides the switching element abstractions in its higher layered NIB views, the application 120 serves as an interface through which each user can view and modify the user's logical switching configuration, without being able to view or modify the other user's logical switching configuration. Through the set of APIs provided by the NOS 110, the application 120 propagates to the NIB 115 changes that a user makes to the logical switching configuration view that the user receives from the application. The propagation of these changes entails the transferring, and in some cases of some embodiments, the transformation, of the high level data entered by a user for a higher level NIB view to lower level data that is to be written to lower level NIB data that is stored by the NOS.

In the system 300 of FIG. 3, the application 120 can perform several different sets of operations in several different embodiments of the invention, as discussed above. Examples of such operations include providing an interface to a user to access NIB data regarding the user's logical switching configuration, providing different layered NIB views to different users, providing control logic for modifying the provided NIB data, providing logic for propagating received modifications to the NIB structure stored by the NOS, etc.

Figure 4:
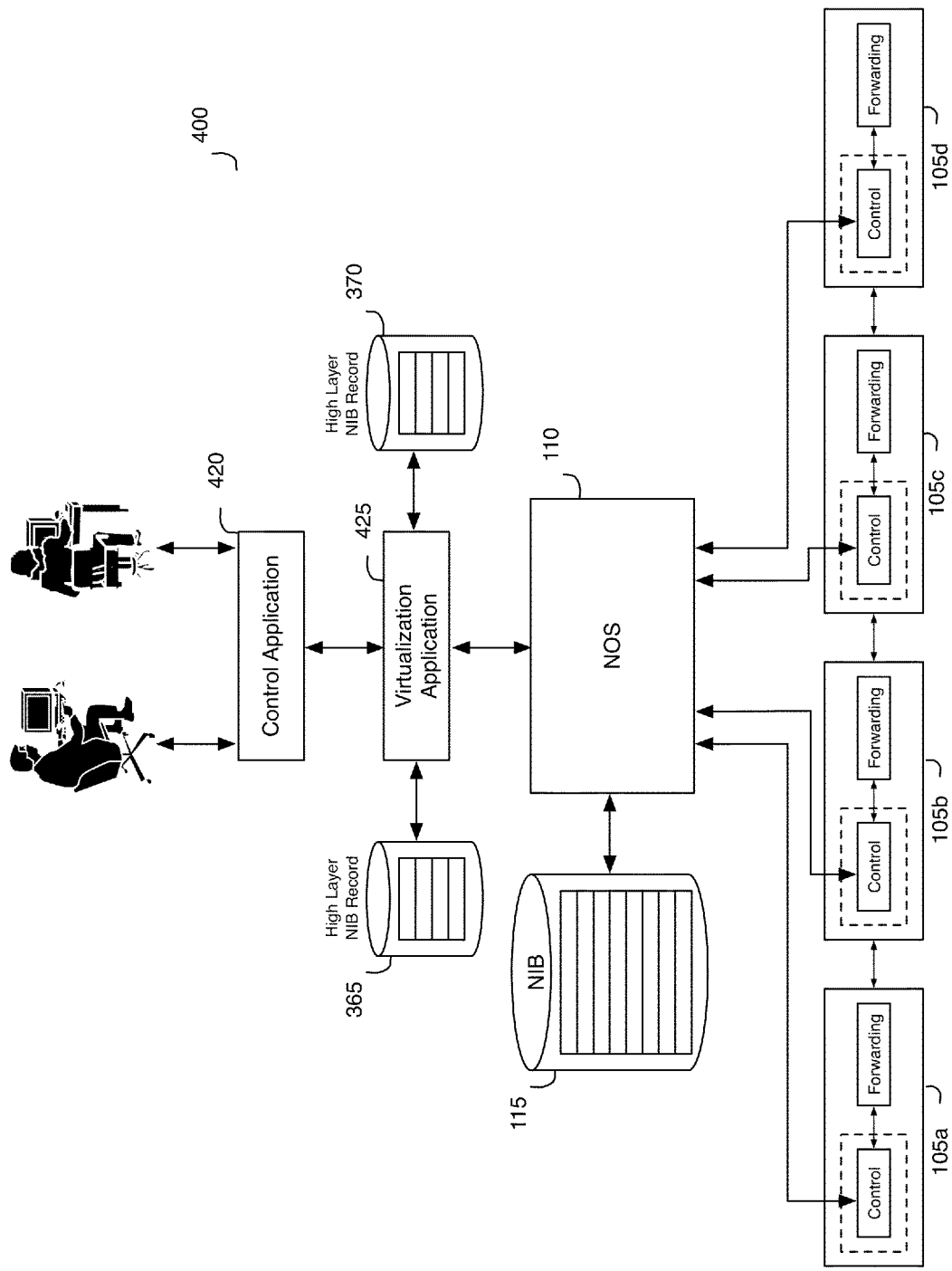
FIG. 4 illustrates a virtualized system that employs control and virtualization applications.

The system of some embodiments embeds all such operations in the NOS 110 instead of in the application 120 operating on top of the NOS. Alternatively, in other embodiments the system separates these operations into several applications that operate above the NOS. FIG. 4 illustrates a virtualized system that employs several such applications. Specifically, this figure illustrates a virtualized system 400 that is similar to the virtualized system 300 of FIG. 3, except that the operations of the application 120 in the system 400 have been divided into two sets of operations, one that is performed by a control application 420 and one that is performed by a virtualization application 425.

In some embodiments, the virtualization application 425 interfaces with the NOS 110 to provide different views of different NIB records to different users through the control application 420. The control application 420 provides the control logic for allowing a user to specify different operations with respect to the limited NIB records/views provided by the virtualization application. Examples of such operations can be read operations from the NIB or write operations to the NIB. The virtualization application then translates these operations into operations that access the NIB. In translating these operations, the virtualization application in some embodiments also transfers and/or transforms the data that are expressed in terms of the higher level NIB records/views to data that are expressed in terms of lower level NIB records.

Even though FIG. 4 shows just one control application and one virtualization application being used for the two users, the system 400 in other embodiments employs two control applications and/or two virtualization applications for the two different users. Similarly, even though several of the above-described figures show one or more applications operating on a single NOS instance, other embodiments provide several different NOS instances on top of each of which, one or more applications can execute.

B. Virtualization Application

A network control system of different embodiments allows mapping of the LDP sets of the user to the physical switching elements of the control system differently. In some embodiments, the virtualization application of the system exposes the definition of different elements at different hierarchical levels in the NIB and the definition of the links between these elements to the control applications that run on top of the NOS and the virtualization application in order to allow the control application to define its operations by reference to these definitions. For instance, in some embodiments, the developer of the control application running on top of the virtualization application uses these definitions to enumerate how the application is to map the LDP sets of the user to the physical switching elements of the control system. Under this approach, the developer would have to enumerate all different scenarios that the control system may encounter and the mapping operation of the application for each scenario.

Alternatively, the network control system in some embodiments does not require the application developers to have intimate knowledge of the NIB elements and the links in the NIB between these elements. Instead, the virtualization application of the system in these embodiments allows the control applications to simply provide user specified switching element attributes in the form of one or more tables, which are then mapped to NIB records by a table mapping engine. In other words, the virtualization application accepts switching element configurations (e.g., access control list table configurations, L2 table configurations, L3 table configurations, etc.) that the user defines without referencing any operational state of the switching elements in a particular network configuration. The virtualization application then maps the user-specified switching element configurations to the switching element configurations stored in the NIB.

Figure 5:
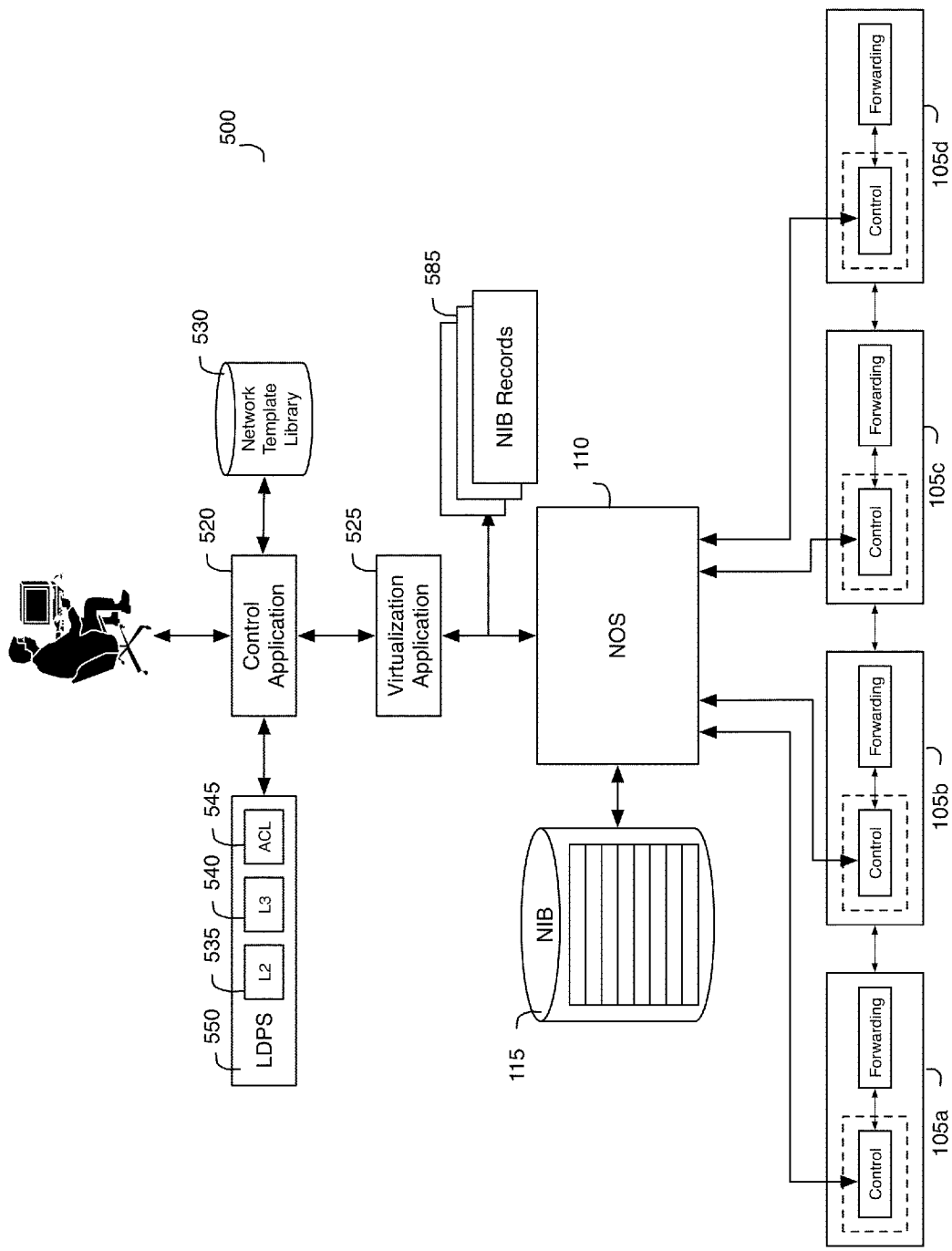
FIG. 5 illustrates an example of a virtualized system of some embodiments.

FIG. 5 illustrates an example of such a virtualized system. Like the virtualized system 300 of FIG. 3 and the virtualized system 400 of FIG. 4, the virtualized system 500 in this example is shown to include one NOS 110 and four switching elements 105a-105d. Also, like the virtualized system 400, the system 500 includes a control application 520 and a virtualization application 525 that run on top of the NOS 110. In some embodiments, the control application 520 allows a user to specify and populate LDP sets, while the virtualization application 525 implements the specified LDP sets by mapping the LDPS to the physical switching infrastructure.

More specifically, the control application 520 allows (1) a user to specify abstract switching element configurations, which the virtualization application 525 then maps to the data records in the NIB, and (2) the user to view the state of the abstract switching element configurations. In some embodiments, the control application 520 uses a network template library 530 to allow a user to specify a set of logical datapaths by specifying one or more switch element attributes (i.e., one or more switch element configurations). In the example shown in FIG. 5, the network template library includes several types of tables that a switching element may include. In this example, the user has interfaced with the control application 520 to specify an L2 table 535, an L3 table 540, and an access control list (ACL) table 545. These three tables specify a LDPS 550 for the user. In specifying these tables, the user simply specifies desired switch configuration records for one or more abstract, logical switching elements. When specifying these records, the user of the system 500 does not have any understanding of the switching elements 105a-105d employed by the system or any data regarding these switching elements from the NIB 115. The only switch-element specific data that the user of the system 500 receives is the data from the network template library, which specifies the types of network elements that the user can define in the abstract, which the system can then process.

While the example in FIG. 5 shows the user specifying an ACL table, one of ordinary skill in the art will realize that the system of some embodiments does not provide such specific switch table attributes in the library 530. For instance, in some embodiments, the switch-element abstractions provided by the library 530 are generic switch tables and do not relate to any specific switching element table, component and/or architecture. In these embodiments, the control application 520 enables the user to create generic switch configurations for a generic set of one or more tables. Accordingly, the abstraction level of the switch-element attributes that the control application 520 allows the user to create is different in different embodiments.

Irrespective of the abstraction level of the switch-element attributes produced through the control logic application, the virtualization application 525 performs a mapping operation that maps the specified switch-element attributes (e.g., the specific or generic switch table records) to records in the NIB. In some embodiments, the virtualization application translates control application input into one or more NIB records 585. The virtualization application then writes the resulting NIB records 585 to the NIB through the API set provided by NOS. From the NIB, these records are then subsequently transferred to the switching infrastructure through the operation of the NOS. In some embodiments, the NIB stores both the LDPS input received through the control application as well as the NIB records that are produced by the virtualization application.

In some embodiments, the control application can receive switching infrastructure data from the NIB. In response to this data, the control application may modify record(s) associated with one or more LDP sets. Any such modified LDPS record would then be translated to one or more physical switching infrastructure records by the virtualization application, which might then be transferred to the physical switching infrastructure by the NOS.

To map the control application input to physical switching infrastructure attributes for storage in the NIB, the virtualization application of some embodiments uses a database table mapping engine to map input tables to output tables. These input tables are created from (1) the control-application specified input tables, and (2) a set of properties associated with switching elements used by the system. The content of these output tables are then transferred to the NIB elements.

Some embodiments use a variation of the datalog database language to allow application developers to create the table mapping engine for the virtualization application, and thereby to specify the manner by which the virtualization application maps LDP sets to the controlled physical switching infrastructure. This variation of the datalog database language is referred to below as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping, rules engine that is referred to below as the nLog engine. The nLog mapping techniques of some embodiments is further described below.

In some embodiments, the nLog virtualization engine provides feedback (e.g., from one or more of the output tables or from NIB records that are updated to reflect values stored in the output tables) to the user in order to provide the user with state information about the LDPS that he or she created. In this manner, the updates that the user gets are expressed in terms of the logical space that the user understands and not in terms of the underlying switching element states, which the user does not understand.

The use of nLog allows the application developers to produce applications that express the user-specified LDP sets in terms of one or more tables, which are then automatically mapped to output tables whose content are in turn transferred to the NIB. Also, because the nLog provides a machine-generated rules engine that addresses the mapping between the logical and physical domains, the need for maintaining the data regarding the LDP sets in the NIB is eliminated. However, some embodiments maintain this data in the NIB in order to distribute this data among other NOS instances, as further described below.

C. Edge and Non-Edge Switch Controls

Figure 6:
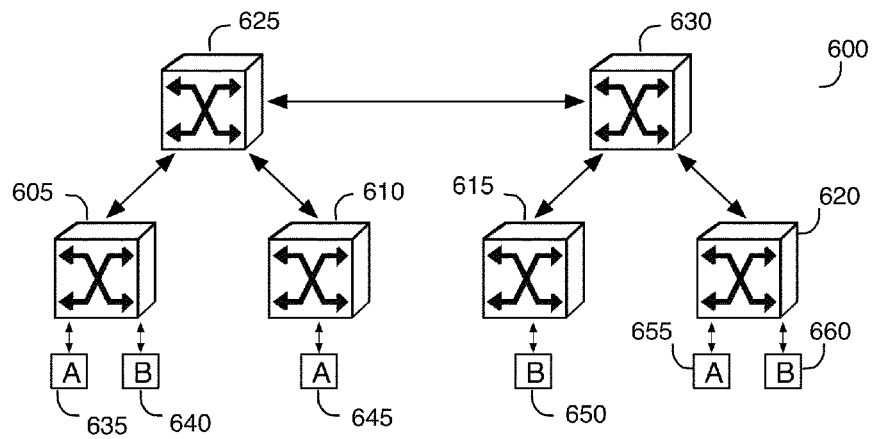
FIG. 6 illustrates the switch infrastructure of a multi-tenant server hosting system in some embodiments.
Figure 7:
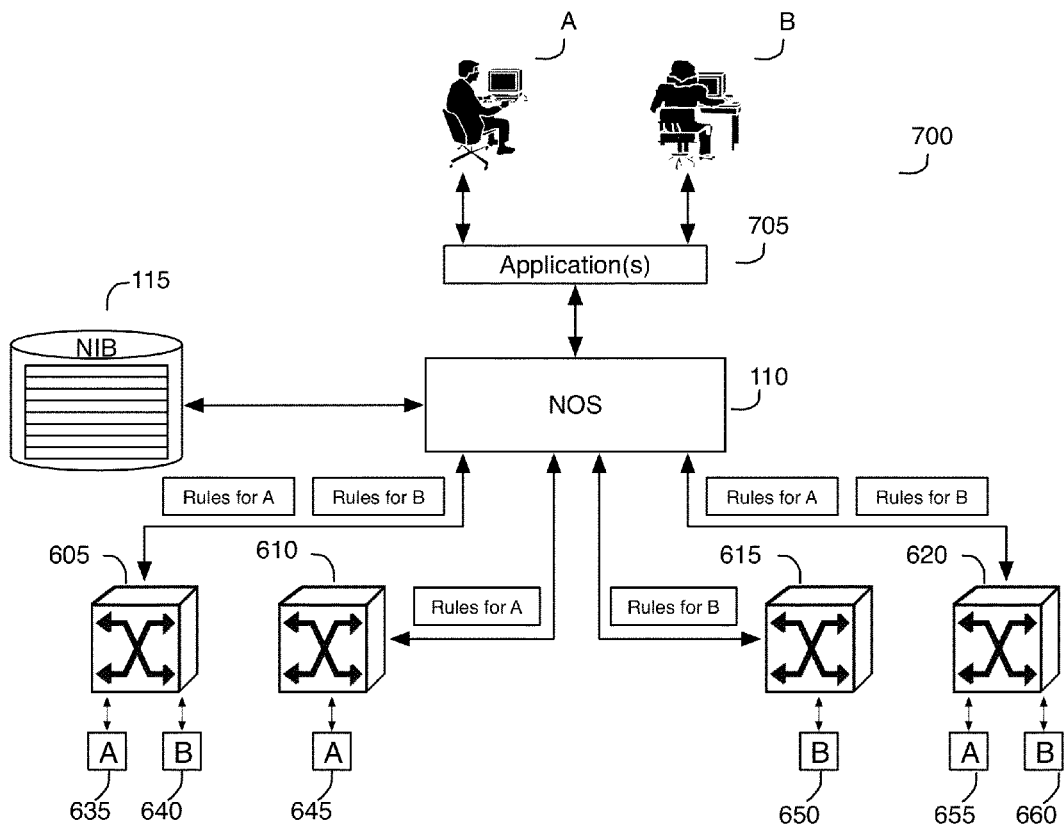
FIG. 7 illustrates a virtualized network control system that manages edge switches.

As mentioned above, the NIB in some embodiments stores data regarding each switching element within the network infrastructure of a system, while in other embodiments, the NIB stores state information about only switching elements at the edge of a network infrastructure. FIGS. 6 and 7 illustrate an example that differentiates the two differing approaches. Specifically, FIG. 6 illustrates the switch infrastructure of a multi-tenant server hosting system. In this system, six switching elements are employed to interconnect six computing devices of two users A and B. Four of these switches 605-620 are edge switches that have direct connections with the computing devices 635-660 of the users A and B, while two of the switches 625 and 630 are interior switches (i.e., non-edge switches) that interconnect the edge switches and connect to each other.

FIG. 7 illustrates a virtualized network control system 700 that manages the edge switches 605-620. As shown in this figure, the system 700 includes a NOS 110 that creates and maintains a NIB 115, which contains data records regarding only the four edge switching elements 605-620. In addition, the applications 705 running on top of the NOS 110 allow the users A and B to modify their switch element configurations for the edge switches that they use. The NOS then propagates these modifications if needed to the edge switching elements. Specifically, in this example, two edge switches 605 and 620 are used by computing devices of both users A and B, while edge switch 610 is only used by the computing device 645 of the user A and edge switch 615 is only used by the computing device 650 of the user B. Accordingly, FIG. 7 illustrates the NOS modifying users A and B records in switches 605 and 620, but only updating user A records in switch element 610 and only user B records in switch element 615.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward data packets between switching elements. The edge switches forward data packets between computing devices and other network elements (e.g., other switching elements). Thus, the system can maintain user isolation simply by controlling the edge switch because the edge switch is the last switch in line to forward packets to a host.

Controlling only edge switches also allows the system to be deployed independent of concerns about the hardware vendor of the non-edge switches, because deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system because edge-switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes and one or more non-edge switches as the non-leaf nodes. In some such embodiments, each edge switch connects to one or more of the non-leaf switches, and uses such non-leaf switches to facilitate its communication with other edge switches. Examples of functions that a non-leaf switch of some embodiments may provide to facilitate such communications between edge switch in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switches. This is because these switches are managed by the network control system (as opposed to unmanaged switches, which are not managed by the network control system, in the network) in order to implement LDP sets through the managed switches.

D. Secondary Storage Structure

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serves a purpose other than backing up the data in the NIB (e.g., for storing data that are not in the NIB). For instance, the secondary storage structure of some embodiments is used as a communication channel among virtualization applications and/or other applications that run on top of the NOS, a communication channel between different network controllers of the system, a medium through which physical plane data are pushed to the managed switching elements of the system, etc.

In some embodiments, the NIB is stored in system memory (e.g., RAM) while the system operates. This allows for the fast access of the NIB records. In some embodiments, one or more of the secondary storage structures, on the other hand, are stored on disk or other non-volatile memories that are slower to access. Such non-volatile disk or other storages, however, improve the resiliency of the system as they allow the data to be stored in a persistent manner.

Figure 8:
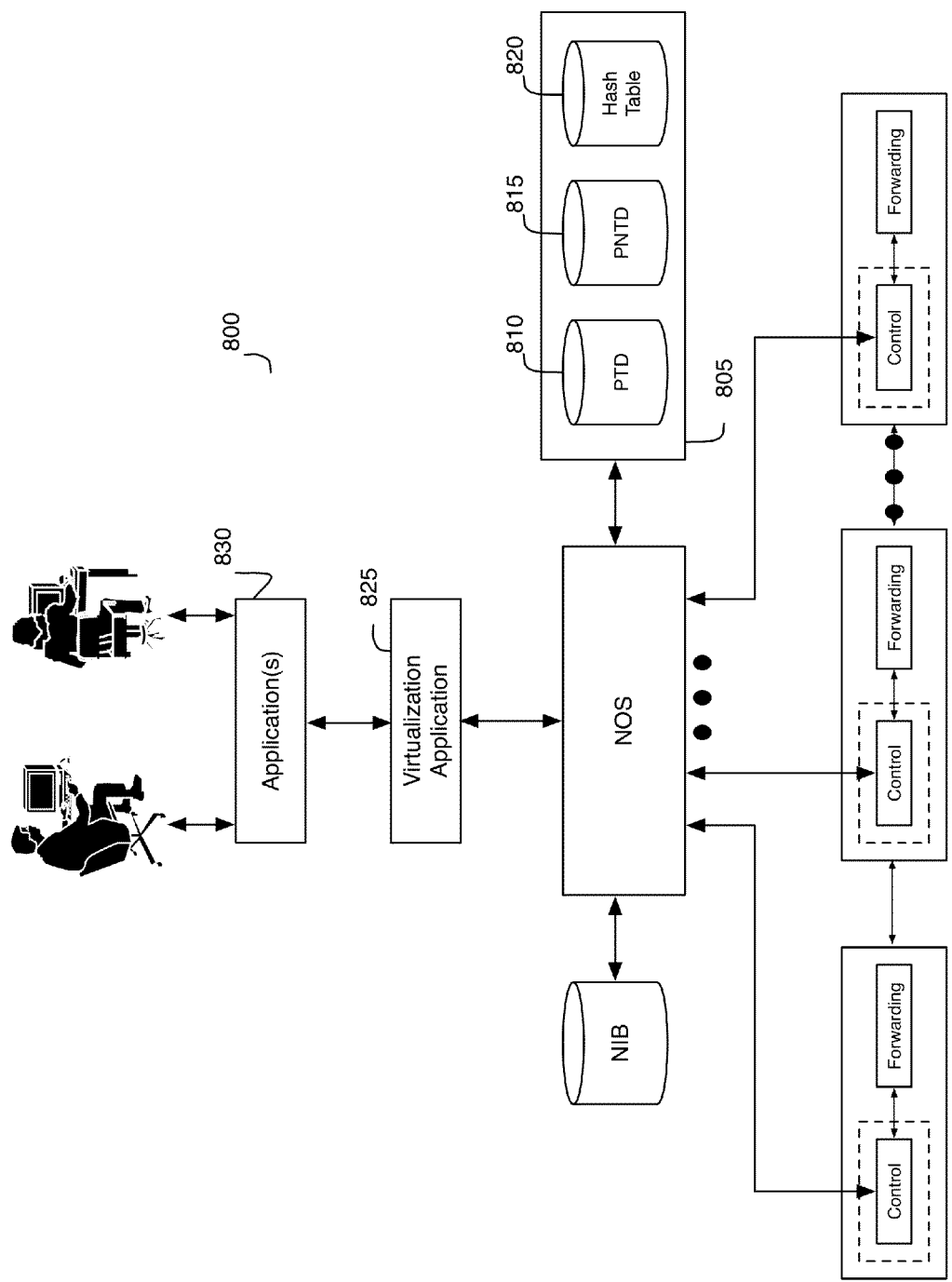
FIG. 8 illustrates an example of a virtualized system that employs secondary storage structures that supplement the NIB's storage operations.

FIG. 8 illustrates an example of a virtualized system 800 that employs secondary storage structures that supplement the NIB's storage operations. This system is similar to the systems 400 and 500 of FIGS. 4 and 5, except that it also includes secondary storage structures 805. In this example, these structures include a persistent transactional database (PTD) 810, a persistent non-transactional database (PNTD) 815, and a hash table 820. In some embodiments, these three types of secondary storage structures store different types of data, store data in different manners, and/or provide different query interfaces that handle different types of queries.

In some embodiments, the PTD 810 is a database that is stored on disk or other non-volatile memory. In some embodiments, the PTD is a commonly available database, such as MySQL or SQLite. The PTD of some embodiments can handle complex transactional queries. As a transactional database, the PTD can undo a series of prior query operations that it has performed as part of a transaction when one of the subsequent query operations of the transaction fails. Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met.

The PTD in some embodiments stores the exact replica of the data that are stored in the NIB, while in other embodiments it stores only a subset of the data that are stored in the NIB. Some or all of the data in the NIB are stored in the PTD in order to ensure that the NIB data will not be lost in the event of a crash of the NOS or the NIB.

The PNTD 815 is another persistent database that is stored on disk or other non-volatile memory. Some embodiments use this database to store data (e.g., statistics, computations, etc.) regarding one or more switch element attributes or operations. For instance, this database is used in some embodiment to store the number of packets routed through a particular port of a particular switching element. Other examples of types of data stored in the database 815 include error messages, log files, warning messages, and billing data.

Also, in some embodiments, the PNTD stores the results of operations performed by the application(s) 830 running on top of the NOS, while the PTD and hash table store only values generated by the NOS.

The PNTD in some embodiments has a database query manager that can process database queries, but as it is not a transactional database, this query manager cannot handle complex conditional transactional queries. In some embodiments, accesses to the PNTD are faster than accesses to the PTD but slower than accesses to the hash table 820.

Unlike the databases 810 and 815, the hash table 820 is not a database that is stored on disk or other non-volatile memory. Instead, it is a storage structure that is stored in volatile system memory (e.g., RAM). It uses hashing techniques that use hashed indices to quickly identify records that are stored in the table. This structure combined with the hash table's placement in the system memory allows this table to be accessed very quickly. To facilitate this quick access, a simplified query interface is used in some embodiments. For instance, in some embodiments, the hash table has just two queries: a Put query for writing values to the table and a Get query for retrieving values from the table. Some embodiments use the hash table to store data that change quickly. Examples of such quick-changing data include network entity status, statistics, state, uptime, link arrangement, and packet handling information. Furthermore, in some embodiments, the NOS uses the hash tables as a cache to store information that is repeatedly queried for, such as flow entries that will be written to multiple nodes. Some embodiments employ a hash structure in the NIB in order to quickly access records in the NIB. Accordingly, in some of these embodiments, the hash table 820 is part of the NIB data structure.

The PTD and the PNTD improve the resiliency of the NOS system by preserving network data on hard disks. If a NOS system fails, network configuration data will be preserved on disk in the PTD and log file information will be preserved on disk in the PNTD.

E. Multi-Instance Control System

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of NOS running on one or more computers, with each instance of NOS containing one or more of the secondary storage structures described above. The control applications in some embodiments partition the workload between the different instances in order to reduce each instance's workload. Also, in some embodiments, the multiple instances of NOS communicate the information stored in their storage layers to enable each instance of NOS to cover for the others in the event of a NOS instance failing.

U.S. patent application Ser. No. 13/177,533, filed Jul. 6, 2011, describes different embodiments of a multi-instance, distributed network control system that controls the operations of the same switch or of different switches by distributing workload over different controller instances. U.S. patent application Ser. No. 13/177,533 is incorporated herein by reference.

U.S. patent application Ser. No. 13/177,533 also describes different approaches that the multi-instance, distributed network control system takes to maintain a global NIB data structure (e.g., a collection of switch element data in different NIB instances of different controller instances) in each of the controller instances using secondary storage structures such as a distributed hash table (DHT), a persistent non-transaction database (PNTD), and a PTD.

Figure 9:
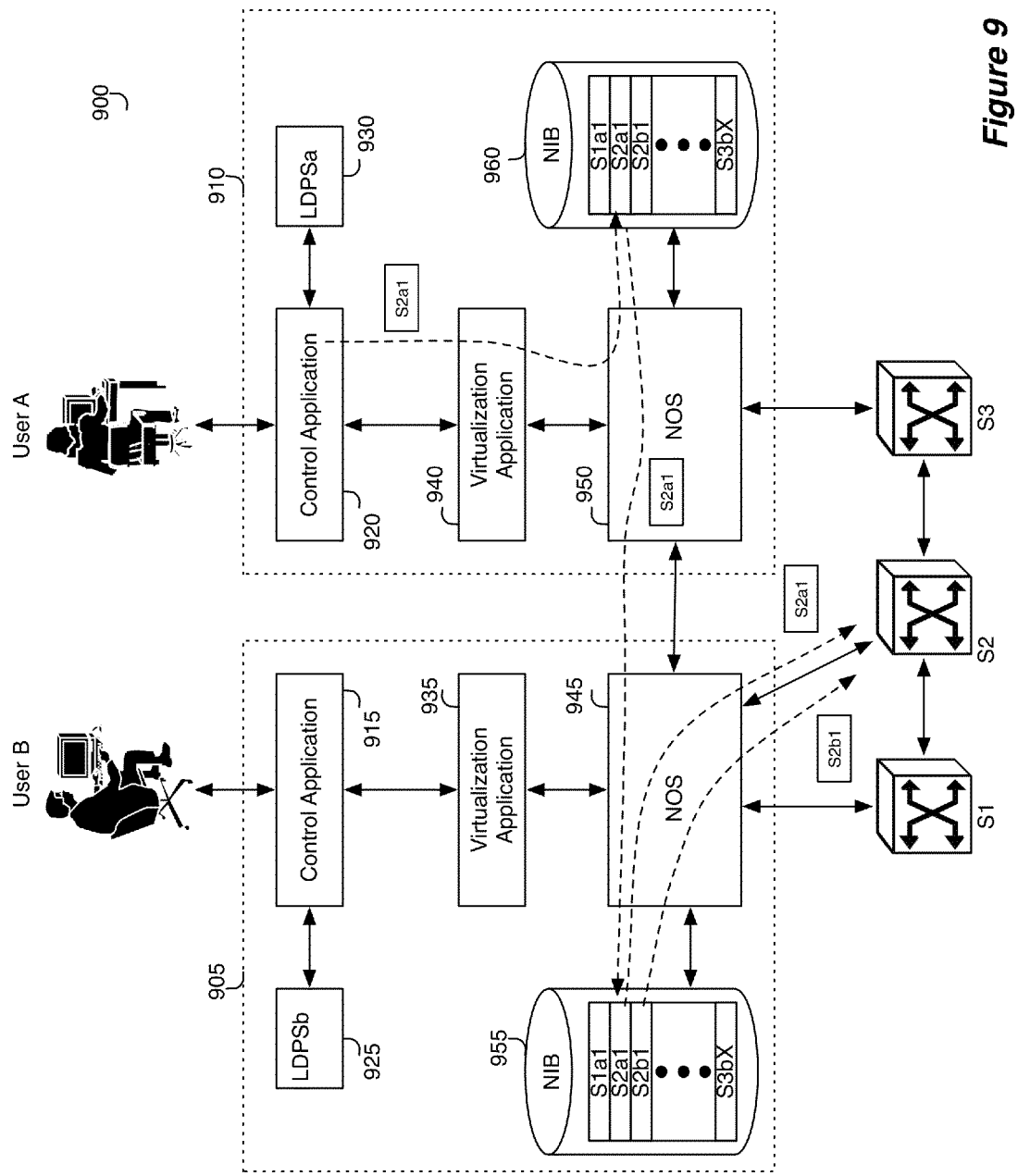
FIG. 9 illustrates an example of specifying a master controller instance for a switch in a distributed system.

FIG. 9 illustrates an example of specifying a controller instance for a switch in a distributed system 900. In this example, two controllers 905 and 910 control three switching elements S1, S2 and S3, for two different users A and B. Through two control applications 915 and 920, the two users specify two different sets of logical datapaths 925 and 930, which are translated into numerous records that are identically stored in two NIBs 955 and 960 of the two controller instances 905 and 910 by NOS instances 945 and 950 of the controllers.

In the example illustrated in FIG. 9, both control applications 915 and 920 of both controllers 905 and 910 can modify records of the switching element S2 for both users A and B, but only controller 905 is the master of this switching element. This example illustrates two different scenarios. The first scenario involves the controller 905 updating the record S2$b$1 in switching element S2 for the user B. The second scenario involves the controller 905 updating the records S2$a$1 in switching element S2 after the control application 920 updates a NIB record S2$a$1 for switching element S2 and user A in NIB 960. In the example illustrated in FIG. 9, this update is routed from NIB 960 of the controller 910 to the NIB 955 of the controller 905, and subsequently routed to switching element S2.

Different embodiments use different techniques to propagate changes to the NIB 960 of controller instance 910 to the NIB 955 of the controller instance 905. For instance, to propagate changes, the system 900 in some embodiments uses the secondary storage structures (not shown) of the controller instances 905 and 910. More generally, the distributed control system of some embodiments uses the secondary storage structures as communication channels between the different controller instances. Because of the differing properties of the secondary storage structures, these structures provide the controller instances with different mechanisms for communicating with each other. For instance, in some embodiments, different DHT instances can be different, and each DHT instance is used as a bulletin board for one or more instances to store data so that they or other instances can retrieve this data later. In some of these embodiments, the PTDs are replicated across all instances, and some or all of the NIB changes are pushed from one controller instance to another through the PTD storage layer. Accordingly, in the example illustrated in FIG. 9, the change to the NIB 960 could be replicated to the PTD of the controller 910, and from there it could be replicated in the PTD of the controller 905 and the NIB 955.

Instead of propagating the NIB changes through the secondary storages, the system 900 of some embodiments uses other techniques to change the record S2$a$1 in the switch S2 in response to the request from control application 920. For instance, to propagate this update, the NOS 950 of the controller 910 in some embodiments sends an update command to the NOS 945 of the controller 905 (with the requisite NIB update parameters that identify the record and one or more new values for the record) to direct the NOS 945 to modify the record in the NIB 955 or in the switch S2. In response, the NOS 945 would make the changes to the NIB 955 and the switch S2 (if such a change is allowed). After this change, the controller instance 910 would change the corresponding record in its NIB 960 once it receives notification (from controller 905 or through another notification mechanism) that the record in the NIB 955 and/or switch S2 has changed. Moreover, the NOS instances of two controller instances establish remote procedure call (RPC) channels to exchange records in their NIBs in some embodiments.

Other variations to the sequence of operations shown in FIG. 9 could exist because some embodiments designate one controller instance as a master of a portion of the NIB, in addition to designating a controller instance as a master of a switching element. In some embodiments, different controller instances can be masters of a switch and a corresponding record for that switch in the NIB, while other embodiments require the controller instance to be master of the switch and all records for that switch in the NIB.

In the embodiments where the system 900 allows for the designation of masters for switching elements and NIB records, the example illustrated in FIG. 9 illustrates a case where the controller instance 910 is the master of the NIB record S2$a$1, while the controller instance 905 is the master for the switch S2. If a controller instance other than the controller instance 905 and 910 was the master of the NIB record S2$a$1, then the request for the NIB record modification from the control application 920 would have had to be propagated to this other controller instance. This other controller instance would then modify the NIB record and this modification would then cause the NIB 955, the NIB 960 and the switch S2 to update their records once the controller instances 905 and 910 are notified of this modification through any number of mechanisms that would propagate this modification to the controller instances 905 and 910.

In other embodiments, the controller instance 905 might be the master of the NIB record S2$a$1, or the controller instance 905 might be the master of switch S2 and all the records of its NIB. In these embodiments, the request for the NIB record modification from the control application 920 would have to be propagated to the controller instance 905, which would then modify the records in the NIB 955 and the switch S2. Once this modification is made, the NIB 960 would modify its record S2$a$1 once the controller instance 910 is notified of this modification through any number of mechanisms that would propagate this modification to the controller instance 910.

As mentioned above, different embodiments employ different techniques to facilitate communication between different controller instances. In addition, different embodiments implement the controller instances differently. For instance, in some embodiments, the stack of the control application(s) (e.g., 915 in FIG. 9), the virtualization application (e.g., 935), and the NOS (e.g., 945) is installed and runs on a single computer. Also, in some embodiments, multiple controller instances can be installed and run in parallel on a single computer. In some embodiments, a controller instance can also have its stack of components divided amongst several computers. For example, within one instance, the control application (e.g., 915) can be on a first physical or virtual computer, the virtualization application (e.g., 935) can be on a second physical or virtual computer, and the NOS (e.g., 950) can be on a third physical or virtual computer.

Figure 10:
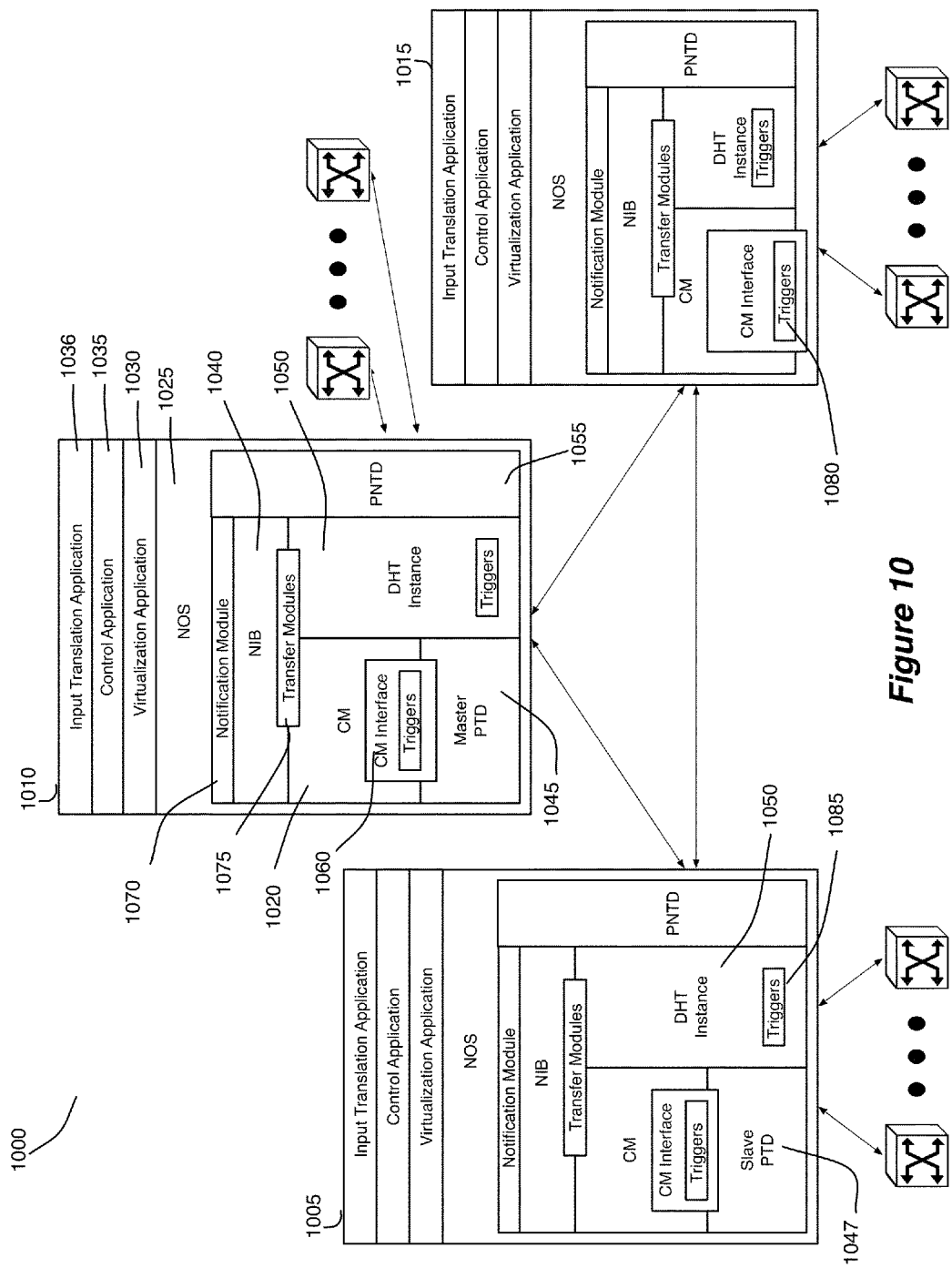
FIG. 10 illustrates a particular distributed network control system of some embodiments of the invention.

FIG. 10 illustrates a particular distributed network control system 1000 of some embodiments of the invention. The control system 1000 uses several different controller instances to control the operations of the same switching elements or of different switching elements. In the example illustrated in FIG. 10, three instances 1005, 1010 and 1015 are illustrated. However, one of ordinary skill in the art will understand that the control system 1000 can have any number of controller instances.

Each controller instance includes a NOS 1025, a virtualization application 1030, a control application 1035, an input translation application 1036, and a coordination manager (CM) 1020. Each NOS in the system 1000 includes a NIB

1040 and at least two secondary storage structures, e.g., a distributed hash table (DHT) 1050 and a PNTD 1055. In addition, the control system 1000 has a NIB notification module 1070, NIB transfer modules 1075, a CM interface 1060, PTD triggers 1080, DHT triggers 1085, and master/slave PTDs 1045/1047.

In some embodiments, the notification module 1070 in each controller instance allows applications (e.g., a control application) that run on top of the NOS to register for callbacks when changes occur within the NIB. This module in some embodiments has two components, which include a notification processor and a notification registry. The notification registry stores the list of applications that need to be notified for each NIB record that the module 1070 tracks, while the notification processor reviews the registry and processes the notifications upon detecting a change in a NIB record that it tracks. The notification module as well as its notification registry and notification processor are a conceptual representation of the NIB-application layer notification components of some embodiments, as the system of these embodiments provides a separate notification function and registry within each NIB object that can be tracked by the application layer.

The transfer modules 1075 include one or more modules that allow data to be exchanged between the NIB 1040 on one hand, and the PTD or DHT storage layers in each controller instance on the other hand. In some embodiments, the transfer modules 1075 include an import module for importing changes from the PTD/DHT storage layers into the NIB, and an export module for exporting changes in the NIB to the PTD/DHT storage layers.

While the control system of some embodiments has the same type of PTD in each instance, the control system 1000 only has PTDs in some of the NOS instances, and of these PTDs, one of them serves as master PTD 1045, while the rest serve as slave PTDs 1047. In some embodiments, NIB changes within a controller instance that has a slave PTD are first propagated to the master PTD 1045, which then direct the controller instance's slave PTD to record the NIB change. The master PTD 1045 similarly receives NIB changes from controller instances that do not have either master or slave PTDs.

In the control system 1000, the coordination manager 1020 includes the CM interface 1060 to facilitate communication between the NIB storage layer and the PTD storage layer. The CM interface also maintains the PTD trigger list 1080, which identifies the modules of the system 1000 to callback whenever the CM interface 1060 is notified of a PTD record change. A similar trigger list 1085 for handling DHT callbacks is maintained by the DHT instance 1050. The CM 1020 also has a DHT range identifier (not shown) that allows the DHT instances of different controller instances to store different DHT records in different DHT instances.

Also, in the control system 1000, the PNTD is not placed underneath the NIB storage layer. This placement is to signify that the PNTD in the control system 1000 does not exchange data directly with the NIB storage layer, but rather is accessible solely by the application(s) (e.g., the control application) running on top of the NOS 1025 as well as other applications of other controller instances. This placement is in contrast to the placement of the PTD storage layer 1045/1047 and DHT storage layers 1050, which are shown to be underneath the NIB storage layer because the PTD and DHT are not directly accessible by the application(s) running on top of the NOS 1025. Rather, in the control system 1000, data are exchanged between the NIB storage layer and the PTD/DHT storage layers of the same or different instances.

The control system 1000 uses the PTD, DHT and PNTD storage layers to facilitate communication between the different controller instances. In some embodiments, each of the three storages of the secondary storage layer uses a different storage and distribution technique to improve the resiliency of the distributed, multi-instance system 1000. For instance, the system 1000 of some embodiments replicates the PTD across NOS instances so that every NOS has a full copy of the PTD to enable a failed NOS instance to quickly reload its PTD from another instance. On the other hand, the system 1000 in some embodiments distributes the PNTD with partial overlapping distributions of data across the NOS instances to reduce the damage of a failure. Similarly, the system 1000 in some embodiments distributes the DHT fully or with minimal overlap across multiple controller instances in order to maintain the DHT instance within each instance small. Also, using this approach, allows the system to increase the size of the DHT by adding additional DHT instances in order to make the system more scalable.

One of the advantages of this system is that it can be configured in any number of ways. In some embodiments, this system provides great flexibility to specify the configurations for the components of the system in order to customize its storage and data distribution scheme to achieve the best tradeoff of scalability and speed on one hand, and reliability and consistency on the other hand. Attributes of the storage structures that affect scalability, speed, reliability and consistency considerations include the speed of the storage (e.g., RAM versus disk access speed), the reliability of the storage (e.g., persistent non-volatile storage of disk versus volatile storage of RAM), the query interface of the storage (e.g., simple Put/Get query interface of DHT versus more robust transactional database queries of PTD in some embodiments), and the number of points of failures in the system (e.g., a single point of failure for a DHT record versus multiple points of failure for a PTD record in some embodiments).

Through the configurations of its components, the system can be configured (1) on how to distribute the data records between the NIB and the secondary storage structures within one instance (e.g., which secondary storage should store which NIB record), (2) on how to distribute the data records between the NIBs of different instances (e.g., which NIB records should be replicated across different controller instances), (3) on how to distribute the data records between the secondary storage structures within one instance (e.g., which secondary storage records contain which records), (4) on how to distribute the data records between the secondary storage structures of different instances (e.g., which secondary storage records are replicated across different controller instances), (5) on how to distribute secondary storage instances across controller instances (e.g., whether to put a PTD, a DHT, or a Stats database instances within each controller or whether to put different subset of these storages within different instances), and (6) on how to replicate data records in the distributed secondary storage structures (e.g., whether to replicated PTD fully across all instances, whether to replicate some or all DHT records across more than one instance, etc.). The system also allows the coordination between the different controller instances as to the master control over different switching elements or different portions of the NIB to be configured differently. In some embodiments, some or all of these configurations can be specified by applications (e.g., a control application or a virtualization application) that run on top of the NOS.

In some embodiments, as noted above, the CMs facilitate inter-controller communication related to fault tolerance of controller instances. For instance, the CMs implement the inter-controller communication through the secondary storage layers described above. A controller instance in the control system may fail due to any number of reasons. (e.g., hardware failure, software failure, network failure, etc.). Different embodiments may use different techniques for determining whether a controller instance has failed. In some embodiments, Paxos protocol is used to determine whether a controller instance in the control system has failed. While some of these embodiments may use Apache Zookeeper to implement the Paxos protocols, other embodiments may implement Paxos protocol in other ways.

Some embodiments of the CM 1020 may utilize defined timeouts to determine whether a controller instance has failed. For instance, if a CM of a controller instance does not respond to a communication (e.g., sent from another CM of another controller instance in the control system) within an amount of time (i.e., a defined timeout amount), the non-responsive controller instance is determined to have failed. Other techniques may be utilized to determine whether a controller instance has failed in other embodiments.

When a master controller instance fails, a new master for the LDP sets and the switching elements needs to be determined. Some embodiments of the CM 1020 make such determination by performing a master election process that elects a master controller instance (e.g., for partitioning management of LDP sets and/or partitioning management of switching elements). The CM 1020 of some embodiments may perform a master election process for electing a new master controller instance for both the LDP sets and the switching elements of which the failed controller instance was a master. However, the CM 1020 of other embodiments may perform (1) a master election process for electing a new master controller instance for the LDP sets of which the failed controller instance was a master and (2) another master election process for electing a new master controller instance for the switching elements of which the failed controller instance was a master. In these cases, the CM 1020 may determine two different controller instances as new controller instances: one for the LDP sets of which the failed controller instance was a master and another for the switching elements of which the failed controller instance was a master.

In some embodiments, the master election process is further for partitioning management of LDP sets and/or management of switching elements when a controller instance is added to the control system. In particular, some embodiments of the CM 1020 perform the master election process when the control system 1000 detects a change in membership of the controller instances in the control system 1000. For instance, the CM 1020 may perform the master election process to redistribute a portion of the management of the LDP sets and/or the management of the switching elements from the existing controller instances to the new controller instance when the control system 1000 detects that a new network controller has been added to the control system 1000. However, in other embodiments, redistribution of a portion of the management of the LDP sets and/or the management of the switching elements from the existing controller instances to the new controller instance does not occur when the control system 1000 detects that a new network controller has been added to the control system 1000. Instead, the control system 1000 in these embodiments assigns unassigned LDP sets and/or switching elements (e.g., new LDP sets and/or switching elements or LDP sets and/or switching elements from a failed network controller) to the new controller instance when the control system 1000 detects the unassigned LDP sets and/or switching elements.

II. Single NOS Instance

Figure 11:
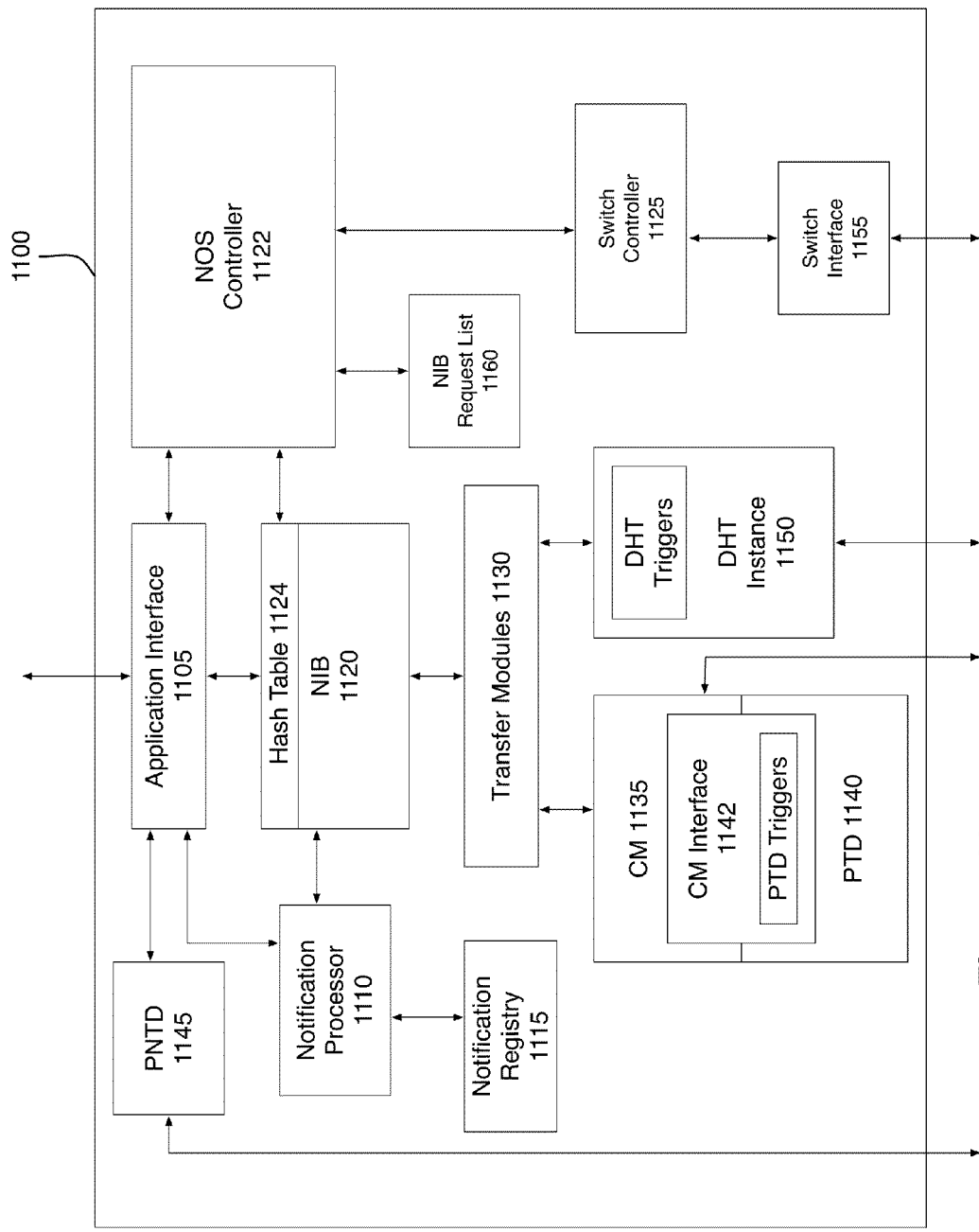
FIG. 11 conceptually illustrates a single NOS instance of some embodiments.

FIG. 11 conceptually illustrates a single NOS instance 1100 of some embodiments. This instance can be used as a single NOS instance in the distributed control system 1000 that employs multiple NOS instances in multiple controller instances. Alternatively, with slight modifications, this instance can be used as a single NOS instance in a centralized control system that utilizes only a single controller instance with a single NOS instance. The NOS instance 1100 supports a wide range of control scenarios. For instance, in some embodiments, this instance allows an application running on top of it (e.g., a control or virtualization application) to customize the NIB data model and have control over the placement and consistency of each element of the network infrastructure.

Also, in some embodiments, the NOS instance 1100 provides multiple methods for applications to gain access to network entities. For instance, in some embodiments, it maintains an index of all of its entities based on the entity identifier, allowing for direct querying of a specific entity. The NOS instance of some embodiments also supports registration for notifications on state changes or the addition/deletion of an entity. In some embodiments, the applications may further extend the querying capabilities by listening for notifications of entity arrival and maintaining their own indices. In some embodiments, the control for a typical application is fairly straightforward. It can register to be notified on some state change (e.g., the addition of new switches and ports), and once notified, it can manipulate the network state by modifying the NIB data tuple(s) (e.g., key-value pairs) of the affected entities.

As shown in FIG. 11, the NOS 1100 includes an application interface 1105, a notification processor 1110, a notification registry 1115, a NIB 1120, a hash table 1124, a NOS controller 1122, a switch controller 1125, transfer modules 1130, a CM 1135, a PTD 1140, a CM interface 1142, a PNTD 1145, a DHT instance 1150, switch interface 1155, and NIB request list 1160.

The application interface 1105 is a conceptual illustration of the interface between the NOS and the applications (e.g., control and virtualization applications) that can run on top of the NOS. The interface 1105 includes the NOS APIs that the applications (e.g., control or virtualization application) running on top of the NOS use to communicate with the NOS. In some embodiments, these communications include registrations for receiving notifications of certain changes in the NIB 1120, queries to read certain NIB attributes, queries to write to certain NIB attributes, requests to create or destroy NIB entities, instructions for configuring the NOS instance (e.g., instructions regarding how to import or export state information), requests to import or export entities on demand, and requests to synchronize NIB entities with switching elements or other NOS instances.

The switch interface 1155 is a conceptual illustration of the interface between the NOS and the switching elements that run below the NOS instance 1100. In some embodiments, the NOS accesses the switching elements by using the OpenFlow or OVS APIs provided by the switching elements. Accordingly, in some embodiments, the switch interface 1155 includes the set of APIs provided by the OpenFlow and/or OVS protocols.

The NIB 1120 is the data storage structure that stores data regarding the switching elements that the NOS instance 1100 is controlling. In some embodiments, the NIB just stores data attributes regarding these switching elements, while in other embodiments, the NIB also stores data attributes for the LDP sets defined by the user. Also, in some embodiments, the NIB is a hierarchical object data structure (such as the ones described above) in which some or all of the NIB objects not only include data attributes (e.g., data tuples regarding the switching elements) but also include functions to perform certain functionalities of the NIB. For these embodiments, one or more of the NOS functionalities that are shown in modular form in FIG. 11 are conceptual representations of the functions performed by the NIB objects.

The hash table 1124 is a table that stores a hash value for each NIB object and a reference to each NIB object. Specifically, each time an object is created in the NIB, the object's identifier is hashed to generate a hash value, and this hash value is stored in the hash table along with a reference (e.g., a pointer) to the object. The hash table 1124 is used to quickly access an object in the NIB each time a data attribute or function of the object is requested (e.g., by an application or secondary storage). Upon receiving such requests, the NIB hashes the identifier of the requested object to generate a hash value, and then uses that hash value to quickly identify in the hash table a reference to the object in the NIB. In some cases, a request for a NIB object might not provide the identity of the NIB object but instead might be based on non-entity name keys (e.g., might be a request for all entities that have a particular port). For these cases, the NIB includes an iterator that iterates through all entities looking for the key specified in the request.

The notification processor 1110 interacts with the application interface 1105 to receive NIB notification registrations from applications running on top of the NOS and other modules of the NOS (e.g., such as an export module within the transfer modules 1130). Upon receiving these registrations, the notification processor 1110 stores notification requests in the notification registry 1115 that identifies each requesting party and the NIB data tuple(s) that the requesting party is tracking.

As mentioned above, the system of some embodiments embeds in each NIB object a function for handling notification registrations for changes in the value(s) of that NIB object. For these embodiments, the notification processor 1110 is a conceptual illustration of the amalgamation of all the NIB object notification functions. Other embodiments, however, do not provide notification functions in some or all of the NIB objects. The NOS of some of these embodiments therefore provides an actual separate module to serve as the notification processor for some or all of the NIB objects.

When some or all of the NIB objects have notification functions in some embodiments, the notification registry for such NIB objects are typically kept with the objects themselves. Accordingly, for some of these embodiments, the notification registry 1115 is a conceptual illustration of the amalgamation of the different sets of registered requestors maintained by the NIB objects. Alternatively, when some or all of the NIB objects do not have notification functions and notification services are needed for these objects, some embodiments use a separate notification registry 1115 for the notification processor 1110 to use to keep track of the notification requests for such objects.

The notification process serves as only one manner for accessing the data in the NIB. Other mechanisms are needed in some embodiments for accessing the NIB. For instance, the secondary storage structures (e.g., the PTD 1140 and the DHT instance 1150) also need to be able to import data from and export data to the NIB. For these operations, the NOS 1100 uses the transfer modules 1130 to exchange data between the NIB and the secondary storage structure.

In some embodiments, the transfer modules include a NIB import module and a NIB export module. These two modules in some embodiments are configured through the NOS controller 1122, which processes configuration instructions that it receives through the interfaces 1105 from the applications above the NOS. The NOS controller 1122 also performs several other operations. As with the notification processor, some or all of the operations performed by the NOS controller are performed by one or more functions of NIB objects, in some of the embodiments that implement one or more of the NOS 1100 operations through the NIB object functions. Accordingly, for these embodiments, the NOS controller 1122 is a conceptual amalgamation of several NOS operations, some of which are performed by NIB object functions.

Other than configuration requests, the NOS controller 1122 of some embodiments handles some of the other types of requests directed at the NOS instance 1100. Examples of such other requests include queries to read certain NIB attributes, queries to write to certain NIB attributes, requests to create or destroy NIB entities, requests to import or export entities on demand, and requests to synchronize NIB entities with switching elements or other NOS instances.

In some embodiments, the NOS controller stores requests to change the NIB on the NIB request list 1160. Like the notification registry, the NIB request list in some embodiments is a conceptual representation of a set of distributed requests that are stored in a distributed manner with the objects in the NIB. Alternatively, for embodiments in which some or all of the NIB objects do not maintain their modification requests locally, the request list is a separate list maintained by the NOS 1100. The system of some of these embodiments that maintains the request list as a separate list, stores this list in the NIB in order to allow for its replication across the different controller instances through the PTD storage layer and/or the DHT storage layer. This replication allows the distributed controller instances to process in a uniform manner a request that is received from an application operating on one of the controller instances.

Synchronization requests are used to maintain consistency in NIB data in some embodiments that employ multiple NIB instances in a distributed control system. For instance, the NIB of some embodiments provides a mechanism to request and release exclusive access to the NIB data structure of the local instance. As such, an application running on top of the NOS instance(s) is only assured that no other thread is updating the NIB within the same controller instance. The application therefore needs to implement mechanisms external to the NIB to coordinate an effort with other controller instances to control access to the NIB. In some embodiments, this coordination is static and requires control logic involvement during failure conditions.

Also, in some embodiments, all NIB operations are asynchronous, meaning that updating a network entity only guarantees that the update will eventually be pushed to the corresponding switching element and/or other NOS instances. While this has the potential to simplify the application logic and make multiple modifications more efficient, often it is useful to know when an update has successfully completed. For instance, to minimize disruption to network traffic, the application logic of some embodiments requires the updating of forwarding state on multiple switches to happen in a particular order (to minimize, for example, packet drops). For this purpose, the API of some embodiments provides the synchronization request primitive that calls back one or more applications running on top of the NOS once the state has been pushed for an entity. After receiving the callback, the control application of some embodiments will then inspect the content of the NIB and determine whether its state is still as originally intended. Alternatively, in some embodiments, the control application can simply rely on NIB notifications to react to failures in modifications as they would react to any other network state changes.

The NOS controller 1122 is also responsible for pushing the changes in its corresponding NIB to switching elements for which the NOS 1100 is the master. To facilitate writing such data to the switching elements, the NOS controller 1122 uses the switch controller 1125. It also uses the switch controller 1125 to read values from a switching element. To access a switching element, the switch controller 1125 uses the switch interface 1155, which as mentioned above uses OpenFlow or OVS, or other known set of APIs in some embodiments.

Like the PTD and DHT storage structures 1045 and 1050 of the control system 1000 of FIG. 10, the PTD and DHT storage structures 1140 and 1150 of FIG. 11 interface with the NIB and not the application layer. In other words, some embodiments only limit PTD and DHT layers to communicate between the NIB layer and these two storage layers, and to communicate between the PTD/DHT storages of one instance and PTD/DHT storages of other instances. Other embodiments, however, allow the application layer (e.g., the control application) within one instance to access the PTD and DHT storages directly or through the transfer modules 1130. These embodiments might provide PTD and DHT access handles (e.g., APIs to DHT, PTD or CM interface) as part of the application interface 1105, or might provide handles to the transfer modules that interact with the PTD layer (e.g., the CM interface 1142) and DHT layers, so that the applications can directly interact with the PTD and DHT storage layers.

Also, like structures 1045 and 1050, the PTD 1140 and DHT instance 1150 have corresponding lists of triggers that are respectively maintained in the CM interface 1142 and the DHT instance 1150. Also, like the PNTD 1055 of the control system 1000, the PNTD 1145 of FIG. 11 does not interface with the NIB 1120. Instead, it interfaces with the application layer through the application interface 1105. Through this interface, the applications running on top of the NOS can store data in and retrieve data from the PNTD. Also, applications of other controller instances can access the PNTD 1145, as shown in FIG. 11.

III. Universal Forwarding State

A. Control Data Pipeline

Figure 12:
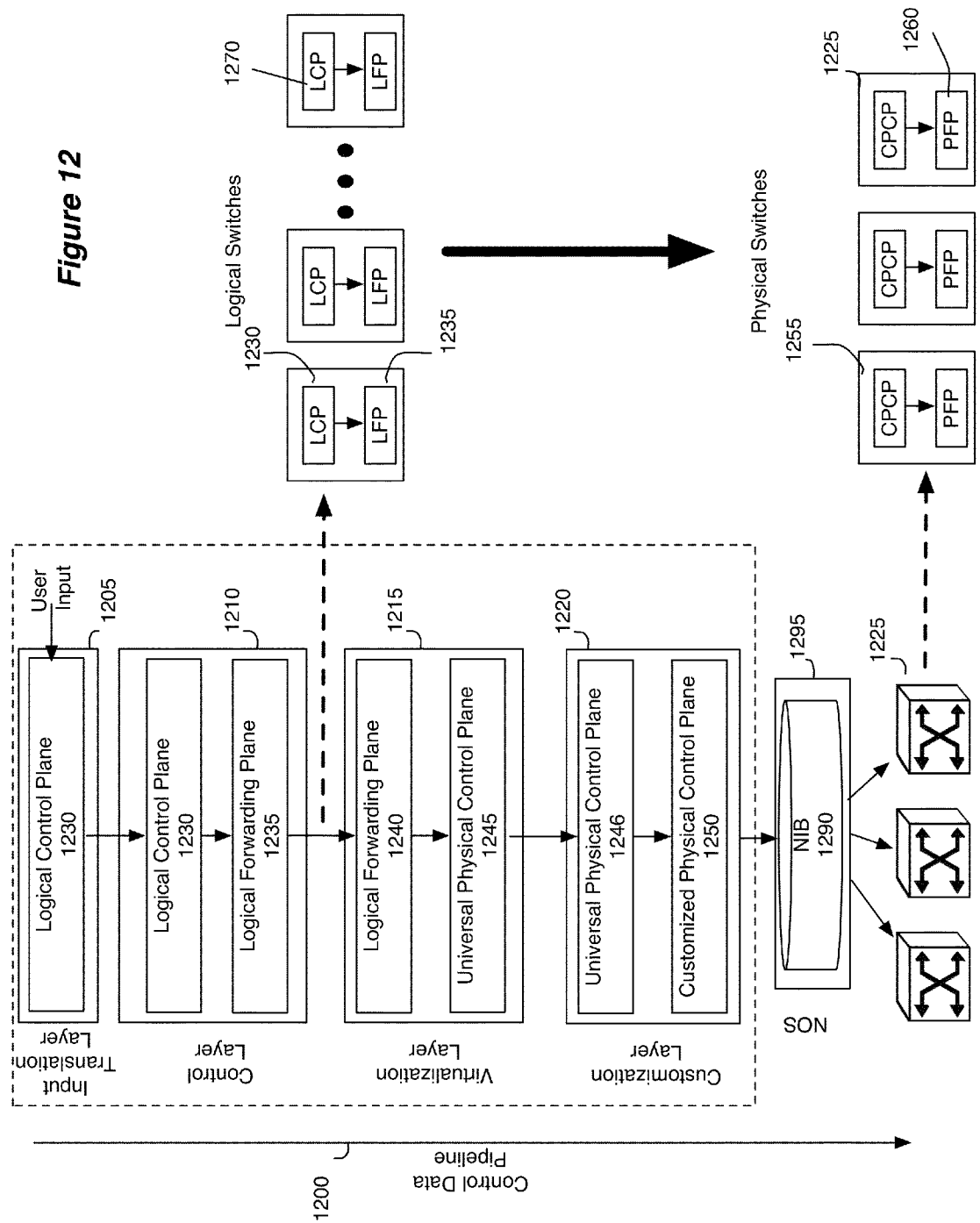
FIG. 12 illustrates the propagation of the instructions to control a managed switching element through the various processing layers of the controller instances.

FIG. 12 further elaborates on the propagation of the instructions to control a managed switching element through the various processing layers of the controller instances of some embodiments of the invention. This figure illustrates a control data pipeline 1200 that translates and propagates control plane data through five processing layers of the same or different controller instances to a managed switching element 1225. These five layers are the input translation layer 1205, the control layer 1210, the virtualization layer 1215, the customization layer 1220, and the NOS 1295.

In some embodiments, these five layers are in the same controller instance. However, other arrangements of these layers exist in other embodiments. For instance, each of the five layers may be in a different controller instance. One or more of the five layers may be in one controller instance, too. As a more specific example, only the control layer 1210, the virtualization layer 1215, and the NIB 1290 of the NOS 1295 that initially stores the output of the virtualization layer 1215 are in the same controller instance, but the functionality to propagate the customized physical control plane (CPCP) data reside in a NOS of another controller instance (not shown) in some embodiments. In these embodiments, the universal physical control plane (UPCP) data is transferred from the initial NIB to the NIB of a NOS of the other controller instance, before this other controller instance generates and pushes the CPCP data to the managed switching element. The former controller instance may be a logical controller that generates UPCP data and the latter controller instance may be a physical controller that customizes the UPCP data into CPCP data.

As shown in FIG. 12, the input translation layer 1205 in some embodiments has a LCP 1230 that can be used to express the output of this layer. In some embodiments, an application (e.g., web-based application, not shown) is provided to the users for them to supply inputs specifying the logical datapath (LDP) sets. This application sends the inputs in the form of API calls to the input translation layer 1205, which translates them into LCP data in a format that can be processed by the control layer 1210. For instance, the inputs are translated into a set of input events that can be fed into an nLog table mapping engine of the control layer. The nLog table mapping engine and its operation will be described further below and is also further described in U.S. patent application Ser. No. 13/177,532, filed Jul. 6, 2011. U.S. patent application Ser. No. 13/177,532 is incorporated herein by reference. In those embodiments where the input translation layer 1205 is in a controller instance separate from the controller instance in which the other three layers are, the input translation layer 1205 sends the input events to the control layer through one or more communication channels (e.g., remote procedure call (RPC) channels).

The control layer 1210 in some embodiments has the LCP 1230 and the LFP 1235 that can be used to express the input and output to this layer. The LCP includes a collection of higher-level constructs that allow the control layer and its users to specify one or more LDP sets within the LCP for one or more users. The LFP 1235 represents the LDP sets of the users in a format that can be processed by the virtualization layer 1215. In this manner, the two logical planes 1230 and 1235 are virtualization space analogs of the control and forwarding planes 1255 and 1260 that typically can be found in a typical managed switching element 1225, as shown.

In some embodiments, the control layer 1210 defines and exposes the LCP constructs with which the layer itself or users of the layer define different LDP sets within the LCP. For instance, in some embodiments, the LCP data 1230 includes logical ACL data, etc. Some of this data (e.g., logical ACL data) can be specified by the user, while other such data (e.g., the logical L2 or L3 records) are generated by the control layer and may not be specified by the user. In some embodiments, the control layer 1210 generates and/or specifies such data in response to certain changes to the NIB (which indicate changes to the managed switching elements and the managed datapaths) that the control layer 1210 detects.

In some embodiments, the LCP data (i.e., the LDP sets data that is expressed in terms of the control plane constructs) can be initially specified without consideration of current operational data from the managed switching elements and without consideration of the manner by which this control plane data will be translated to physical control plane data. For instance, the LCP data might specify control data for one logical switch that connects five computers, even though this control plane data might later be translated to physical control data for three managed switching elements that implement the desired switching between the five computers.

The control layer includes a set of modules for converting any LDPS within the LCP to a LDPS in the LFP 1235. In some embodiments, the control layer 1210 uses the nLog table mapping engine to perform this conversion. The control layer's use of the nLog table mapping engine to perform this conversion is further described below. The control layer also includes a set of modules for pushing the LDP sets from the LFP 1235 of the control layer 1210 to a LFP 1240 of the virtualization layer 1215.

The LFP 1240 includes one or more LDP sets of one or more users. The LFP 1240 in some embodiments includes logical forwarding data for one or more LDP sets of one or more users. Some of this data is pushed to the LFP 1240 by the control layer, while other such data are pushed to the LFP by the virtualization layer detecting events in the NIB 1290 as further described below for some embodiments.

In addition to the LFP 1240, the virtualization layer 1215 includes a UPCP 1245. The UPCP 1245 includes a UPCP data for the LDP sets. The virtualization layer includes a set of modules (not shown) for converting the LDP sets within the LFP 1240 to UPCP data in the UPCP 1245. In some embodiments, the virtualization layer 1215 uses the nLog table mapping engine to perform this conversion. The virtualization layer of some embodiments also includes a set of modules (not shown) for pushing the UPCP data from the UPCP 1245 of the virtualization layer 1215 to the UPCP 1246 of the customization layer 1220.

In some embodiments, the UPCP data that is sent to the customization layer 1220 allows managed switching element 1225 to process data packets according to the LDP sets specified by the control layer 1210. However, in contrast to the CPCP data, the UPCP data is not a complete implementation of the logical data specified by the control layer because the UPCP data in some embodiments does not express the differences in the managed switching elements and/or location-specific information of the managed switching elements.

The UPCP data has to be translated into the CPCP data for each managed switching element in order to completely implement the LDP sets at the managed switching elements. For instance, when the LDP sets specifies a tunnel that spans several managed switching elements, the UPCP data expresses one end of the tunnel using a particular network address (e.g., IP address) of the managed switching element representing that end. However, each of the other managed switching elements over which the tunnel spans uses a port number that is local to the managed switching element to refer to the end managed switching element having the particular network address. That is, the particular network address has to be translated to the local port number for each of the managed switching elements in order to completely implement the LDP sets specifying the tunnel at the managed switching elements.

The UPCP data as intermediate data to be translated into CPCP data enables the control system of some embodiments to scale, assuming that the customization layer 1220 is running in another controller instance in some embodiments. This is because the virtualization layer 1215 does not have to convert the LFP data specifying the LDP sets to CPCP data for each of the managed switching elements that implements the LDP sets. Instead, the virtualization layer 1215 converts the LFP data to UPCP data once for all the managed switching elements that implement the LDP sets. In this manner, the virtualization application saves computational resources that it would otherwise have to spend to perform conversion of the LDP sets to CPCP data for as many times as the number of the managed switching elements that implement the LDP sets.

The customization layer 1220 includes the UPCP 1246 and a CPCP 1250 that can be used to express the input and output to this layer. The customization layer includes a set of modules (not shown) for converting the UPCP data in the UPCP 1246 into CPCP data in the CPCP 1250. In some embodiments, the customization layer 1220 uses the nLog table mapping engine to perform this conversion. The customization layer also includes a set of modules (not shown) for pushing the CPCP data from the CPCP 1250 of the customization layer 1220 into the managed switching elements 1225.

The CPCP data that is pushed to each managed switching element is specific to the managed switching element. The CPCP data allows the managed switching element to perform physical switching operations in both the physical and logical data processing domains. In some embodiments, the customization layer 1220 runs in a separate controller instance for each of the managed switching elements 1225.

In some embodiments, the customization layer 1220 does not run in a controller instance. The customization layer 1215 in these embodiments resides in the managed switching elements 1225. Therefore, in these embodiments, the virtualization layer 1215 sends the UPCP data to the managed switching elements. Each managed switching element will customize the UPCP data into CPCP data specific to the managed switching element. In some of these embodiments, a controller daemon runs in each managed switching element and will perform the conversion of the universal data into the customized data for the managed switching element. A controller daemon will be described further below.

In some embodiments, the CPCP data that is propagated to the managed switching element 1225 enables this switching element to perform physical forwarding operations on network data (e.g., packets) based on the logical values defined in the logical domain. Specifically, in some embodiments, the CPCP data specify flow entries that include the logical values. These logical values include logical addresses, logical port numbers, and etc. that are used to forward the network data in the logical domain. These flow entries also map the logical values to the physical values defined in the physical domain such that the managed switching element can perform logical forwarding operations on the network data by performing physical forwarding operations based on the logical values. In this manner, the physical control plane data facilitates implementing logical switching elements across managed switching elements. Several examples of using the propagated physical control plane data to implement logical data processing in the managed switching elements is further described in U.S. patent application Ser. No. 13/177,535, filed Jul. 6, 2011. U.S. patent application Ser. No. 13/177,535 is incorporated herein by reference.

The control plane data that is handled by a layer of the control data pipeline 1200 gets more global as the higher the layer is. That is, the LCP data in the control layer 1210 would span the entire set of managed switching elements that implement a logical switching element defined by the LCP data. In contrast, the CPCP data in the customization layer 1220 is local and specific to each of the managed switching elements that implement the logical switching element.

In some embodiments, the NIB 1290 serves as a medium for communications between different layers. Each of the layers in a controller instance pushes the data that the layer has generated into the NIB so that another layer above or below the layer detects the data change in the NIB and uses the data to perform the other layer's portion of the processing pipeline 1200. In other embodiments, the layers of a controller instance may directly push generated data to the layer above or below without resorting to the NIB as a communication medium (e.g., by establishing and using RPC channels between the layers). In some embodiments, the NIB also serves as a medium for communications between different controller instances as described above by reference to FIGS. 9 and 10.

Figure 13:
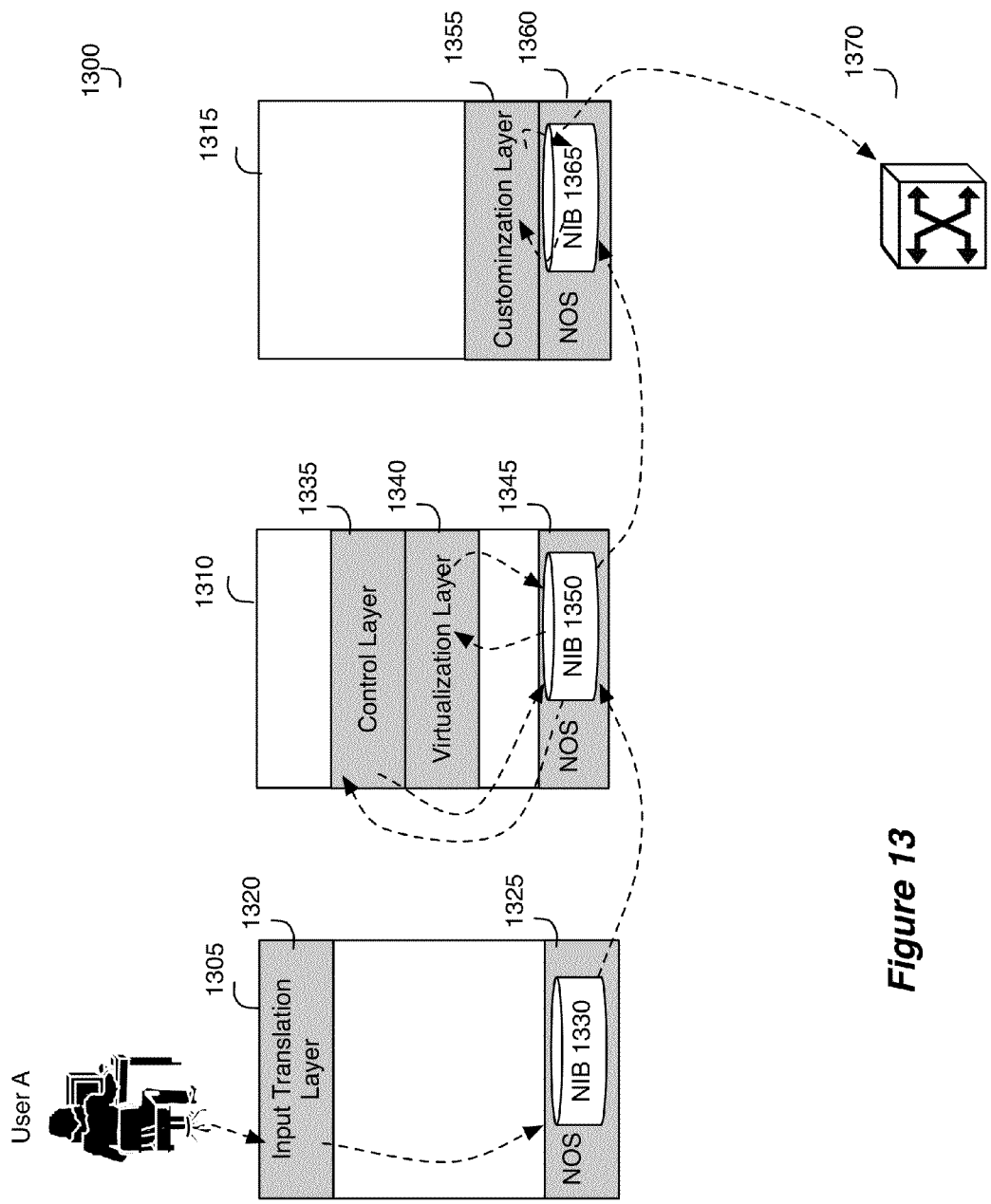
FIG. 13 illustrates an example operation of several controller instances.

FIG. 13 illustrates an example of using the NIB as a medium for communication between different controller instances. Specifically, FIG. 13 illustrates an operation of several controller instances that function as a controller for distributing inputs, a master controller of a LDPS (also referred to as a logical controller), and a master controller of a managed switching element (also referred to as a physical controller). As mentioned above, not every controller instance includes a full stack of the five layers described above by reference to FIG. 12. In other embodiments, every controller instance includes all five layers, but does not perform the whole control data pipeline 1200.

In this example, none of the controller instances 1305, 1310, and 1315 has all five layers or perform the entire control data pipeline 1200. Specifically, the controller instance 1305 includes input translation layer 1320 and NOS 1325. The controller instance 1310 includes control layer 1335, virtualization layer 1340, and NOS 1345. The controller instance 1315 includes customization layer 1355 and NOS 1360. Each NOS instance in each of the controller instances 1305-1315 maintains a NIB as shown.

The controller instance 1305 in this example is a controller instance for distributing inputs. That is, the controller instance 1305 of some embodiments takes the inputs from the users in the form of API calls. Through the API calls, the users can specify requests for configuring a particular LDPS (e.g., configuring a logical switching element or a logical router to be implemented in a set of managed switching elements) or specify requests for information inquires (e.g., network traffic statistics for the logical ports of the logical switch of the user). The input module 1320 of the controller instance 1305 receives these API calls and translates them into the form (e.g., data tuples or records) that can be pushed into the NIB 1330 of the NOS 1325.

The NOS 1325 in this example then sends these NIB records to another controller instance that is responsible for managing the records for the particular LDPS. In this example, the controller instance 1310 is responsible for the records for the LDPS. The controller instance 1310 updates the NIB 1350 with the records received. This data propagation from the NIB 1330 of the controller instance 1305 to the NIB 1350 of the controller instance 1345 can be achieved through any of the different ways described above by reference to FIGS. 9 and 10. For instance, the data from the NIB 1330 may be replicated to the NIB 1350 through secondary storage structures (not shown) of the two controller instances 1305 and 1310.

The control layer 1335 of the controller instance 1310 then detects the addition of these records to the NIB 1350 and processes the records to generate or modify other records in the NIB 1350. In particular, the control layer 1335 generates LFP data. The virtualization layer 1340 in turn detects the modification and/or addition of these records in the NIB 1350 and modifies and/or generates other records in the NIB. These records represent the UPCP data in this example. These records then get sent to another controller instance that is managing at least one switching element that implements the particular LDPS.

The controller instance 1315 in this example is a controller instance that is managing the switching element 1370. The switching element implements at least part of the particular LDPS. The NOS 1360 of the controller instance 1315 receives the records representing the UPCP data from the NOS 1345 of the controller instance 1310. In some embodiments, the customization layer 1355 performs a conversion of the UPCP data to the CPCP data and pushes the CPCP data to the NIB 1365. The NOS 1360 of the controller instance 1315 then pushes the CPCP data to the managed switching element 1370.

In some embodiments, the controller instance 1315 just identifies a set of managed switching elements to which to send the received UPCP data and relays the UPCP data to the identified managed switching elements. The managed switching elements will perform the conversion of the UPCP data into the CPCP data. In this manner, the controller instance 1315 functions as an aggregation point to gather data to send to the managed switching elements that this controller instance is responsible for managing. In this example, the managed switching element 1370 is one of the switching elements managed by the controller instance 1315.

In some embodiments, the controller instances exchange API calls that specify requests for information inquires differently than the API calls that specify requests for configuring the LDPS. For instance, the controller instances do not use the NIBs and NOS' to send data records from one controller instance to another controller instance. Specifically, in this example, the controller instances establish communication channels (e.g., RPC channels) between them and exchange the data records that are translated from the API calls that specify the requests for information inquires over these channels without relying on the NIBs and NOS' of the controller instances.

B. Input Translation Layer

Figure 14:
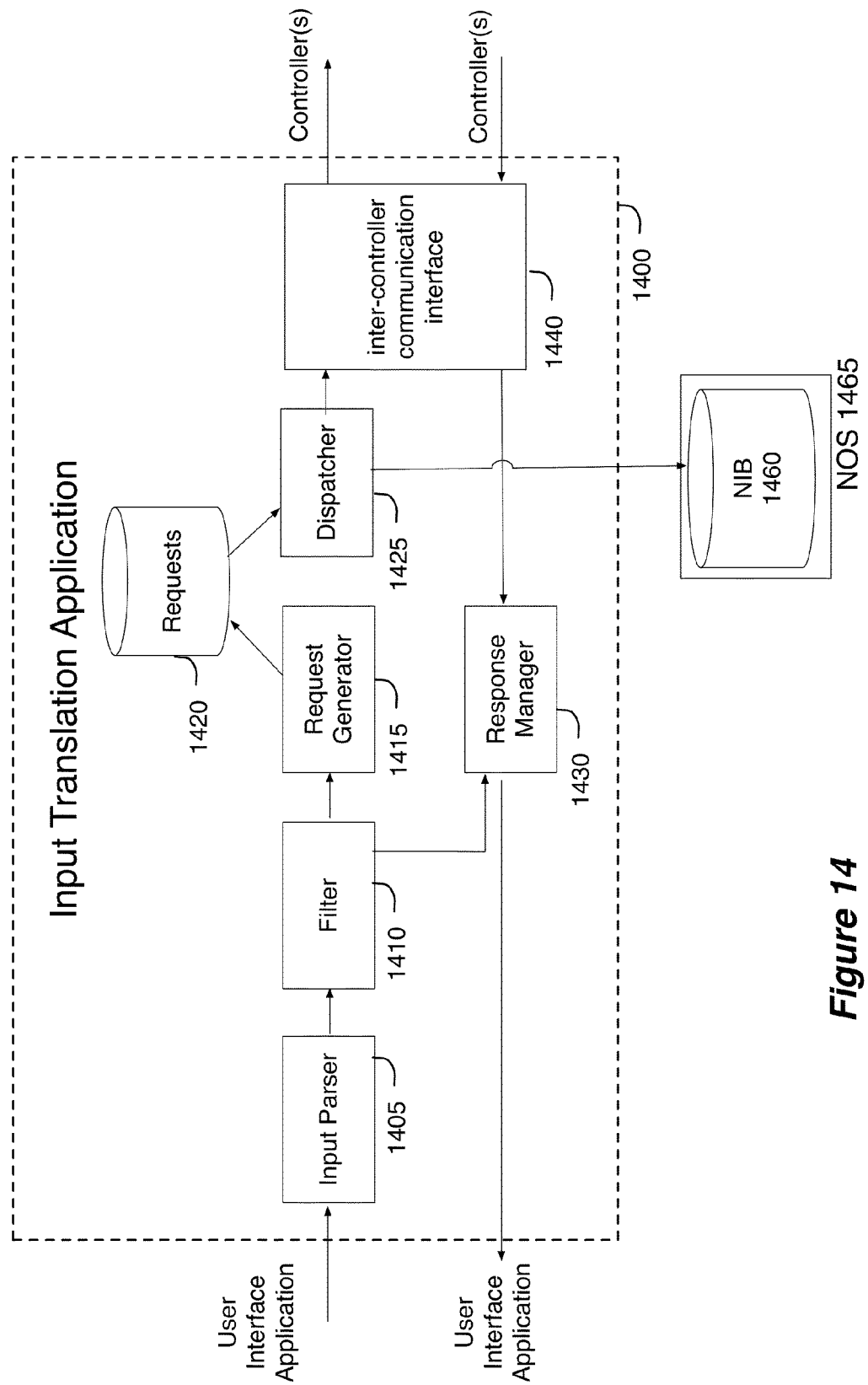
FIG. 14 conceptually illustrates software architecture for an input translation application.

FIG. 14 conceptually illustrates software architecture for an input translation application 1400. The input translation application of some embodiments functions as the input translation layer 1205 described above by reference to FIG. 12. In particular, the input translation application receives inputs from a user interface application that allows the user to enter input values. The input translation application then translates inputs into requests and then dispatches the requests to one or more controller instances that process the requests and send back responses to the input translation application. In some embodiments, the input translation application runs in the same controller instance in which a control layer runs, while in other embodiments the input translation application runs in a separate controller instance. In these other embodiments, the separate controller instance functions as the API controller. As shown in this figure, the input translation application includes an input parser 1405, a filter 1410, a request generator 1415, a requests repository 1420, a dispatcher 1425, a response manager 1430, and an inter-controller communication interface 1440. The input translation application 1605 resides on top of a NOS 1465 that contains a NIB 1460 that stores the data tuples generated by the input translation application 1400.

In some embodiments, the input translation application 1400 supports a set of API calls for specifying LDP sets and information inquires. In these embodiments, the user interface application that allows the user to enter input values sends the inputs in the form of API calls to the input translation application 1400. These API calls specify the LDPS (e.g., logical switch configuration specified by the user) and the user's information inquiry (e.g., network traffic statistics for the logical ports of the logical switch of the user). Also, the input translation application 1400 may get inputs from logical controllers, physical controllers and/or physical controllers as well as from another controller in which another input translation application runs in some embodiments.

The input parser 1405 of some embodiments receives inputs in the form of API calls from the user interface application. In some embodiments, the input parser extracts the user input values from the API calls and passes the input values to the filter 1410. The filter 1410 filters out the input values that do not conform to certain requirements. For instance, the filter 1410 filters out the input values that specify an invalid network address for a logical port. For those API calls that contain non-conforming input values, the response manager 1430 sends a response to the user indicating the inputs do no conform.

The request generator 1415 generates requests to be sent to one or more controller instances. As mentioned above, a first type of request is for configuring a particular LDPS (e.g., configuring a logical switching element or a logical router to be implemented in a set of managed switching elements) and a second type of request is for information inquires (e.g., network traffic statistics for the logical ports of the logical switch of the user). The request generator 1415 deposits the generated requests in the requests repository 1420.

The request generator 1415 of different embodiments generates requests according to different formats, depending on the types of request. For instance, when the requests specify configuration of the LDPS (e.g., LCP data), the request generator 1415 of some embodiments generates such requests in the form of records (e.g., data tuples). When the requests specify information inquiries, the request generator 1415 of some embodiments generates such requests in the form of the remote procedure calls (RPCs).

The dispatcher 1425 retrieves the generated requests. The dispatcher 1425 then either updates the NIB 1460 with the requests or sends the requests to the appropriate controller instances. In some embodiments, the dispatcher publishes the records containing the requests for configuring the particular LDPS to the NIB 1460, from which the NOS 1465 propagates the records to several other controller instances (e.g., logical controller). This data propagation from the NIB 1460 can be achieved through any of the different ways described above by reference to FIGS. 9 and 10.

For the requests that specify information inquires, the dispatcher 1425 of some embodiments identifies the controller instance to which each request should be sent. In some cases, the dispatcher looks at the LDPS associated with the request and identifies a controller instance that is the master of that LDPS. In some cases, the dispatcher identifies a master of a particular switching element (e.g., a physical controller) as a controller instance to send the request when the request is specifically related to a managed switching element (e.g., when the request is about statistical information of a logical port that is mapped to a port of the managed switching element). The dispatcher sends the request to the identified controller instance using the inter-controller communication interface 1440. The inter-controller communication interface 1440 establishes a communication channel (e.g., an RPC channel) with each of the other controller instances to facilitate data exchange (e.g., requests and responses) with other controllers.

When the receiving controller instances receive requests that specify information inquires, the controller instances process the requests and produce responses containing inquired information. The response manager 1430 receives the responses from the controller instances that processed requests through the channel(s) established by the inter-controller communication interface 1440. In some cases, more than one response may return for a request that was sent out. For instance, a request for statistical information from all logical ports of the logical switching element that the user is managing would return a response from each controller. The responses from multiple physical controller instances for multiple different switching elements whose ports are mapped to the logical ports may return to the input translation application 1400, either directly to the input translation application 1400 or through the master of the LDPS associated with the logical switch. In such cases, the response manager 1430 of some embodiments merges those responses and sends a single merged response to the user interface application.

C. Control Layer

Figure 15:
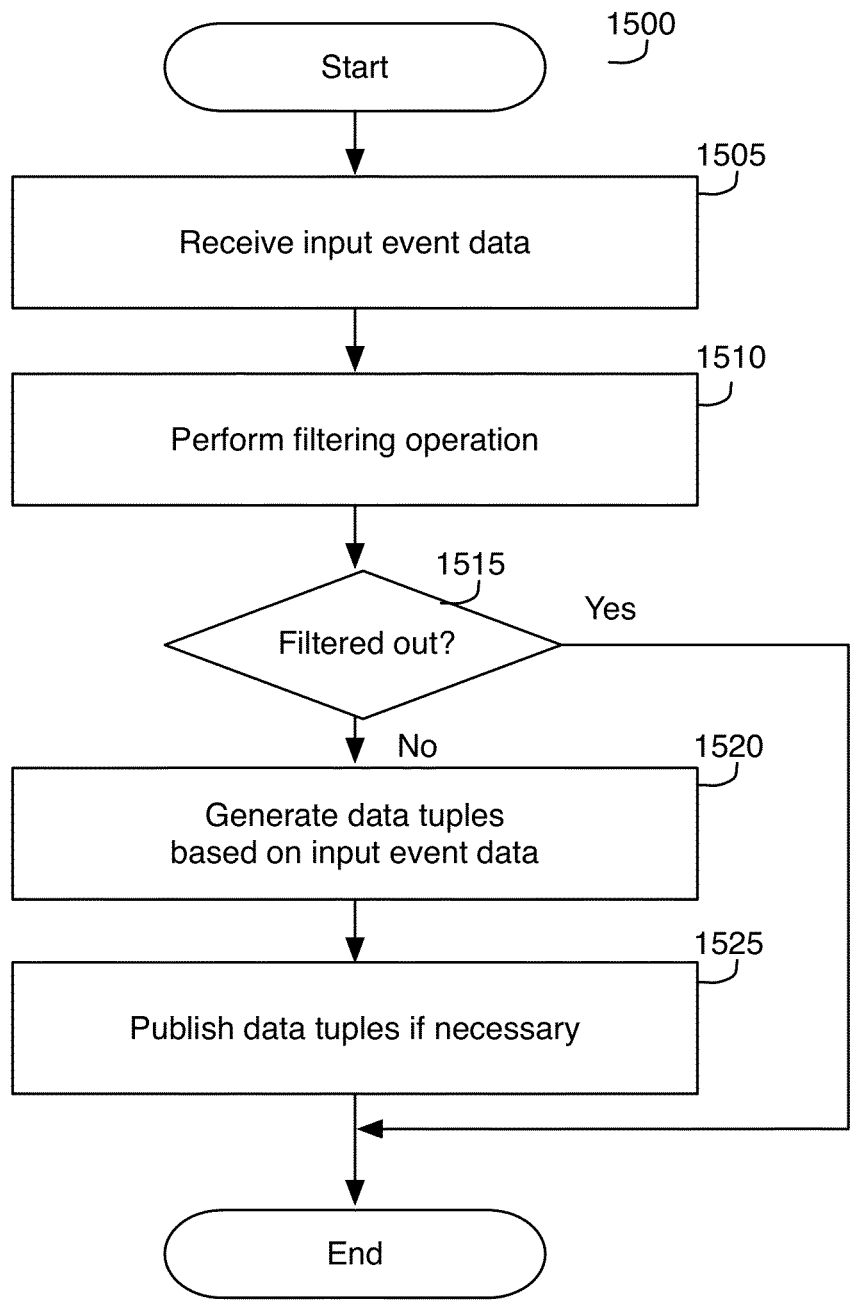
FIG. 15 conceptually illustrates an example conversion operations that an instance of a control application of some embodiments performs.

FIG. 15 conceptually illustrates an example conversion operation that a control layer of a controller instance of some embodiments performs. In some embodiments, a control application running in the controller instance functions as the control layer. This figure conceptually illustrates a process 1500 that the control application (e.g., the control application described above and below by reference to FIG. 16) performs to generate LFP data based on input event data that specifies the LCP data. As described above, in some embodiments, the generated LFP data is transmitted to the virtualization layer, which subsequently generates UPCP data from the LFP data. The UPCP data is propagated to the managed switching elements or to another controller instance that will convert the UPCP data into the CPCP data for the managed switching elements.

As shown in FIG. 15, the process 1500 initially receives (at 1505) data regarding an input event. The input event data may be logical data supplied by an input translation application that distributes the input event data to different controller instances. An example of user-supplied data could be LCP data including access control list data for a logical switch that the user manages. The input event data may also be LFP data that the control application generates, in some embodiments, from the LCP data. The input event data in some embodiments may also be UPCP data received from the virtualization application.

At 1510, the process 1500 then performs a filtering operation to determine whether this instance of the control application is responsible for the input event data. As described above, several instances of the control application may operate in parallel in several different controller instances to control multiple LDP sets in some embodiments. In these embodiments, each control application uses the filtering operation to filter out input data that does not relate to the LDPS that the control application is not responsible for managing. To perform this filtering operation, the control application of some embodiments includes a filter module. This module of some embodiments is a standalone module, while in other embodiments it is implemented by a table mapping engine (e.g., implemented by the join operations performed by the table mapping engine, such as an nLog table mapping engine) that maps event data between input tables and output tables of the control application, as further described below by reference to FIG. 16.

Next, at 1515, the process determines whether the filtering operation has filtered out the input event data. The filtering operation filters out the input event data in some embodiments when the input event data does not fall within one of the LDP sets that the control application is responsible for managing. When the process determines (at 1515) that the filtering operation has filtered out the input event data, the process ends. Otherwise, the process 1500 transitions to 1520.

At 1520, the process 1500 generates data tuples based on the filtered input event data. A converter of the control application, in some embodiments, generates one or more sets of data tuples based on the received input event data. In some embodiments, the converter is a table mapping engine that performs a series of table mapping operations on the input event data to map the input event data to other data tuples to modify existing data or generate new data. As mentioned above, this table mapping engine also performs the filtering operation in some embodiments. One example of such a table mapping engine is an nLog table-mapping engine which will be described below by reference to FIG. 16.

In some embodiments, the data tuples that the process 1500 generates may include data that the process has to push down to the NIB (e.g., LFP data). Accordingly, at 1525, the process publishes to the NIB any data tuples that it has generated if such publication is necessary. After 1525, the process ends.

Figure 16:
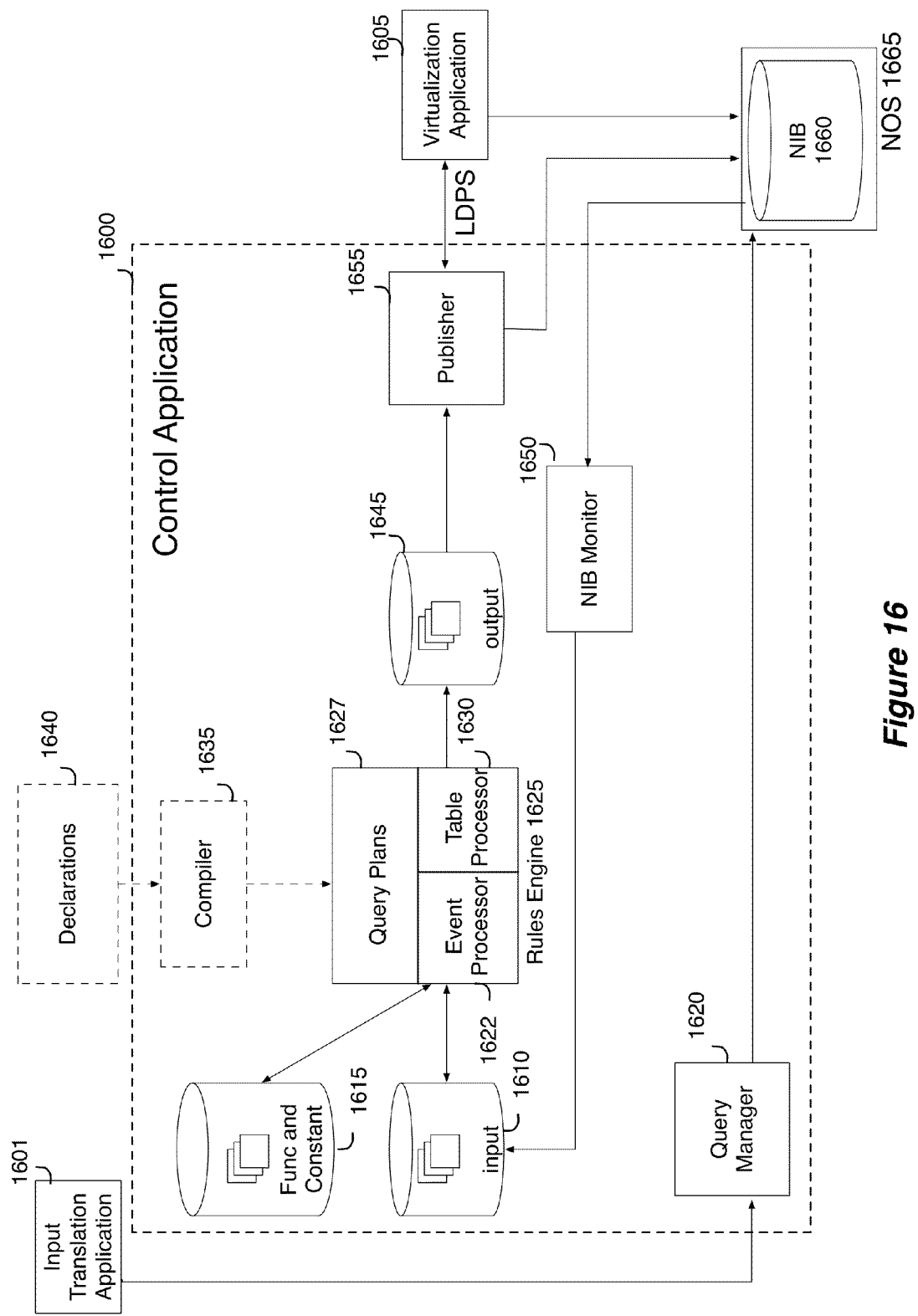
FIG. 16 illustrates a control application of some embodiments of the invention.

The control application in some embodiments performs its mapping operations by using the nLog table mapping engine, which is a variation of the datalog table mapping technique. FIG. 16 illustrates a control application 1600 of some embodiments of the invention. This application 1600 uses an nLog table mapping engine to map input tables that contain input data tuples to LDPS data tuples. This application resides on top of a virtualization application 1605 that receives the LDPS data tuples from the control application 1600 in some embodiments. The virtualization application 1605 also functions as a virtualization layer of a controller instance in some embodiments. The virtualization application 1605 maps the LDPS data tuples to data tuples for defining UPCP data. The virtual application 1605 resides on top of a NOS 1665 that contains a NIB 1660 that stores the data tuples generated by the virtualization application 1605.

In some embodiments, the control application is executed on the same machine with the virtualization application and the NOS. However, the control application, the virtualization application, and the NOS do not have to run on the same machine in other embodiments. That is, one of these applications or each of these applications may run on a different computer.

As shown in FIG. 16, the control application 1600 includes a set of rule-engine input tables 1610, a set of function and constant tables 1615, a query manager 1620, a rules engine 1625, a set of rule-engine output tables 1645, a NIB monitor 1650, a publisher 1655, and a compiler 1635. The compiler 1635 is one component of the application that operates at a different instance in time than the application's other components. The compiler operates when a developer needs to specify the rules engine for a particular control application and/or virtualized environment, whereas the rest of the application's modules operate at run time when the application interfaces with the control application and the NOS to deploy and monitor LDP sets specified by one or more users.

In some embodiments, the compiler 1635 takes a relatively small set (e.g., few hundred lines) of declarative instructions 1640 that are specified in a declarative language and converts these into a large set (e.g., thousands of lines) of code that specify the operation of the rules engine 1625, which performs the application's table mapping. As such, the compiler greatly simplifies the control application developer's process of defining and updating the control application. This is because the compiler allows the developer to use a high level programming language that allows a compact definition of the control application's complex mapping operation and to subsequently update this mapping operation in response to any number of changes (e.g., changes in the logical networking functions supported by the control application, changes to desired behavior of the control application, etc.).

In some embodiments, the rule-engine (RE) input tables 1610 include tables with logical data and/or switching configurations (e.g., access control list configurations, private virtual network configurations, port security configurations, etc.) specified by the user through the input translation application 1601 and/or the control application 1600. In some embodiments, the input tables 1610 also include tables that contain physical data from the switching elements managed by the network control system. In some embodiments, such physical data includes data regarding the managed switching elements (e.g., UPCP data and CPCP data) and other data regarding network configuration employed by the network control system to deploy the different LDPS' of the different users.

The RE input tables 1610 are partially populated by the LDPS data (e.g., LCP data) provided by the user. The control application 1600 of some embodiments receives the LDPS data from the input translation application 1601 through a communication channel (e.g., RPC channel). The control application 1600 also generates part of the LDPS data (e.g., LFP data) and physical (i.e., non-logical) data (e.g., physical control plane data) by monitoring the NIB to identify changes in the managed switching element infrastructure that would require modification to the LDPS data and/or the physical data.

In addition to the RE input tables 1610, the control application 1600 includes other miscellaneous tables 1615 that the rules engine 1625 uses to gather inputs for its table mapping operations. These tables 1615 include constant tables that store defined values for constants that the rules engine 1625 needs to perform its table mapping operations.

When the rules engine 1625 references constants, the corresponding value defined for the constants are actually retrieved and used. In addition, the values defined for constants in the constant table 1615 may be modified and/or updated. In this manner, the constant table 1615 provides the ability to modify the value defined for constants that the rules engine 1625 references without the need to rewrite or recompile code that specifies the operation of the rules engine 1625.

The tables 1615 further include function tables that store functions that the rules engine 1625 needs to use to calculate values needed to populate the output tables 1645. One example of such a function is a hash function that the rules engine uses to compute hash values for distributing distributed hash table (DHT) operations as well as load balancing traffic between lower level switches and higher level switches in a hierarchical switching architecture.

The rules engine 1625 performs table mapping operations that specify one manner for converting any LDPS within the LCP to a LDPS in the LFP. Whenever one of the rule-engine (RE) input tables is modified, the rules engine performs a set of table mapping operations that may result in the modification of one or more data tuples in one or more RE output tables. The modification of the output table data tuples, in turn, through the virtualization application 1605, may cause the NIB to be modified in order to establish and/or modify the implementation of a particular user's LDPS in the managed switching element infrastructure.

As shown in FIG. 16, the rules engine 1625 includes an event processor 1622, several query plans 1627, and a table processor 1630. Each query plan is a set of rules that specify a set of join operations that are to be performed upon the occurrence of a modification to one of the RE input table. Such a modification is referred to below as an input table event. In this example, each query plan is generated by the compiler 1635 from one declaratory rule in the set of declarations 1640. In some embodiments, more than one query plan is generated from one declaratory rule. In some embodiments, the query plans are defined by using the nLog declaratory language.

In some embodiments, the compiler 1635 does not just statically generate query plans but rather dynamically generates query plans based on performance data it gathers. The complier 1635 in these embodiments generates an initial set of query plans and lets the rules engine operate with the initial set of query plans. The control application gathers the performance data or receives performance feedbacks (e.g., from the rules engine). Based on this data, the compiler is modified so that the control application or a user of this application can have the modified compiler modify the query plans while the rules engine is not operating or during the operation of the rules engine.

For instance, the order of the join operations in a query plan may result in different execution times depending on the number of tables the rules engine has to select to perform each join operation. The compiler in these embodiments can be re-specified in order to re-order the join operations in a particular query plan when a certain order of the join operations in the particular query plan has resulted in a long execution time to perform the join operations.

The event processor 1622 of the rules engine 1625 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1622 detects an input table event when it receives notification from a RE input table that one of its records has changed.

In response to a detected input table event, the event processor 1622 (1) selects the appropriate query plan for the detected table event, and (2) directs the table processor 1630 to execute the query plan. To execute the query plan, the table processor 1630 in some embodiments performs the join operations specified by the query plan to produce one or more records that represent one or more sets of data values from one or more input and miscellaneous tables 1610 and 1615. The table processor 1630 of some embodiments then (1) performs a select operation to select a subset of the data values from the record(s) produced by the join operations, and (2) writes the selected subset of data values in one or more RE output tables 1645.

In some embodiments, the RE output tables 1645 store both logical and physical network element data attributes. The tables 1645 are called RE output tables as they store the output of the table mapping operations of the rules engine 1625. In some embodiments, the RE output tables can be grouped in several different categories. For instance, in some embodiments, these tables can be RE input tables and/or control-application (CA) output tables. A table is a RE input table when a change in the table causes the rules engine to detect an input event that requires the execution of a query plan. A RE output table 1645 can also be a RE input table 1610 that generates an event that causes the rules engine to perform another query plan. Such an event is referred to as an internal input event, and it is to be contrasted with an external input event, which is an event that is caused by a RE input table modification made by the control application 1600 or the NIB monitor 1650.

A table is a CA output table when a change in the table causes the publisher 1655 to publish a change to the virtualization application 1605 and/or to the NIB, as further described below. A table in the RE output tables 1645 can be a RE input table, a CA output table, or both a RE input table and a CA output table in some embodiments.

The publisher 1655 detects changes to the CA output tables of the RE output tables 1645. The publisher of different embodiments detects the occurrence of a CA output table event differently. In some embodiments, the publisher registers for callbacks with the CA output tables for notification of changes to the records of the CA output tables. In such embodiments, the publisher 1655 detects an output table event when it receives notification from a CA output table that one of its records has changed.

In response to a detected output table event, the publisher 1655 takes some or all of modified data tuples in the modified CA output tables and propagates this modified data tuple(s) to the input tables (not shown) of the virtualization application 1605. In some embodiments, instead of the publisher 1655 pushing the data tuples to the virtualization application, the virtualization application 1605 pulls the data tuples from the CA output tables 1645 into the input tables of the virtualization application. Alternatively, in some embodiments, the publisher 1655 publishes changes to the modified CA output tables to the NIB, and the virtualization application 1605 retrieves these changes from the NIB and based on them, modifies its input tables. In some embodiments, the CA output tables 1645 of the control application 1600 and the input tables of the virtualization 1605 may be identical. In yet other embodiments, the control and virtualization applications use one set of tables, so that the CA output tables are essentially virtualization application (VA) input tables.

Moreover, the publisher 1655 in some embodiments takes some or all of modified data tuples in the modified CA output tables and propagates this modified data tuple into the NIB 1660 through the APIs provided by the NOS 1665. Also, the publisher may push down logical data (e.g., LCP data, LFP data, etc.) processed and maintained by the control application 1600 to the NIB 1660. This is because, in some embodiments, the NIB 1660 serves as a medium for all communications between the control application, the virtualization application, and the NOS of different controller instances as described above by reference to FIG. 9.

As the CA output tables store both logical and physical network element data attributes in some embodiments, the NIB 1660 in some embodiments stores both logical and physical network element attributes that are identical to or derived by the virtualization application 1605 from the logical and physical network element data attributes in the output tables 1645. In other embodiments, however, the NIB only stores physical network element attributes that are identical to or derived by the virtualization application 1605 from the physical network element data attributes in the output tables 1645.

The NIB monitor 1650 interfaces with the NIB 1660 to receive notifications regarding changes to the NIB. The NIB monitor of different embodiments detects the occurrence of a change in the NIB differently. In some embodiments, the NIB monitor registers for callbacks with the NIB for notification of changes to one or more records in the NIB. In such embodiments, the NIB monitor 1650 detects a NIB change event when it receives notification from the NIB that one of its records has changed. In response to a detected NIB change event, the NIB monitor 1650 may modify one or more RE input tables 1610, which, in turn, may cause one or more RE input table events to occur that then initiates the execution of one or more query plans by the rules engine. In other words, the NIB monitor writes some or all of the information that it receives from the NIB into the input tables 1610, so that the state and configuration of the managed switching elements can be accounted for while generating the NIB data tuples through the mapping operations. Each time the managed switching configuration or underlying managed switching element state changes, the NIB monitor 1650 may update the input table records 1610 so that the generated NIB data tuples can be updated to reflect the modified switching configuration or underlying switching element state.

In some embodiments, the NIB monitor 1650 is a collection of input objects (or functions) associated with the RE input tables. Each input object in some embodiments is associated with one RE input table and is responsible for modifying its associated RE input table in response to a change in the NIB. Each input object in some embodiments registers with one or more NIB objects for callback notifications upon the occurrence of changes to the NIB object(s). Similarly, in some embodiments, the publisher 1655 is a collection of output objects (or functions) associated with the CA output tables. Each output object in some embodiments is associated with one CA output table and is responsible for propagating changes in its associated output table to the virtualization application 1605. As such, in some embodiments, the NIB monitor is a conceptual representation of the input and output objects that register with the NIB for callbacks.

The query manager 1620 uses an inter-controller communication interface (not shown) to interface with the control application 1600 to receive queries (e.g., information inquires) regarding LDPS data and send responses to the control application 1600. In some embodiments, these queries originate from the input translation application 1601, which receives these queries from the user. As shown in FIG. 16, the query manager 1620 of some embodiments also interfaces with the NIB 1660 in order to query the NIB to provide the control application state information regarding the network elements in the LDPS' for the different users. In other embodiments, however, the query manager 1620 queries the output tables 1645 to obtain LDPS data for the control application.

D. Virtualization and Customization Layers

Figure 17:
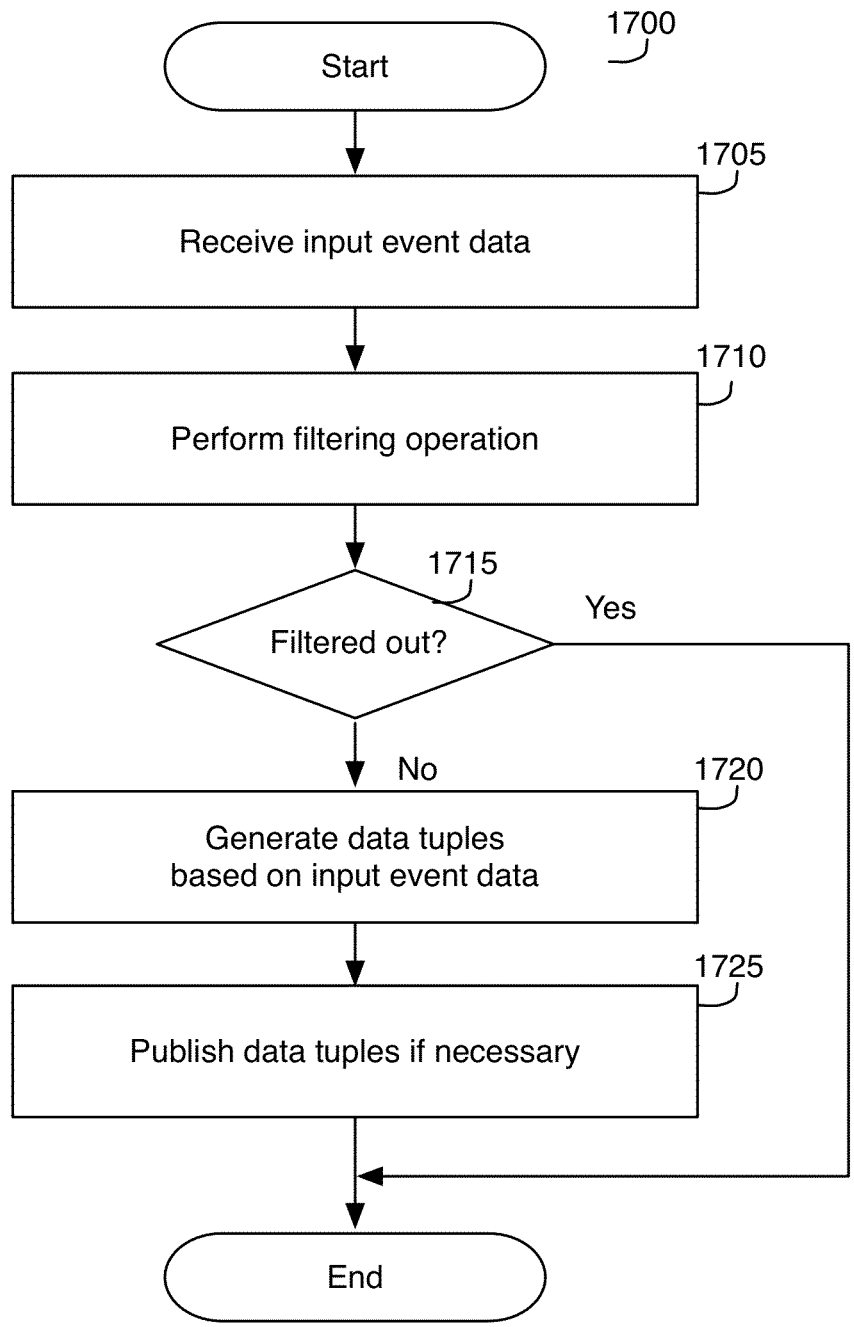
FIG. 17 conceptually illustrates an example of conversion operations that the virtualization application of some embodiments performs.

FIG. 17 conceptually illustrates an example of conversion operations that the virtualization application of some embodiments performs. This figure conceptually illustrates a process 1700 that the virtualization application of some embodiments (e.g., the virtualization application described above and below by reference to FIG. 18) performs to generate data tuples based on input event data. In some embodiments, the virtualization application functions as a virtualization layer and/or a customization layer of a controller instance. As shown in FIG. 17, the process 1700 initially receives (at 1705) data regarding an input event. The input event data may be LFP data that the control application generates in some embodiments from the LCP data. The input event data for the virtualization application in some embodiments may also be UPCP data, CPCP data, or physical forwarding plane data.

At 1710, the process 1700 then performs a filtering operation to determine whether this instance of the virtualization application is responsible for the input event data. As described above, several instances of the virtualization application may operate in parallel to control multiple sets of LDP sets in some embodiments. In these embodiments, each virtualization application uses the filtering operation to filter out input data that does not relate to the virtualization application's LDP sets. Also, the virtualization application of some embodiments filters out input data that does not relate to the managed switching elements that this instance of the virtualization application is responsible for managing.

To perform this filtering operation, the virtualization application of some embodiments includes a filter module. This module in some embodiments is a standalone module, while in other embodiments it is implemented by a table mapping engine (e.g., implemented by the join operations performed by the table mapping engine, such as an nLog table mapping engine) that maps records between input tables and output tables of the virtualization application, as further described below by reference to FIG. 18.

Next, at 1715, the process determines whether the filtering operation has filtered out the received input event data. As mentioned above, the instance of the virtualization application filters out the input data when the input data is related to a LDPS that is not one of the LDP sets of which the virtualization application is the master or when the data is for a managed switching element that is not one of the managed switching elements of which the virtualization application is the master. When the process determines (at 1715) that the filtering operation has filtered out the input event, the process ends. Otherwise, the process 1700 transitions to 1720.

At 1720, the process 1700 generates data tuples based on the filtered input event data. A converter of the virtualization application, in some embodiments, generates one or more sets of data tuples based on the received input event data. In some embodiments, the converter is a table mapping engine that performs a series of table mapping operations on the input event data to map the input event data to other data tuples. As mentioned above, this table mapping engine also performs the filtering operation in some embodiments. One example of such a table mapping engine is an nLog table-mapping engine which will be further described further below by reference to FIG. 18.

In some embodiments, the data tuples that the process 1700 generates may include data that the process has to push down to the NIB (e.g., LFP data). Accordingly, at 1725, the process publishes to the NIB any data tuples that it has generated if such publication is necessary. After 1725, the process ends.

Figure 18:
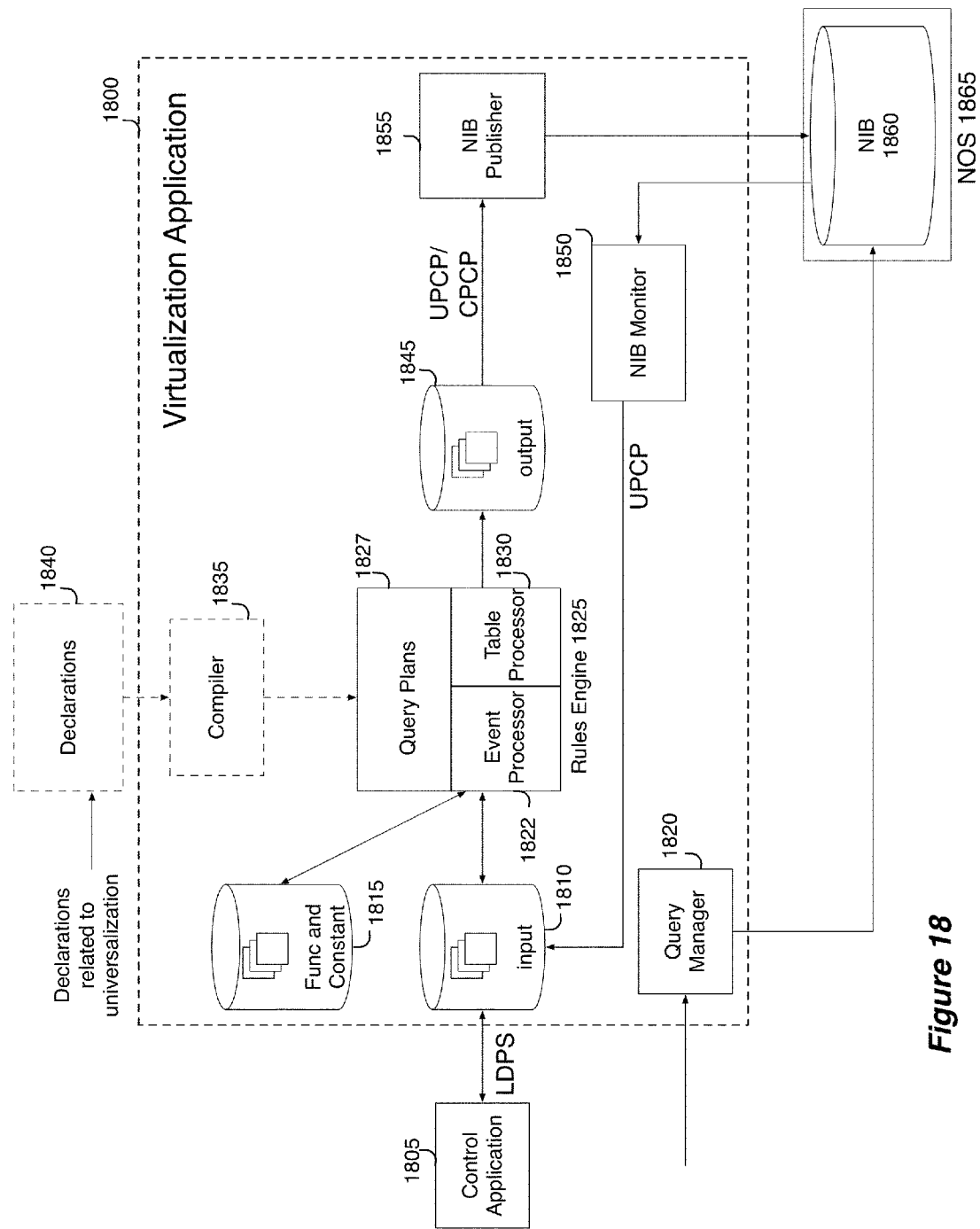
FIG. 18 illustrates a virtualization application of some embodiments of the invention.

FIG. 18 illustrates a virtualization application 1800 of some embodiments of the invention. This application 1800 is used in some embodiments as the virtualization module 1030 of FIG. 10. The virtualization application 1800 uses an nLog table mapping engine to map input tables that contain LDPS data to data tuples that represent UPCP data. This application resides below a control application 1805 that generates LDPS data tuples in some embodiments.

More specifically, the control application 1805 allows different users to define different LDP sets, which specify the desired configuration of the logical switches that the users manage. The control application 1805 through its mapping operations converts data for each LDPS of each user into a set of data tuples that specify the LFP data for the logical switch associated with the LDPS. In some embodiments, the control application is executed on the same host on which the virtualization application 1800 is executed. The control application and the virtualization application do not have to run on the same machine in other embodiments.

As shown in FIG. 18, the virtualization application 1800 includes a set of rule-engine input tables 1810, a set of function and constant tables 1815, a query manager 1820, a rules engine 1825, a set of rule-engine output tables 1845, a translator 1850, a NIB Publisher 1855, a PTD 1860, and a compiler 1835.

The compiler 1835 is similar to the compiler 1635 described above by reference to FIG. 16. In some embodiments, the rule-engine (RE) input tables 1810 include tables with logical data and/or switching configurations (e.g., access control list configurations, private virtual network configurations, port security configurations, etc.) specified by the user and/or the virtualization application. In some embodiments, the input tables 1810 also include tables that contain physical data (i.e., non-logical data) from the switching elements managed by the network control system. In some embodiments, such physical data includes data regarding the managed switching elements (e.g., UPCP data and CPCP data) and other data regarding network configuration employed by the network control system to deploy the different LDP sets of the different users.

In order for the virtualization application 1800 to map the LDPS data tuples to UPCP data tuples, the developer in some embodiments specifies in a declarative language the declarative instructions 1840 which include the instructions for mapping the LDPS data tuples to UPCP data tuples for some managed switching elements. In some such embodiments, these switching elements include UPCPs to convert the UPCP data to the CPCP data.

For other managed switching elements, the virtualization application 1800 maps the LDPS data tuples to CPCP data tuples that are specific to each managed switching elements that do not have UPCPs. In some embodiments, when the virtualization application 1800 receives UPCP data from the virtualization application of another controller instance, the virtualization application 1800 further maps the UPCP data tuples in the output tables 1840 to the CPCP data tuples for some managed switching elements that do not have UPCPs to convert the UPCP data tuples to the physical datapath set data tuples.

The RE input tables 1810 are partially populated by the LDPS data (e.g., by LFP data) provided by the control application 1805. The control application generates part of the LDPS data based on user input regarding the LDP sets.

In addition to the RE input tables 1810, the virtualization application 1800 includes other miscellaneous tables 1815 that the rules engine 1825 uses to gather inputs for its table mapping operations. These tables 1815 include constant tables that store defined values for constants that the rules engine 1825 needs to perform its table mapping operations.

When the rules engine 1825 references constants, the corresponding value defined for the constants are actually retrieved and used. In addition, the values defined for constants in the constant table 1815 may be modified and/or updated. In this manner, the constant tables 1815 provide the ability to modify the value defined for constants that the rules engine 1825 references without the need to rewrite or recompile code that specifies the operation of the rules engine 1825. The tables 1815 further include function tables that store functions that the rules engine 1825 needs to use to calculate values needed to populate the output tables 1845.

The rules engine 1825 performs table mapping operations that specify one manner for implementing the LDP sets within the managed switching element infrastructure. Whenever one of the RE input tables is modified, the rules engine performs a set of table mapping operations that may result in the modification of one or more data tuples in one or more RE output tables.

As shown in FIG. 18, the rules engine 1825 includes an event processor 1822, several query plans 1827, and a table processor 1830. In some embodiments, each query plan is a set of join operations that are to be performed upon the occurrence of a modification to one of the RE input tables. Such a modification is referred to below as an input table event. In this example, each query plan is generated by the compiler 1835 from one declaratory rule in the set of declarations 1840. In some embodiments, more than one query plan is generated from one declaratory rule as described above. In some embodiments, the query plans are defined by using the nLog declaratory language.

The event processor 1822 of the rules engine 1825 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1822 detects an input table event when it receives notification from an RE input table that one of its records has changed.

In response to a detected input table event, the event processor 1822 (1) selects the appropriate query plan for the detected table event, and (2) directs the table processor 1830 to execute the query plan. To execute the query plan, the table processor 1830 in some embodiments performs the join operations specified by the query plan to produce one or more records that represent one or more sets of data values from one or more input and miscellaneous tables 1810 and 1815. The table processor 1830 of some embodiments then (1) performs a select operation to select a subset of the data values from the record(s) produced by the join operations, and (2) writes the selected subset of data values in one or more RE output tables 1845.

In some embodiments, the RE output tables 1845 store both logical and physical network element data attributes. The tables 1845 are called RE output tables as they store the output of the table mapping operations of the rules engine 1825. In some embodiments, the RE output tables can be grouped in several different categories. For instance, in some embodiments, these tables can be RE input tables and/or virtualization-application (VA) output tables. A table is an RE input table when a change in the table causes the rules engine to detect an input event that requires the execution of a query plan. A RE output table 1845 can also be an RE input table 1810 that generates an event that causes the rules engine to perform another query plan after it is modified by the rules engine. Such an event is referred to as an internal input event, and it is to be contrasted with an external input event, which is an event that is caused by an RE input table modification made by the control application 1805 or the NIB monitor 1850.

A table is a VA output table when a change in the table causes the NIB Publisher 1855 to publish a change to the NIB 1860. In some embodiments, a table in the RE output tables 1845 can be an RE input table 1810, a VA output table, or both an RE input table 1810 and a VA output table in some embodiments.

The NIB publisher 1855 detects changes to the VA output tables of the RE output tables 1845. The NIB publisher of different embodiments detects the occurrence of a VA output table event differently. In some embodiments, the NIB publisher registers for callbacks with the VA output tables for notification of changes to the records of the VA output tables. In such embodiments, the NIB publisher 1855 detects an output table event when it receives notification from a VA output table that one of its records has changed.

In response to a detected output table event, the NIB publisher 1855 takes each modified data tuple in the modified VA output tables and propagates this modified data tuple into the NIB 1860 through the APIs provided by the NOS 1865. After a new data tuple is propagated to the NIB by the NIB publisher 1855, the NOS 1865 propagates, if needed, a NIB data tuple that was modified because of the propagated VA output table data tuple to one or more of the managed switching elements. In doing this, the NOS completes the deployment of the LDPS (e.g., one or more logical switching configurations) to one or more managed switching elements as specified by the NIB records.

As the VA output tables store both logical and physical network element data attributes in some embodiments, the NIB 1860 in some embodiments stores both logical and physical network element attributes that are identical to or derived from the logical and physical network element data attributes in the output tables 1845. In other embodiments, however, the NIB only stores physical network element attributes that are identical to or derived from the physical network element data attributes in the output tables 1845.

The NIB monitor 1850 interfaces with the NIB 1860 to receive notifications regarding changes to the NIB. The NIB monitor of different embodiments detects the occurrence of a change in the NIB differently. In some embodiments, the NIB monitor registers for callbacks with the NIB for notification of changes to one or more records in the NIB. In such embodiments, the NIB monitor 1850 detects NIB change event when it receives notification from the NIB that one of its records has changed. In response to a detected NIB change event, the NIB monitor 1850 may modify one or more RE input tables 1810, which, in turn, may cause one or more RE input table event to occur that then initiates the execution of one or more query plans by the rules engine. In other words, the NIB monitor writes some or all of the information that it receives from the NIB into the input tables 1810, so that the state and configuration of the managed switching elements can be accounted for while generating the NIB data tuples through the mapping operations. Each time the managed switching configuration or underlying managed switching element state changes, the NIB monitor 1850 may update the input table records 1810 so that the generated NIB data tuples can be updated to reflect the modified switching configuration or underlying switching element state.

In some embodiments, the NIB monitor 1850 is a collection of input objects (or functions) associated with the RE input tables. Each input object in some embodiments is associated with one RE input table and is responsible for modifying its associated input table in response to a change in the NIB. Each input object in some embodiments registers with one or more NIB objects for callback notifications upon the occurrence of changes to the NIB object(s). Similarly, in some embodiments, the NIB publisher 1855 is a collection of output objects (or functions) associated with the VA output tables. Each output object in some embodiments is associated with one VA output table and is responsible for propagating changes in its associated output table to the NIB. As such, in some embodiments, the NIB monitor is a conceptual representation of the input and output objects that register with the NIB for callbacks.

The query manager 1820 of some embodiments uses an inter-controller communication interface to interfaces with an input translation application (not shown) to receive queries (e.g., information inquires) regarding LDPS data and send responses to the input translation application. As shown in FIG. 18, the manager 1820 of some embodiments also interfaces with the NIB 1860 in order to query the NIB to provide the virtualization application state information (e.g., responses to requests that specify information inquires originated from the user) regarding the network elements in the LDPS' for the different user. In other embodiments, however, the query manager 1820 queries the output tables 1845 to obtain LDPS data for the control application.

In some embodiments, an instance of the virtualization application 1800 of a logical controller generates UPCP data and passes it to another instance of the virtualization application 1800 of a physical controller. In some such embodiments, the virtualization application instance of the physical controller does not convert the UPCP data into the CPCP data for those managed switching elements that can covert the UPCP data into the CPCP data specific to the switching elements. The virtualization application instance of the physical controller converts the UPCP data into the CPCP data for those managed switching elements that cannot covert the UPCP data into the CPCP data specific to the switching elements.

E. Rules Engine

In some embodiments, the control application 1600 and the virtualization application 1800 use a variation of the datalog database language, called nLog, to create the table mapping engine that maps input tables containing logical datapath data and switching element attributes to the output tables. Like datalog, nLog provides a few declaratory rules and operators that allow a developer to specify different operations that are to be performed upon the occurrence of different events. In some embodiments, nLog provides a smaller subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to respond to an event into several sets of database join operations. Collectively the larger set of rules forms the table mapping, rules engine that is referred to below as the nLog engine.

Figure 19:
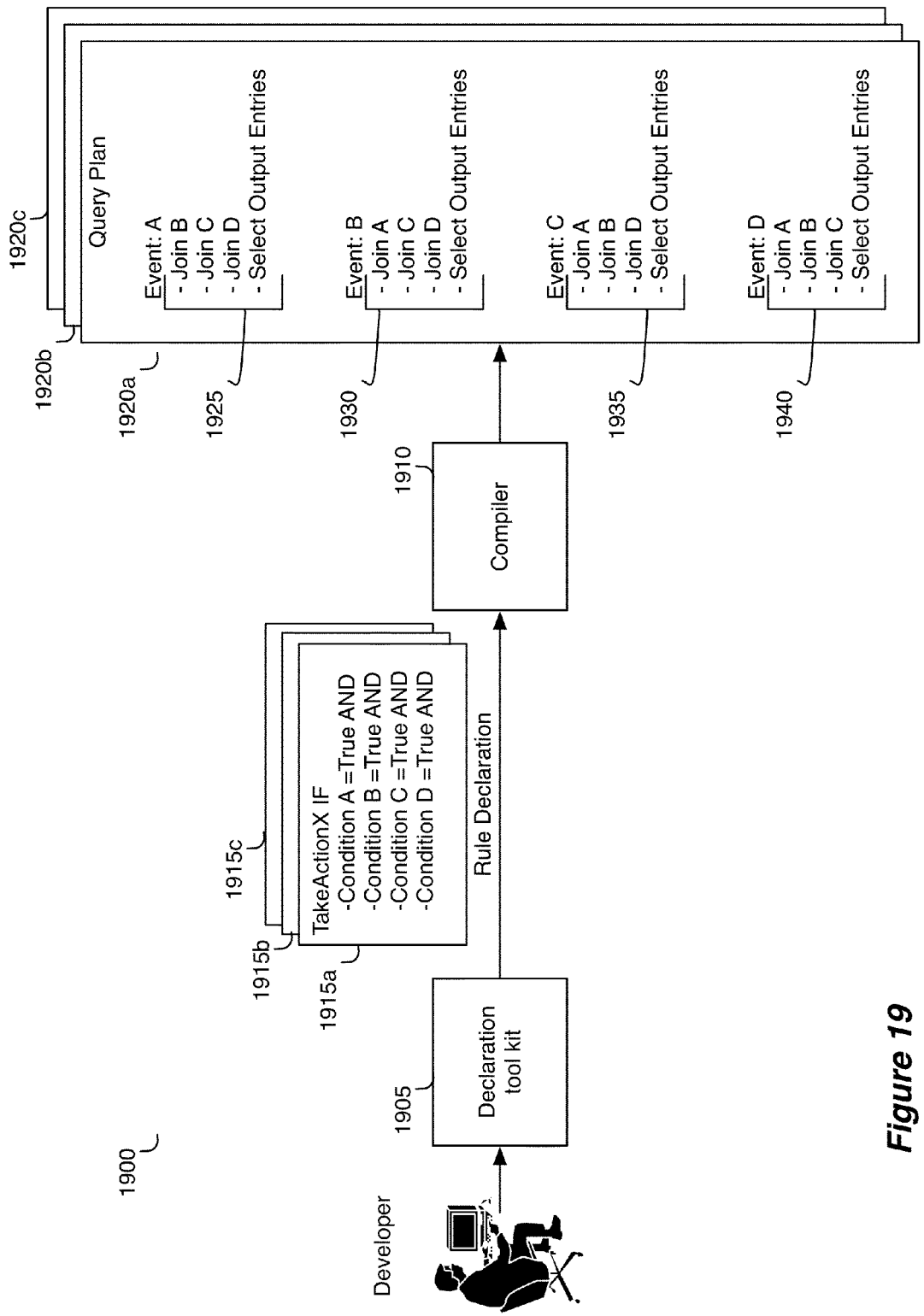
FIG. 19 illustrates a development process that some embodiments employ to develop a rules engine.

FIG. 19 illustrates a development process 1900 that some embodiments employ to develop the rules engine 1825 of the virtualization application 1800. As shown in this figure, this process uses a declaration toolkit 1905 and a compiler 1910. The toolkit 1905 allows a developer (e.g., a developer of a control application 1805 that operates on top of the virtualization application 1800) to specify different sets of rules to perform different operations upon the occurrence of different sets of conditions.

One example 1915 of such a rule is illustrated in FIG. 19. This example is a multi-conditional rule that specifies that an Action X has to be taken if four conditions A, B, C, and D are true. The expression of each condition as true in this example is not meant to convey that all embodiments express each condition for each rule as True or False. For some embodiments, this expression is meant to convey the concept of the existence of a condition, which may or may not be true. For example, in some such embodiments, the condition "A=True" might be expressed as "Is variable Z=A?" In other words, A in this example is the value of a parameter Z, and the condition is true when Z has a value A.

Irrespective of how the conditions are expressed, a multi-conditional rule in some embodiments specifies the taking of an action when certain conditions in the network are met. Examples of such actions include creation or deletion of new packet flow entries, creation or deletion of new network constructs, modification to use of existing network constructs, etc. In the virtualization application 1800, these actions are often implemented by the rules engine 1825 by creating, deleting, or modifying records in the output tables, which are then propagated to the NIB by the NIB publisher 1855.

As shown in FIG. 19, the multi-conditional rule 1915 uses only the AND operator to express the rule. In other words, each of the conditions A, B, C and D has to be true before the Action X is to be taken. In some embodiments, the declaration toolkit 1905 only allows the developers to utilize the AND operator because excluding the other operators (such as ORs, XORs, etc.) that are allowed by datalog allows nLog to operate faster than datalog.

The compiler 1910 converts each rule specified by the declaration toolkit 1905 into a query plan 1920 of the rules engine. FIG. 19 illustrates the creation of three query plans 1920*a*-1920*c* for three rules 1915*a*-1915*c*. Each query plan includes one or more sets of join operations. Each set of join operations specifies one or more join operations that are to be performed upon the occurrence of a particular event in a particular RE input table, where the particular event might correspond to the addition, deletion, or modification of an entry in the particular RE input table.

In some embodiments, the compiler 1910 converts each multi-conditional rule into several sets of join operations, with each set of join operations being specified for execution upon the detection of the occurrence of one of the conditions. Under this approach, the event for which the set of join operations is specified is one of the conditions of the multi-conditional rule. Given that the multi-conditional rule has multiple conditions, the compiler in these embodiments specifies multiple sets of join operations to address the occurrence of each of the conditions.

FIG. 19 illustrates this conversion of a multi-conditional rule into several sets of join operations. Specifically, it illustrates the conversion of the four-condition rule 1915 into the query plan 1920a, which has four sets of join operations. In this example, one join-operation set 1925 is to be performed when condition A occurs, one join-operation set 1930 is to be performed when condition B occurs, one join-operation set 1935 is to be performed when condition C occurs, and one join-operation set 1940 is to be performed when condition D occurs.

These four sets of operations collectively represent the query plan 1920a that the rules engine 1825 performs upon the occurrence of a RE input table event relating to any of the parameters A, B, C, or D. When the input table event relates to one of these parameters (e.g., parameter B) but one of the other parameters (e.g., parameters A, C, and D) is not true, then the set of join operations fails and no output table is modified. But, when the input table event relates to one of these parameters (e.g., parameter B) and all of the other parameters (e.g., parameters A, C, and D) are true, then the set of join operations does not fail and an output table is modified to perform the action X. In some embodiments, these join operations are internal join operations. In the example illustrated in FIG. 19, each set of join operations terminates with a select command that selects entries in the record(s) resulting from the set of join operations to output to one or more output tables.

To implement the nLog engine in a distributed manner, some embodiments partition management of LDP sets by assigning the management of each LDPS to one controller instance. This partition management of the LDPS is also referred to as serialization of management of the LDPS. The rules engine 1825 of some embodiments implements this partitioned management of the LDPS by having a join to the LDPS entry be the first join in each set of join operations that is not triggered by an event in a LDPS input table.

Figure 20:
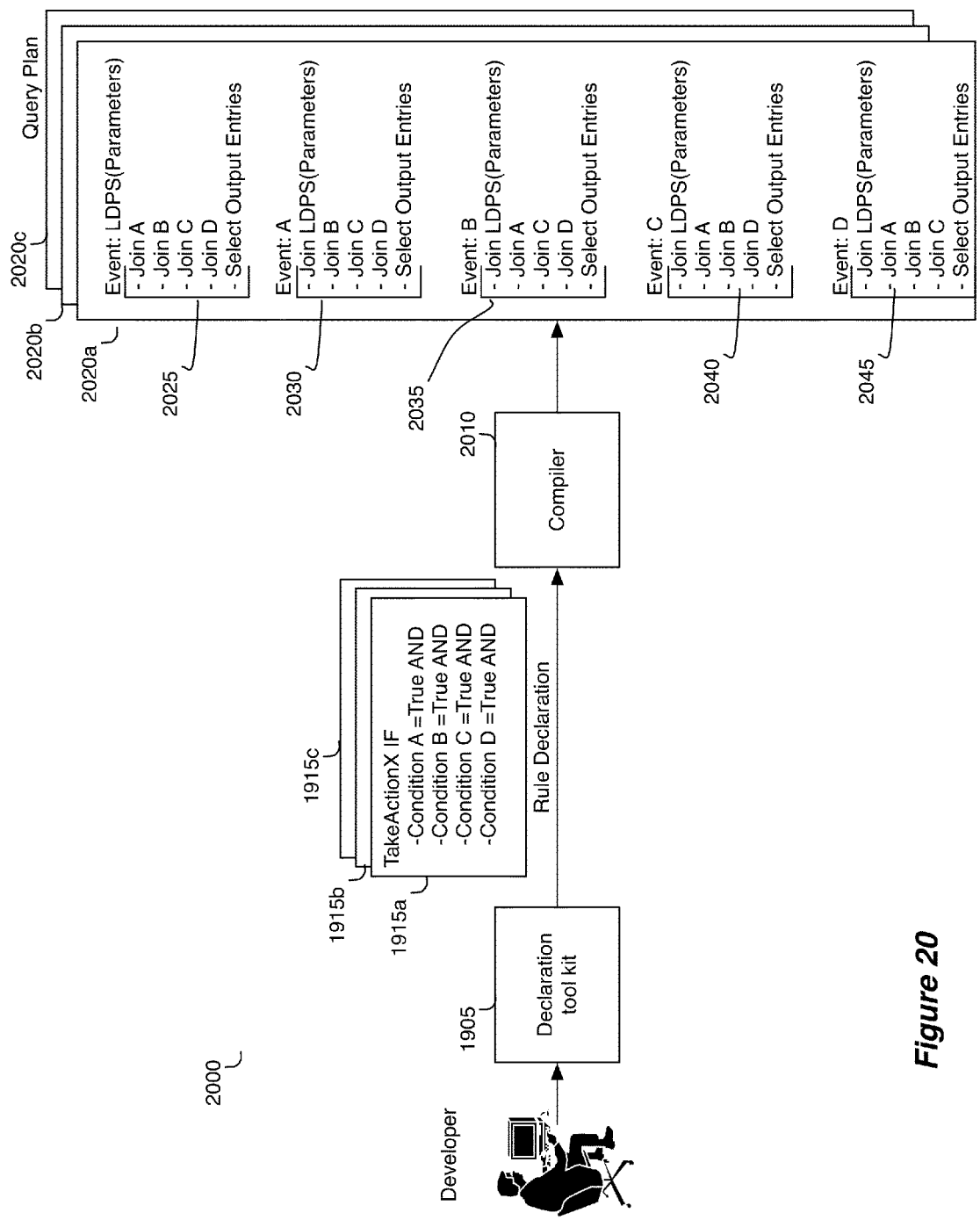
FIG. 20 illustrates that the rules engine of some embodiments implements partitioned management of logical data path sets (LDPS').

FIG. 20 illustrates one such approach. Specifically, for the same four-condition rule 1915a illustrated in FIG. 19, it generates a different query plan 2020a. This query plan is part of three query plans 2020a-2020c that this figure shows the compiler 2010 generating for the three rules 1915a-1915c specified through the declaration toolkit 1905. Like the query plan 1920a that has four sets of join operations 1925, 1930, 1935 and 1940 for the four-condition rule 1915a, the query plan 2020a also has four sets of join operations 2030, 2035, 2040 and 2045 for this rule 1915a.

The four sets of join operations 2030, 2035, 2040 and 2045 are operational sets that are each to be performed upon the occurrence of one of the conditions A, B, C, and D. The first join operation in each of these four sets 2030, 2035, 2040 and 2045 is a join with the LDPS table managed by the virtualization application instance. Accordingly, even when the input table event relates to one of these four parameters (e.g., parameter B) and all of the other parameters (e.g., parameters A, C, and D) are true, the set of join operations may fail if the event has occurred for a LDPS that is not managed by this virtualization application instance. The set of join operations does not fail and an output table is modified to perform the desire action only when (1) the input table event relates to one of these four parameters (e.g., parameter B), all of the other parameters (e.g., parameters A, C, and D) are true, and (3) the event relates to a LDPS that is managed by this virtualization application instance.

Figure 21:
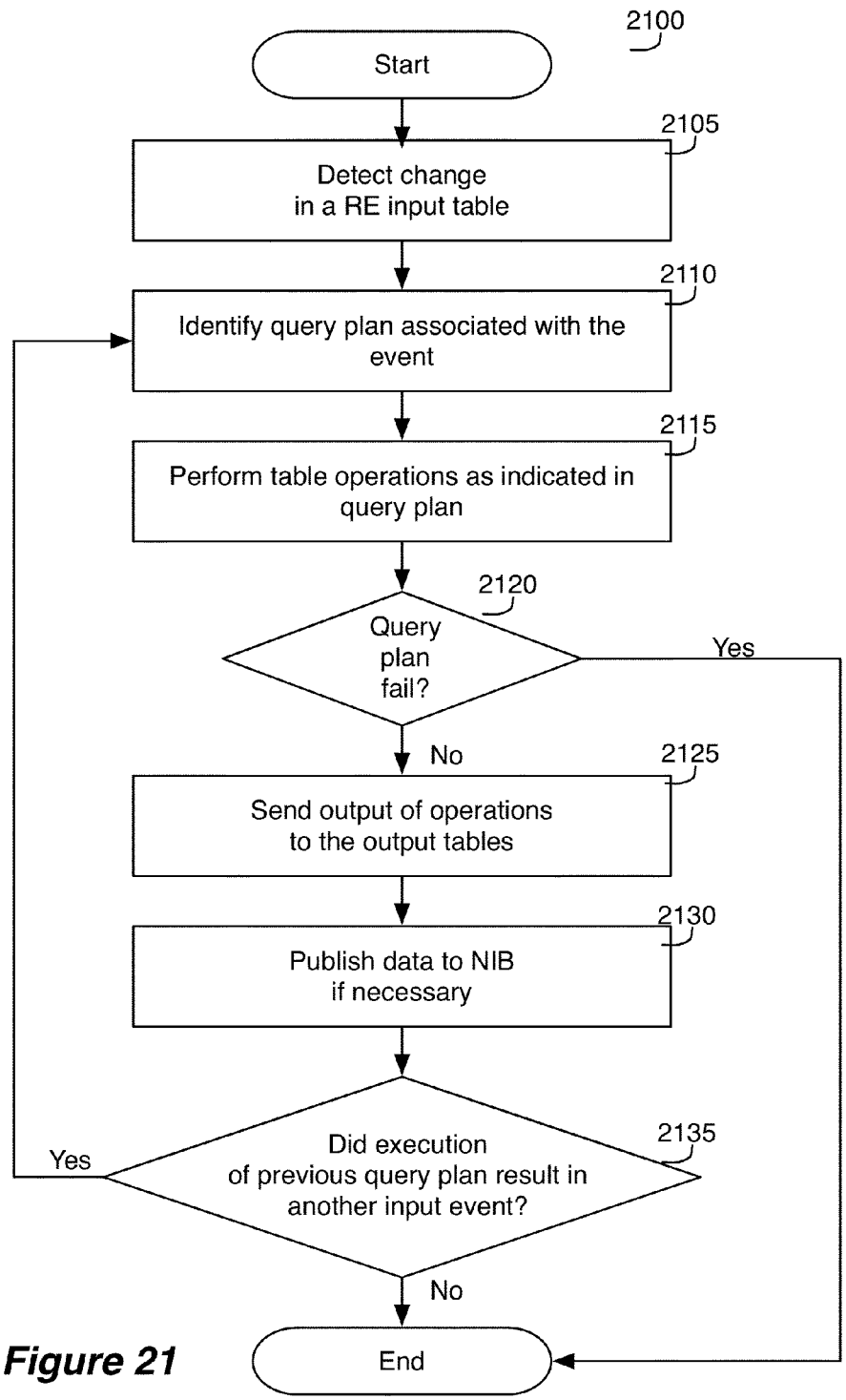
FIG. 21 illustrates a conceptual process that the virtualization application of some embodiments performs each time a record in a RE input table changes.

FIG. 21 conceptually illustrates a process 2100 that the virtualization application 1800 performs in some embodiments each time a record in a RE input table changes. This change may be a change made through the control application 1805. Alternatively, it may be a change that is made by the NIB monitor 1850 after it receives from the NIB a notification regarding a change in the NIB. The change to the RE input table record can entail the addition, deletion, or modification of the record.

As shown in FIG. 21, the process 2100 initially detects (at 2105) a change in a RE input table 1810. In some embodiments, the event processor 1822 is the module that detects this change. Next, at 2110, the process 2100 identifies the query plan associated with the detected RE input table event. As mentioned above, each query plan in some embodiments specifies a set of join operations that are to be performed upon the occurrence of an input table event. In some embodiments, the event processor 1822 is also the module that performs this operation (i.e., is the module that identifies the query plan).

At 2115, the process 2100 executes the query plan for the detected input table event. In some embodiments, the event processor 1822 directs the table processor 1830 to execute the query plan. To execute a query plan that is specified in terms of a set of join operations, the table processor 1830 in some embodiments performs the set of join operations specified by the query plan to produce one or more records that represent one or more sets of data values from one or more input and miscellaneous tables 1810 and 1815.

Figure 22:
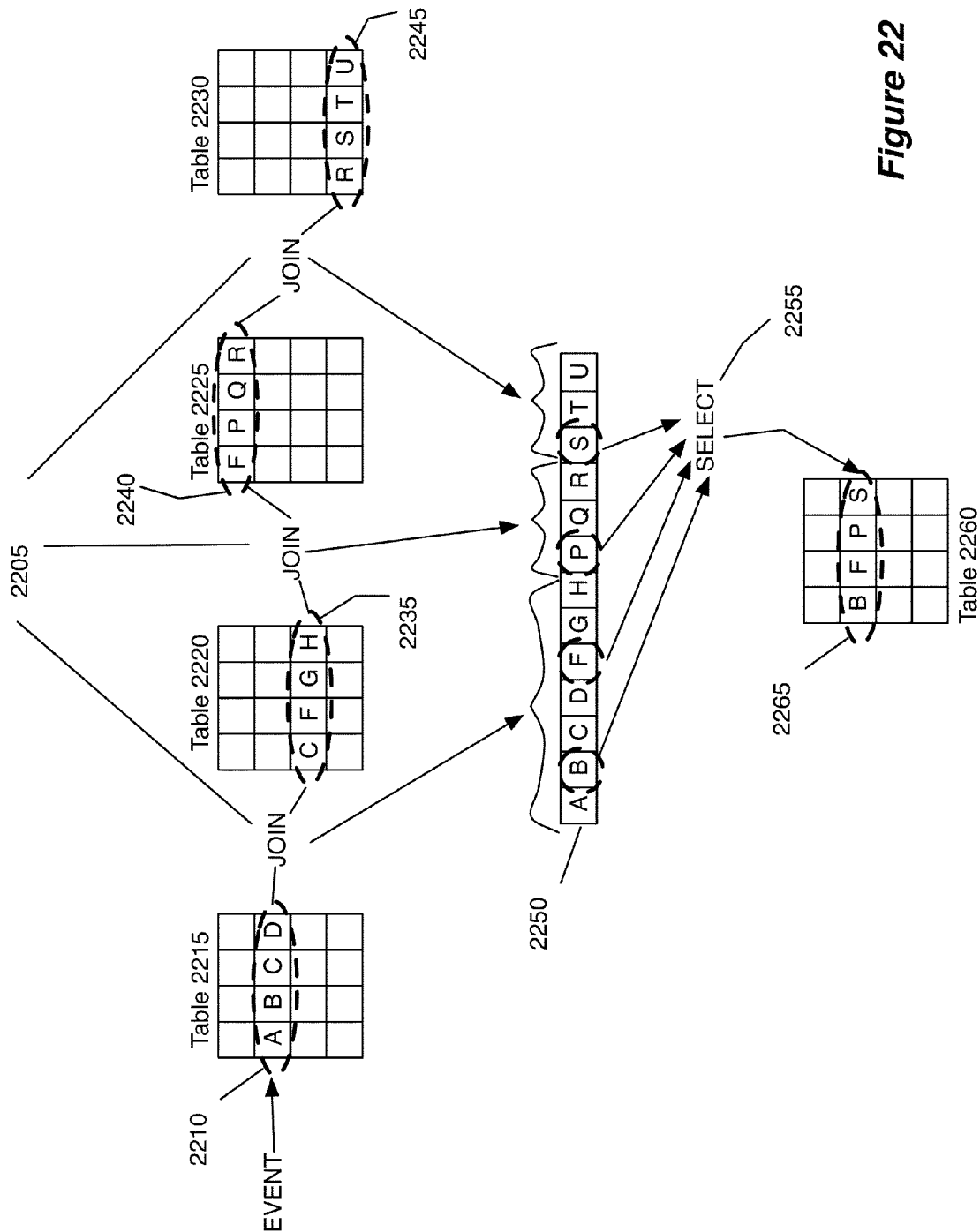
FIG. 22 illustrates an example of a set of join operations.

FIG. 22 illustrates an example of a set of join operations 2205. This set of join operations is performed when an event is detected with respect to record 2210 of an input table 2215. The join operations in this set specify that the modified record 2210 in table 2215 should be joined with the matching record(s) in table 2220. This joined record should then be joined with the matching record(s) in table 2225, and this resulting joined record should finally be joined with the matching record(s) in table 2230.

Two records in two tables "match" when values of a common key (e.g., a primary key and a foreign key) that the two tables share are the same, in some embodiments. In the example in FIG. 22, the records 2210 and 2235 in tables 2215 and 2220 match because the values C in these records match. Similarly, the records 2235 and 2240 in tables 2220 and 2225 match because the values F in these records match. Finally, the records 2240 and 2245 in tables 2225 and 2230 match because the values R in these records match. The joining of the records 2210, 2235, 2240, and 2245 results in the combined record 2250. In the example shown in FIG. 22, the result of a join operation between two tables (e.g., tables 2215 and 2220) is a single record (e.g., ABCDFGH). However, in some cases, the result of a join operation between two tables may be multiple records.

Even though in the example illustrated in FIG. 22 a record is produced as the result of the set of join operations, the set of join operations in some cases might result in a null record. For instance, as further described below, a null record results when the set of join operations terminates on the first join because the detected event relates to a LDPS not managed by a particular instance of the virtualization application. Accordingly, at 2120, the process determines whether the query plan has failed (e.g., whether the set of join operations resulted in a null record). If so, the process ends. In some embodiments, the operation 2120 is implicitly performed by the table processor when it terminates its operations upon the failure of one of the join operations.

When the process 2100 determines (at 2120) that the query plan has not failed, it stores (at 2125) the output resulting from the execution of the query plan in one or more of the output tables. In some embodiments, the table processor 1830 performs this operation by (1) performing a select operation to select a subset of the data values from the record(s) produced by the join operations, and (2) writing the selected subset of data values in one or more RE output tables 1845. FIG. 22 illustrates an example of this selection operation. Specifically, it illustrates the selection of values B, F, P and S from the combined record 2250 and the writing of these values into a record 2265 of an output table 2260.

As mentioned above, the RE output tables can be categorized in some embodiments as (1) a RE input table only, (2) a VA output table only, or (3) both a RE input table and a VA output table. When the execution of the query plan results in the modification a VA output table, the process 2100 publishes (at 2130) the changes to this output table to the NIB. In some embodiments, the NIB publisher 1855 detects changes to the VA output tables of the RE output tables 1845, and in response, it propagates the modified data tuple in the modified VA output table into the NIB 1860 through the APIs provided by the NOS 1865. After a new data tuple is propagated to the NIB by the NIB monitor, the NOS 1865 propagates, if needed, a NIB data tuple that was modified because of the propagated VA output table data tuple to one or more of the managed switching elements. In doing this, the NOS completes the deployment of the LDPS (e.g., one or more logical switching configurations) to one or more managed switching elements as specified by the NIB records.

At 2135, the process determines whether the execution of the query plan resulted in the modification of the RE input table. This operation is implicitly performed in some embodiments when the event processor 1822 determines that the output table that was modified previously at 2125 modified a RE input table. As mentioned above, a RE output table 1845 can also be a RE input table 1810 that generates an event that causes the rules engine to perform another query plan after it is modified by the rules engine. Such an event is referred to as an internal input event, and it is to be contrasted with an external input event, which is an event that is caused by a RE input table modification made by the control application 1805 or the NIB monitor 1850. When the process determines (at 2130) that an internal input event was created, it returns to 2110 to perform operations 2110-2135 for this new internal input event. The process terminates when it determines (at 2135) that the execution of the query plan at 2135 did not result in an internal input event.

One of ordinary skill in the art will recognize that process 2100 is a conceptual representation of the operations used to map a change in one or more input tables to one or more output tables. The specific operations of process 2100 may not be performed in the exact order shown and described. The specific operations may not be performed in one continuous series of operations, and different specific operations may be performed in different embodiments. For instance, the process 2100 in some embodiments batches up a set of changes in RE input tables 1810 and identifies (at 2110) a query plan associated with the set of detected RE input table events. The process in these embodiments executes (at 2120) the query plan for the whole set of the RE input table events rather than for a single RE input table event. Batching up the RE input table events in some embodiments results in better performance of the table mapping operations. For example, batching the RE input table events improves performance because it reduces the number of instance that the process 2100 will produce additional RE input table events that would cause it to start another iteration of itself.

While FIGS. 19-23 may be described in terms of the control application 1600 and the virtualization application 1800, these figures have been described in terms of the virtualization application 1800 for simplicity of description.

As mentioned above, some embodiments implement the nLog engine as a distributed table mapping engine that is executed by different control applications and virtualization applications of different controller instances. To implement the nLog engine in a distributed manner, some embodiments partition the management of the LDP sets by specifying for each particular LDPS only one controller instance as the instance responsible for specifying the NIB records associated with that particular LDPS. Partitioning the management of the LDPS' also assigns in some embodiments the table mapping operations for each LDPS to the nLog engine of the controller instance responsible for the LDPS.

As described above by reference to FIG. 20, some embodiments partition the nLog table mapping operations across the different controller instances by designating the first join operation that is performed by each nLog instance to be based on the LDPS parameter. This designation ensures that each nLog instance's join operations fail and terminate immediately when the instance has started a set of join operations that relate to a LDPS that is not managed by the nLog instance.

Figure 23:
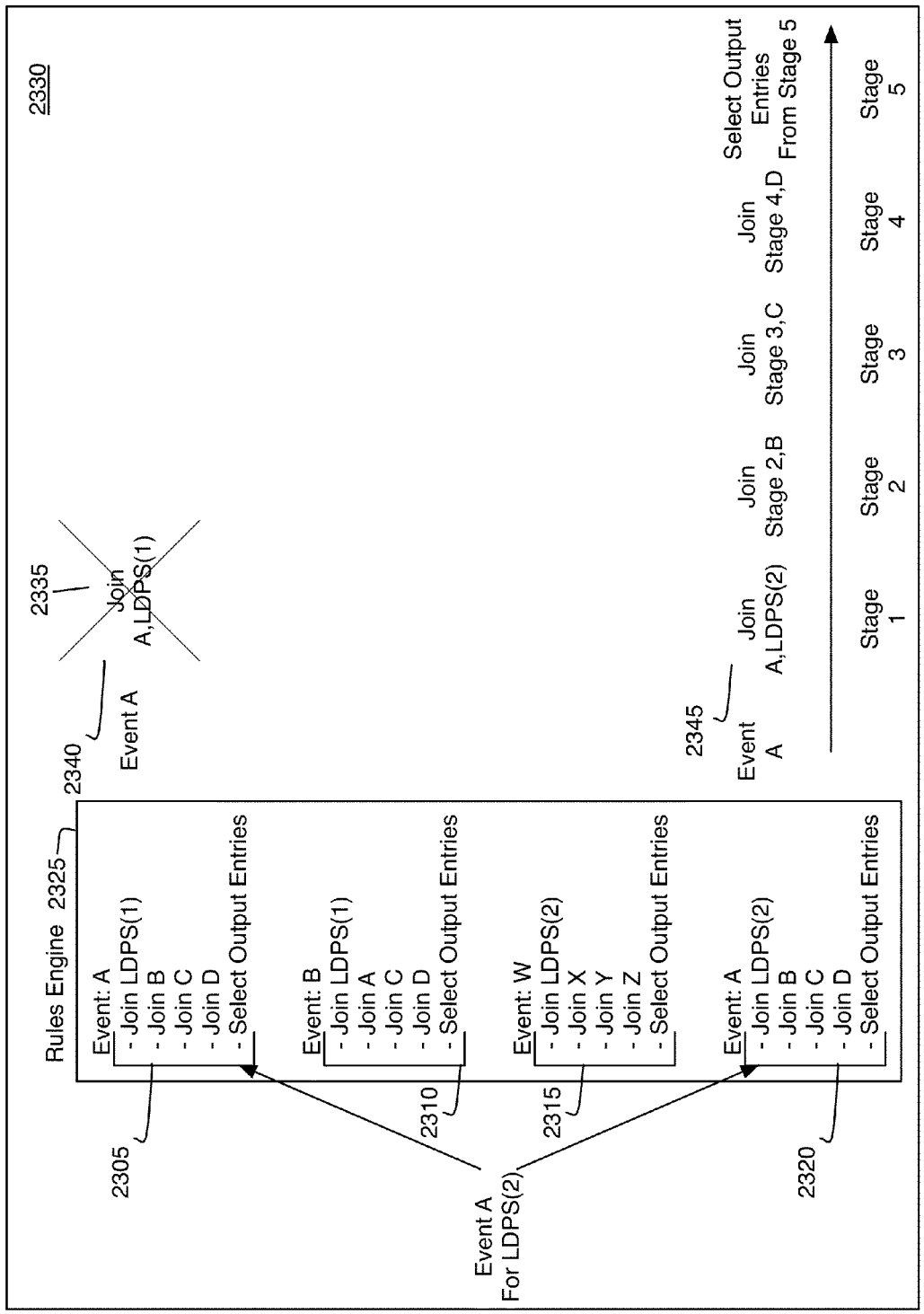
FIG. 23 illustrates an example of a set of join operations failing when they relate to a LDPS that does not relate to an input table event that has occurred.

FIG. 23 illustrates an example of a set of join operations failing when they relate to a LDPS that does not relate to an input table event that has occurred. Specifically, this figure illustrates four query plans 2305, 2310, 2315 and 2320 of a rules engine 2325 of a particular virtualization application instance 2330. Two of these query plans 2310 and 2315 specify two sets of join operations that should be performed upon the occurrence of input table events B and W respectively, while two of the query plans 2305 and 2320 specify two sets of join operations that should be performed upon the occurrence of input table event A.

In the example illustrated in FIG. 23, the two query plans 2310 and 2315 are not executed because an input table event A has occurred for a LDPS 2 and these two plans are not associated with such an event. Instead, the two query plans 2305 and 2320 are executed because they are associated with the input table event A that has occurred. As shown in this figure, the occurrence of this event results in two sets of join operations being performed to execute the two query plans 2305 and 2320. The first set of join operations 2340 for the query plan 2305 fails because the query plan 2305 is specified for a LDPS 1, which is a LDPS not managed by the virtualization application instance 2330. This set of join operations fails on the first join operation 2335 because it is a join with the virtualization application instance 2330's LDPS table, which does not contain a record for the LDPS 1. In some embodiments, even though the first join operation 2335 has failed, the remaining join operations (not shown) of the query plan 2340 will still be performed and fail. In other embodiments, the remaining join operations of the query plan 2340 will not be performed as shown.

The second set of join operations 2345 does not fail, however, because it is for the LDPS 2, which is a LDPS managed by the virtualization application instance 2330 and therefore has a record in the LDPS table of this application instance. This set of join operations has four stages that each performs one join operation. Also, as shown in FIG. 23, the set of join operations terminates with a selection operation that selects a portion of the combined record produced through the join operations.

Figure 24A:
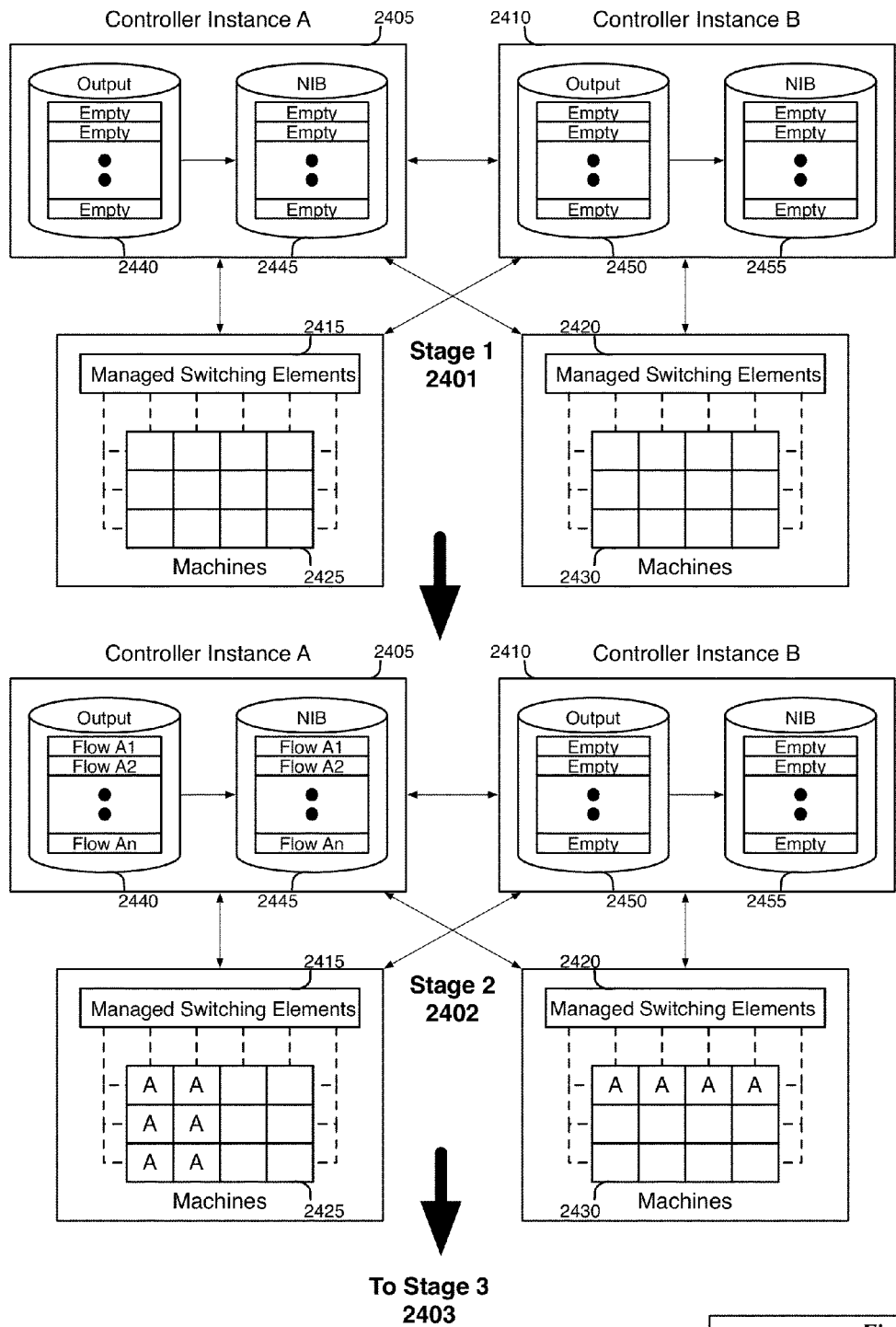
FIGS. 24A-24B illustrate an example of reducing workloads on nLog instances.
Figure 24B:
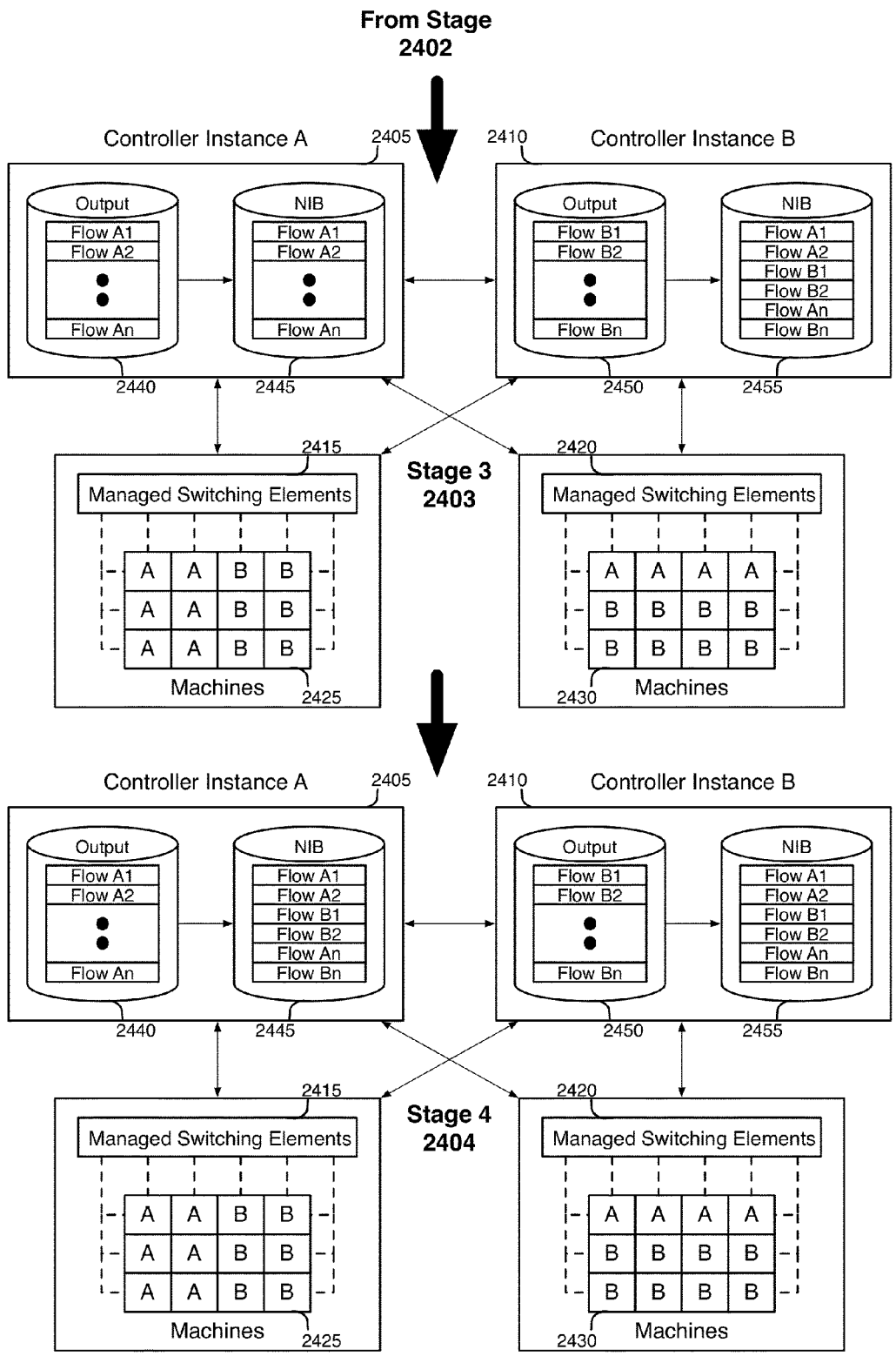

The distribution of the nLog table mapping operations across several nLog instances reduces the load on each nLog instance and thereby increases the speed by which each nLog instance can complete its mapping operations. FIGS. 24A-24B illustrate an example that describes this reduction in workload. Specifically, it illustrates an example where two controller instances 2405 and 2410 are responsible for the virtualization application functionality of two different LDPS' A and B for different tenants A and B of a multi-tenant computing environment. The two controller instances manage two sets of managed switching elements 2415 and 2420. Each of the two sets of managed switching elements manages a set of machines 2425 or 2430, which may be host machines running on dedicated machines, or may be virtual machines running on shared machines.

In four stages, this figure illustrates the results of the table mapping operations that are performed by the virtualization applications of these two different controller instances. The first stage 2401 shows that no machines have been deployed in the managed system for either tenant A or tenant B. The second stage 2402 shows the computing environment with several machines that have been deployed for tenant A in the two sets of machines 2425 and 2430. It also shows the VA output table 2440 of the virtualization application of the controller instance 2405 with flow entries for the LDPS A that were specified by this instance's virtualization application. The second stage further shows the NIB 2445 of the controller instance 2405 containing the flow entries for the LDPS A. At this stage, the NIB 2445 also contains LDPS data relating to LDPS A in some embodiments, but this data is not shown in FIG. 24A.

The third stage 2403 in FIG. 24B shows that the flow entries for the LDPS A have migrated to the NIB 2455 of the controller instance 2410. This migration occurs because of the NIB replication across the controller instances. Also, this replication causes LDPS data relating to LDPS A to be copied to the NIB 2455. The third stage 2403 further shows the computing environment with several machines that have been deployed for tenant B in the two sets of machines 2425 and 2430. It also shows the VA output table 2450 of the virtualization application of the controller instance 2410 with flow entries for the LDPS B that were specified by this instance's virtualization application. The third stage further shows the NIB 2455 of the controller instance 2410 containing the flow entries for the LDPS B. At this stage, the NIB 2455 also contains LDPS data relating to LDPS B in some embodiments, but this data is not shown in FIG. 24B.

The fourth stage 2404 shows that the flow entries for the LDPS B have migrated to the NIB 2445 of the controller instance 2405. This migration occurs because of the NIB replication across the controller instances. This replication also causes LDPS data relating to LDPS B to be copied to the NIB 2445. As shown at the stage 2404, the NIBs 2445 and 2455 have LDPS data relating to both LDPS A and LDPS B. However, the VA output tables of one controller instance do not store flow entries for the LDPS of another controller instance. That is, in this example, the VA output tables 2440 of controller instance A do not store the flow entries for the LDPS B and the VA output tables 2450 of controller instance B do not store the flow entries for the LDPS A. This depiction is meant to illustrate that some embodiments partition the storage of the logical state data across several controller instances. This allows these embodiments to keep the size of tables (e.g., the input or output tables) small in order to increase the speed by which each nLog instance can complete its mapping operations as described above.

While the input and output tables of each controller instance in some embodiments only store or practically only store logical state data for only the LDPS' for which the controller instance is responsible, the NIB for each controller instance in some of these embodiments contains all or practically all of the logical state data (e.g., except some logical port statistics that are stored in the DHTs of controller instances that are not replicated across) for all LDPS of all controller instances. However, other embodiments will partition the logical state data for the LDPS's across the NIBs of different controller instances.

F. Network Controller

Figure 25:
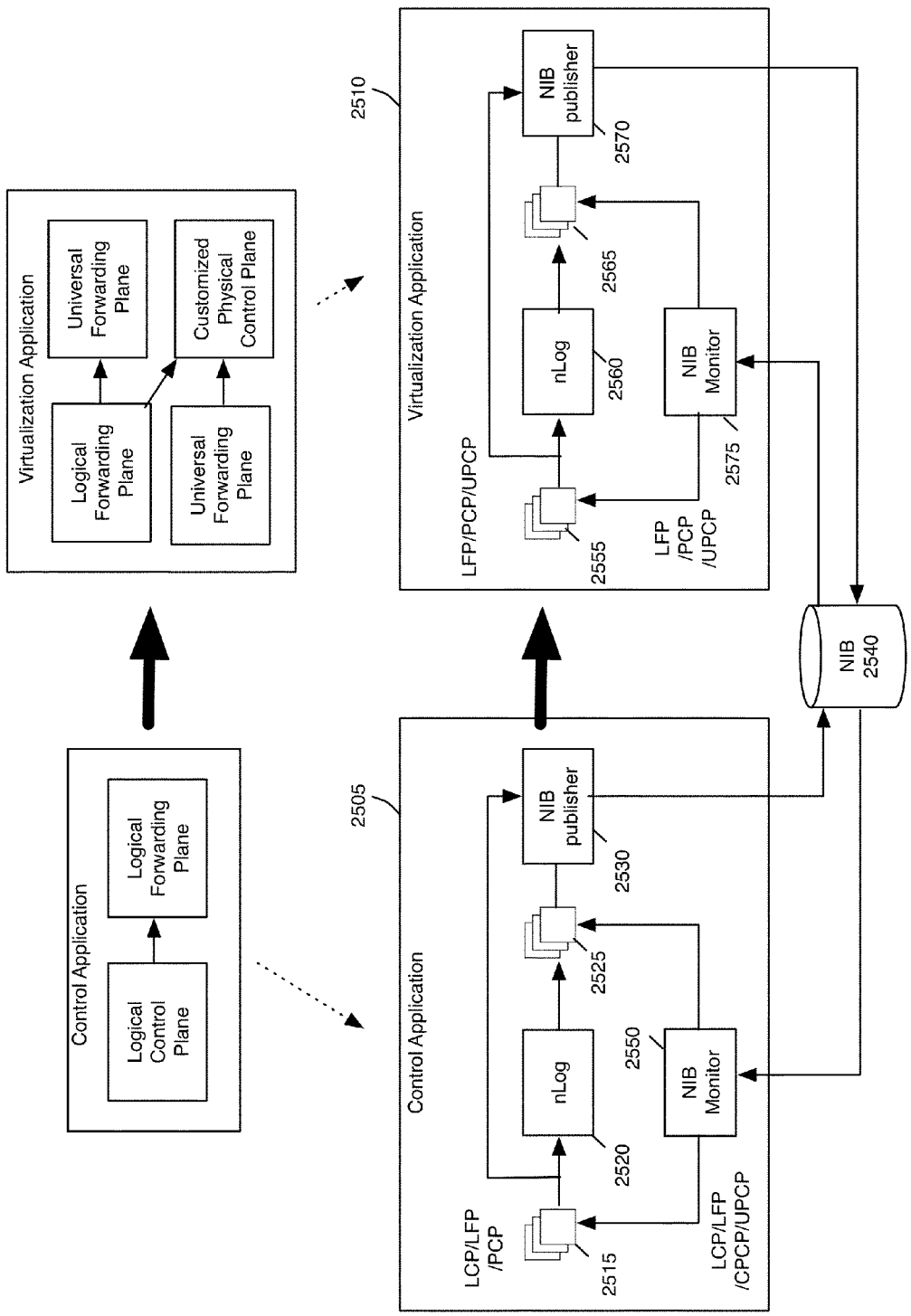
FIG. 25 illustrates the control and virtualization applications of some embodiments.

FIG. 25 illustrates a simplified view of the table mapping operations of the control and virtualization applications of some embodiments of the invention. As indicated in the top half of this figure, the control application 2505 maps LCP data to LFP data, which the virtualization application 2510 of some embodiments then maps to UPCP data or CPCP data. The bottom half of this figure illustrates the table mapping operations of the control application and the virtualization application. As shown in this half, the control application's input tables 2515 store LCP data, LFP data and UPCP data, as the collection of all these data along with data in the constant and function tables (not shown) is used by the control application's nLog engine 2520 in some embodiments to generate LFP data from the input LCP data.

This figure further shows the NIB publisher 2530 receiving some or all of the input table records and publishing these records to the NIB 2540. As further shown, the NIB monitor 2550 receives NIB change notifications (e.g., notifications of managed switching element changes detected by the NOS or notification of NIB changes pushed by the other controller instances) in some embodiments and in response to such notifications it may update input and output tables 2515 and 2525 of the control application. In some embodiments, the NIB monitor 2550 may write LCP data, LFP data, UPCP data or CPCP data to the input tables 2515 in response to NIB modification notifications.

The bottom half of FIG. 25 also illustrates the table mapping operations of the virtualization application 2510. As shown, the virtualization application's input tables 2555 store LFP data, UPCP data, and CPCP data, as the collection of all these data along with data in the constant and function tables (not shown) is used by the virtualization application's nLog engine 2560 in some embodiments to generate UPCP data and CPCP data from the input LFP data and UPCP data, respectively.

This figure further shows the NIB publisher 2570 receiving some or all of the input table records and publishing these records to the NIB 2540. As further shown, the NIB monitor 2575 receives NIB change notifications in some embodiments and in response to such notification it may update input and output tables 2555 and 2565 of the virtualization application 2510. In some embodiments, the NIB monitor 2575 may write LFP, UPCP, and CPCP data in response to NIB modification notifications.

As mentioned above, some of the logical or physical data that a NIB monitor pushes to the input tables of the control or virtualization application relates to data that is generated by other controller instances and passed to the NIB monitor's particular NIB (e.g., through the secondary storage layer). For instance, in some embodiments, the logical data regarding logical constructs that relates to multiple LDPS' might change, and the NIB monitor may write this change to the input tables. Another example of such logical data that is produced by another controller instance in a multi controller instance environment occurs when a user provides LCP data for a particular LDPS on a first controller instance that is not responsible for the particular LDPS. This change requests is added to the NIB request list (such as the NIB request list 1160 which will be described above by reference to FIG. 11) of the first controller instance. This request list is then propagated across the NIBs of other controller instances by replication processes described above by reference to FIGS. 24A-24B. The NOS of a second controller instance, which is the master of the LDPS, eventually makes the change to the NIB of the second controller instance based on the propagated request list. The NIB monitor of the second controller instance then writes the change to the one of the application's input tables (e.g., the control application's input table). Accordingly, in such cases, the logical data that the NIB monitor writes to the input tables in some cases may originate from the NIB of another controller instance.

As mentioned above, UPCP data that a NIB monitor pushes to the input tables of the control or virtualization application is UPCP data generated by other controller instances and passed to the NIB monitor's particular NIB (e.g., through the secondary storage layer). For instance, in some embodiments, the UPCP data for a particular set of managed switching elements may be produced by the virtualization application of a logical controller (i.e., master of an LDPS). The UPCP data produced by the logical controller is then replicated to the NIB of a second controller instance that is the master of at least one the particular set of managed switching elements. The second controller instance is therefore a physical controller responsible for managing the managed switching element. The NIB monitor of the second controller instance then writes the change to the one of the application's input tables (e.g., the control application's input table). Accordingly, the logical data that the NIB monitor writes to the input tables in some cases may originate from the NIB of another controller instance.

As mentioned above, the control application 2505 and the virtualization application 2510 are two separate applications that operate on the same machine or different machines in some embodiments. Other embodiments, however, implement these two applications as two modules of one integrated application, with the control application module 2505 generating LDPS in the LFP and the virtualization application generating physical datapath sets in the physical control plane or in the UPCP.

Figure 26:
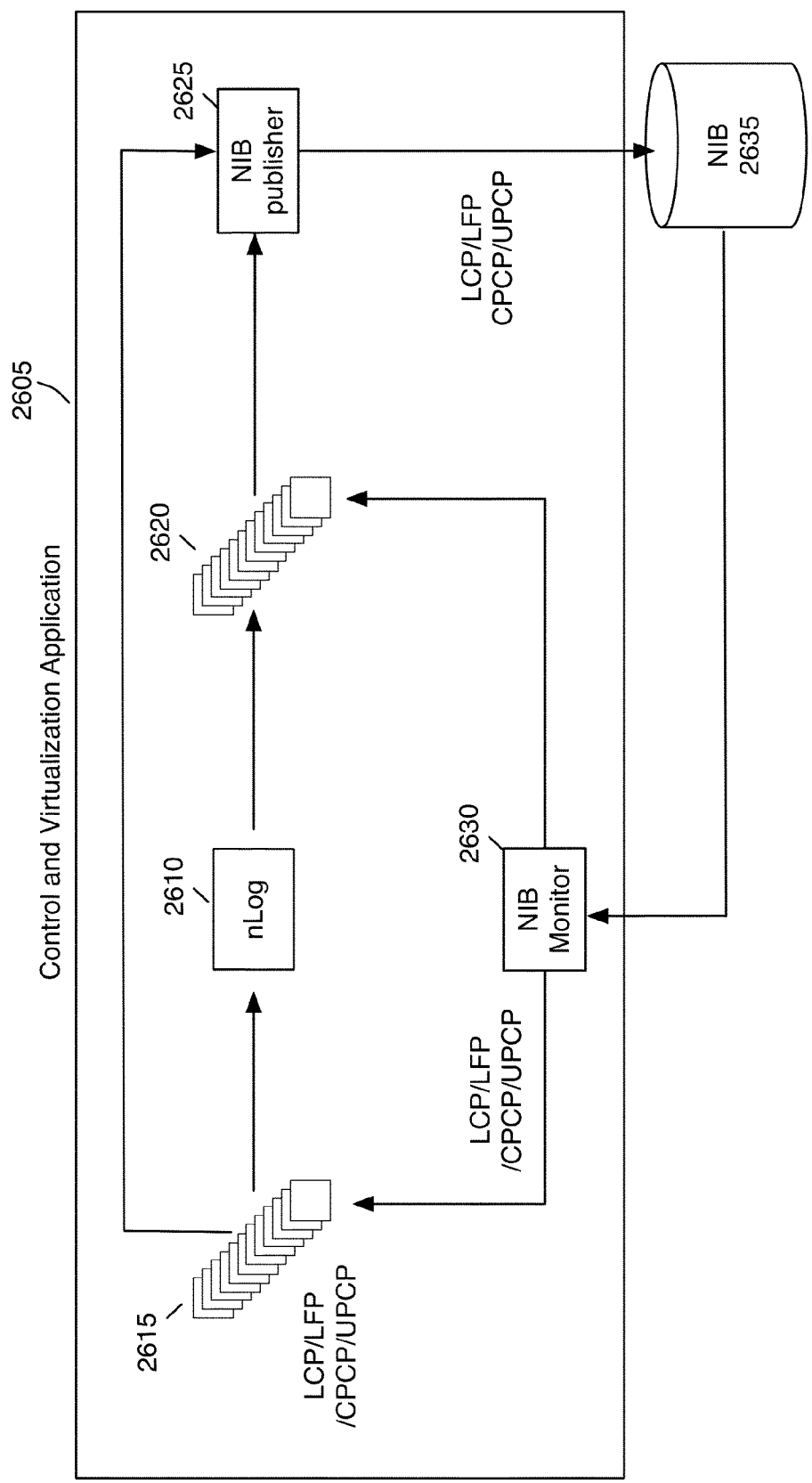
FIG. 26 illustrates an integrated control/virtualization application of some embodiments.

Still other embodiments integrate the control and virtualization operations of these two applications within one integrated application, without separating these operations into two separate modules. FIG. 26 illustrates an example of such an integrated application 2605. This application 2605 uses an nLog table mapping engine 2610 to map data from an input set of tables 2615 to an output set of tables 2620, which like the above described embodiments FIGS. 16, 18, and 25, may include one or more tables in the input set of tables. The input set of tables in this integrated application may include LCP data that need to be mapped to LFP data, or it may include LFP data that need to be mapped to CPCP or UPCP data, or it may include UPCP data that need to be mapped to CPCP data.

In this integrated control and virtualization application 2605, a NIB publisher 2625 publishes input table records and output table records to the NIB 2635. A NIB monitor 2630 then receives notification of changes from the NIB 2635 (e.g., managed switching element changes detected by the NOS or NIB changes pushed by the other controller instances), and for some notifications (e.g., those relating to the LDPS' for which the application is the master), pushes changes to the input and/or tables 2615 and 2620.

G. Translating Universal to Element-Specific Forwarding State

Figure 27:
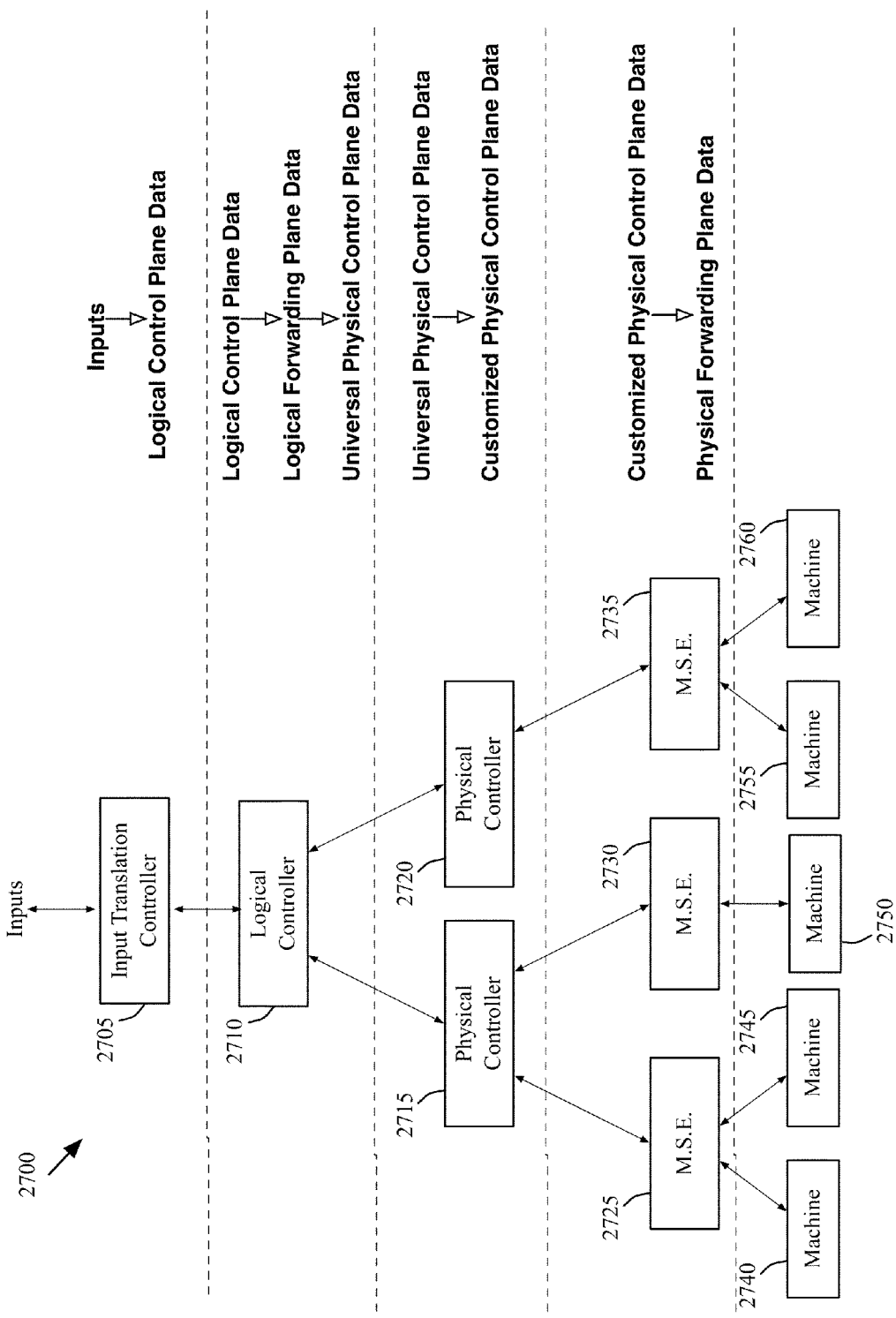
FIG. 27 conceptually illustrates an example architecture of a network control system.

FIG. 27 conceptually illustrates an example architecture of a network control system 2700. In particular, this figure illustrates generation of CPCP data from inputs by different elements of the network control system. As shown, the network control system 2700 of some embodiments includes an input translation controller 2705, a logical controller 2710, physical controllers 2715 and 2720, and three managed switching elements 2725-2735. This figure also illustrates five machines 2740-2760 that are connected to the managed switching elements (written as "M.S.E." in the figure) 2725-2735 to exchange data between them. One of the ordinary skill in the art will recognize that many other different combinations of the controllers, switching elements, and machines are possible for the network control system 2700.

In some embodiments, each of the controllers in a network control system has a full stack of different modules and interfaces described above by reference to FIG. 12. However, each controller does not have to use all the modules and interfaces in order to perform the functionalities given for the controller. Alternatively, in some embodiments, a controller in the system has only those modules and interfaces that are necessary to perform the functionalities given for the controller. For instance, the logical controller 2710 which is a master of a LDPS does not include an input module (e.g., an input translation application) but does include the control module and the virtualization module (e.g., a control application or a virtualization application, or an integrated application) to generate UPCP data from the input LCP data.

Moreover, different combinations of different controllers may be running in a same machine. For instance, the input translation controller 2705 and the logical controller 2710 may run in the same computing device. Also, one controller may function differently for different LDP sets. For instance, a single controller may be a master of a first LDPS and a master of a managed switching element that implements a second LDPS.

The input translation controller 2705 includes an input translation application (such as the input translation application described above by reference to FIG. 14) that generates LCP data from the inputs received from the user that specify a particular LDPS. The input translation controller 2705 identifies, from the configuration data for the system 2705, the master of the LDPS. In this example, the master of the LDPS is the logical controller 2710. In some embodiments, more than one controller can be masters of the same LDPS. Also, one logical controller can be the master of more than one LDP sets.

The logical controller 2710 is responsible for the particular LDPS. The logical controller 2710 generates the UPCP data from the LCP data received from the input translation controller. Specifically, the control module (not shown) of the logical controller 2710 generates the LFP data from the received LCP data and the virtualization module (not shown) of the logical controller 2710 generates the UPCP data from the logical forwarding data.

The logical controller 2710 identifies physical controllers that are masters of the managed switching elements that implement the LDPS. In this example, the logical controller 2710 identifies the physical controllers 2715 and 2720 because the managed switching elements 2725-2735 are configured to implement the LDPS in this example. The logical controller 2710 sends the generated UPCP data to the physical controllers 2715 and 2720.

Each of the physical controllers 2715 and 2720 can be a master of one or more managed switching elements. In this example, the physical controller 2715 is the master of two managed switching elements 2725 and 2730 and the physical controller 2720 is the master of the managed switching element 2735. As the master of a set of managed switching elements, the physical controllers of some embodiments generate, from the received UPCP data, CPCP data specific for each of the managed switching elements. Therefore, in this example, the physical controller 2715 generates the physical control plane data customized for each of the managed switching elements 2725 and 2730. The physical controller 2720 generates physical control plane data customized for the managed switching element 2735. The physical controllers send the CPCP data to the managed switching elements of which the controllers are masters. In some embodiments, multiple physical controllers can be the masters of the same managed switching elements.

In addition to sending CPCP data, the physical controllers of some embodiments receive data from the managed switching elements. For instance, a physical controller receives configuration information (e.g., identifiers of VIFs of a managed switching element) of the managed switching elements. The physical controller maintains the configuration information and also sends the information up to the logical controllers so that the logical controllers have the configuration information of the managed switching elements that implement the LDP sets of which the logical controllers are masters.

Each of the managed switching elements 2725-2735 generates physical forwarding plane data from the CPCP data that the managed switching element received. As mentioned above, the physical forwarding plane data defines the forwarding behavior of the managed switching element. In other words, the managed switching element populates its forwarding table using the CPCP data. The managed switching elements 2725-2735 forward data among the machines 2740-2760 according to the forwarding tables.

Figure 28:
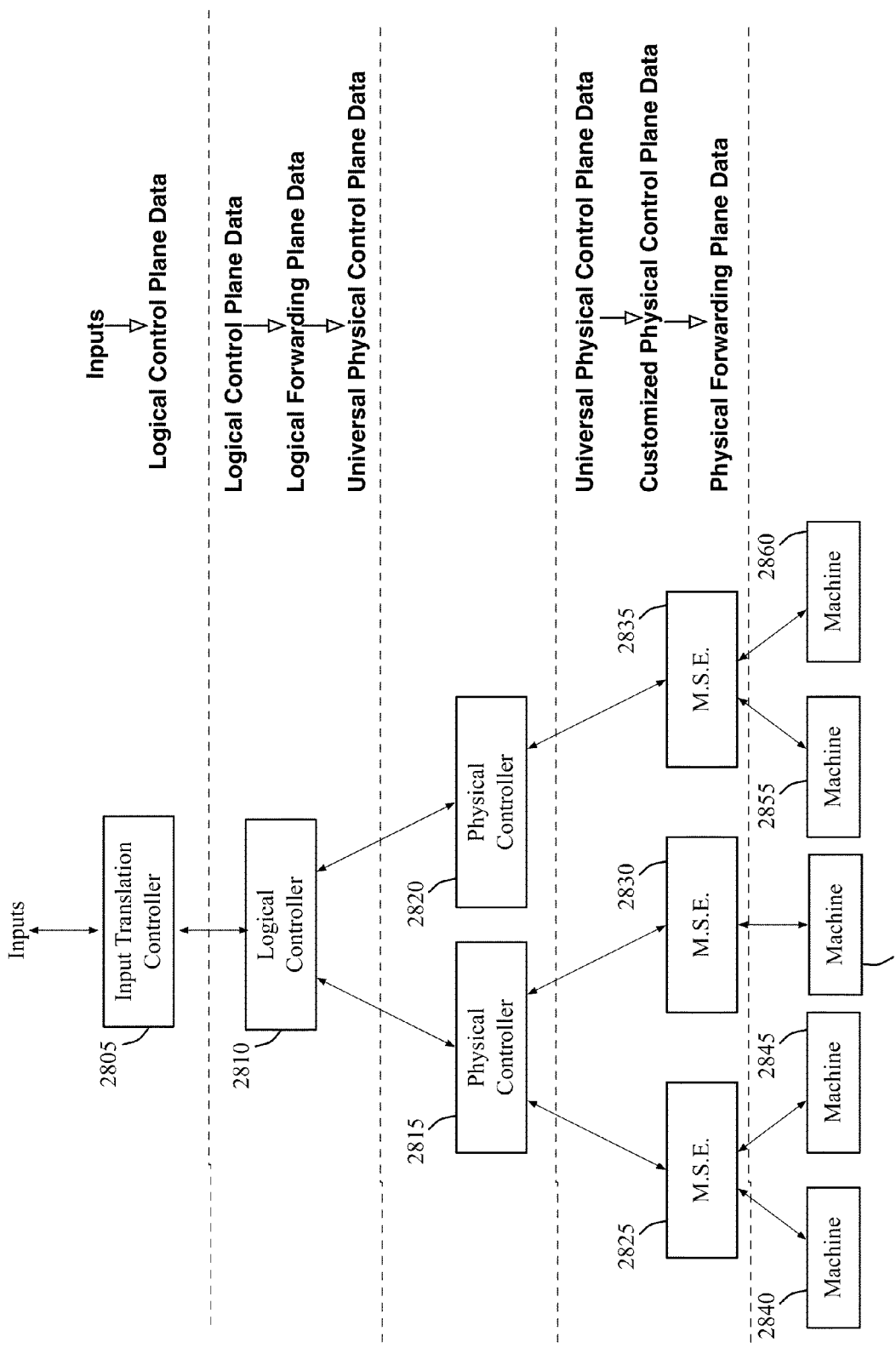
FIG. 28 conceptually illustrates an example architecture of a network control system.

FIG. 28 conceptually illustrates an example architecture of a network control system 2800. Like FIG. 27, this figure illustrates generation of CPCP data from inputs by different elements of the network control system. In contrast to the network control system 2700 in FIG. 27, the physical controllers 2815 and 2820 do not generate physical control plane data customized for the managed switching elements that these physical controllers manage. Rather, these physical controllers 2815 and 2820 gather UPCP data from the logical controllers and distribute these UPCP data to the managed switching elements. In the network control system 2800, the managed switching elements 2825-2834 customize the UPCP data into CPCP data that are specific to the managed switching elements.

Figure 29:
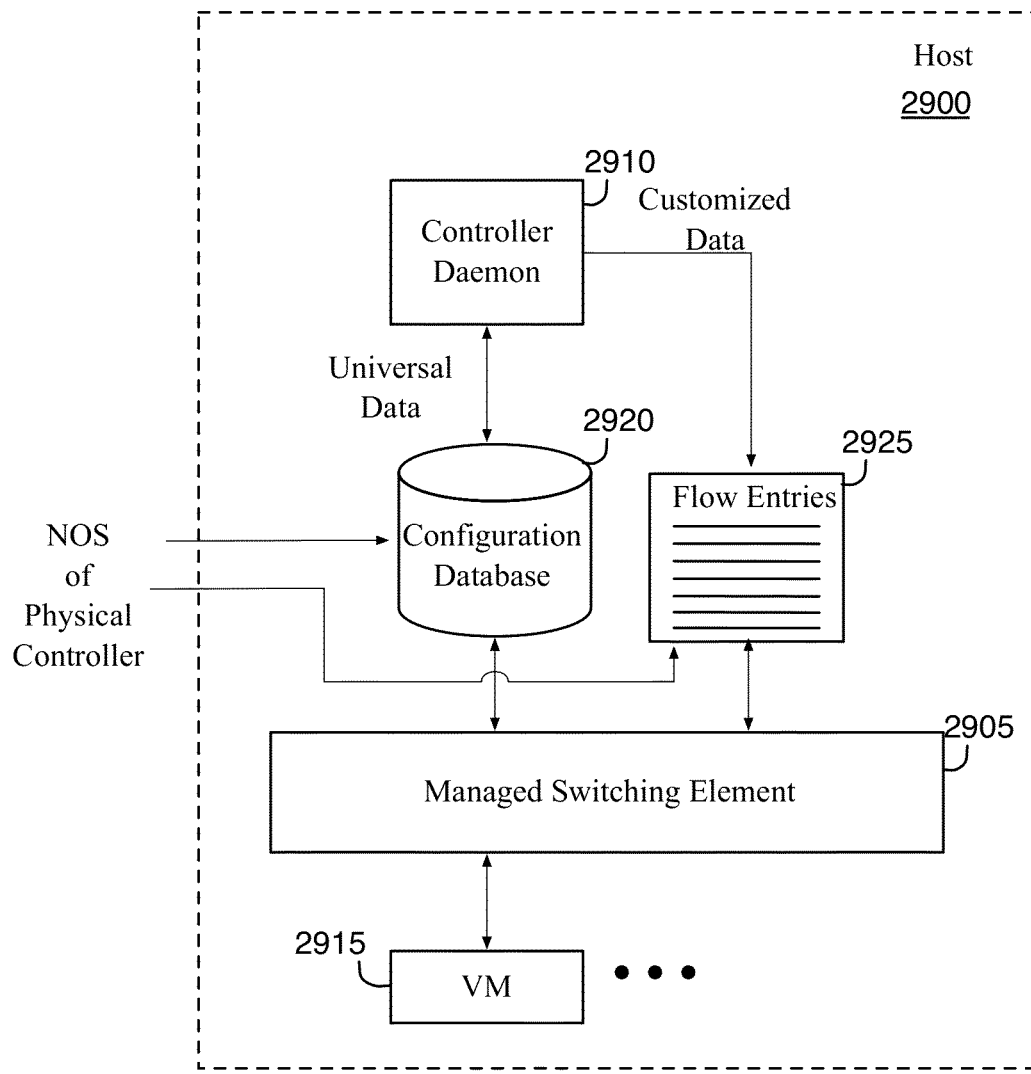
FIG. 29 illustrates an example architecture of a host on which a managed switching element runs.

FIG. 29 illustrates an example architecture of a host 2900 on which a managed switching element 2905 runs. The managed switching element 2905 receives UPCP data from a physical controller that is master of this managed switching element. The host 2900 also includes a controller daemon 2910 that generates CPCP data specific to the managed switching element 2905 from the UPCP data. The host 2900 also includes several VMs 2915 that use the managed switching element 2905 to send and receive data packets.

As mentioned above, a physical controller in a network control system of some embodiments, such as the network control system 2800, does not customize the UPCP data for the managed switching elements of which the physical controller is a master. The network control system of some embodiments puts a controller daemon in the hosts on which the managed switching elements run so that the controller daemon can perform the conversion of the UPCP data into CPCP data specific to the switching elements.

The managed switching element 2905 in this example is a software switch. The managed switching element includes a configuration database 2920 and the flow table 2925 that includes flow entries. For simplicity of discussion, other components (e.g., ports, forwarding tables, etc.) are not depicted in this figure. The managed switching element 2905 of some embodiments receives the UPCP data from the NOS of the physical controller over two channels, a first channel using a switch control protocol (e.g., OpenFlow) and a second channel using a configuration protocol. In some embodiments, the data coming over the first switching element includes flow entries and the data coming over the second switching element includes configuration information. The managed switching element 2905 therefore puts the UPCP data coming over the first channel in the flow table 2925 and the UPCP data coming over the second channel in the configuration database 2920. However, the UPCP data is not written in terms of specifics of the managed switching element. The UPCP data thus has to be customized by rewriting the data in terms of the specifics of the managed switching element.

In some embodiments, the managed switching element 2905 keeps the configuration information in terms of the specifics of the managed switching element in the configuration database 2920. The controller daemon 2910 uses this configuration information in order to translate the UPCP data stored in the configuration database 2920. For instance, the UPCP data may specify a port of the managed switching element using a universal identifier. The controller daemon 2910 has logic to map this universal identifier to a local port identifier (e.g., port number) that is also stored in the configuration database 2920. The controller daemon 2910 then uses this customized configuration information to modify the flow entries that are written in terms of UPCP data.

H. Example Use Cases

1. Tunnel Creation

Figure 30A:
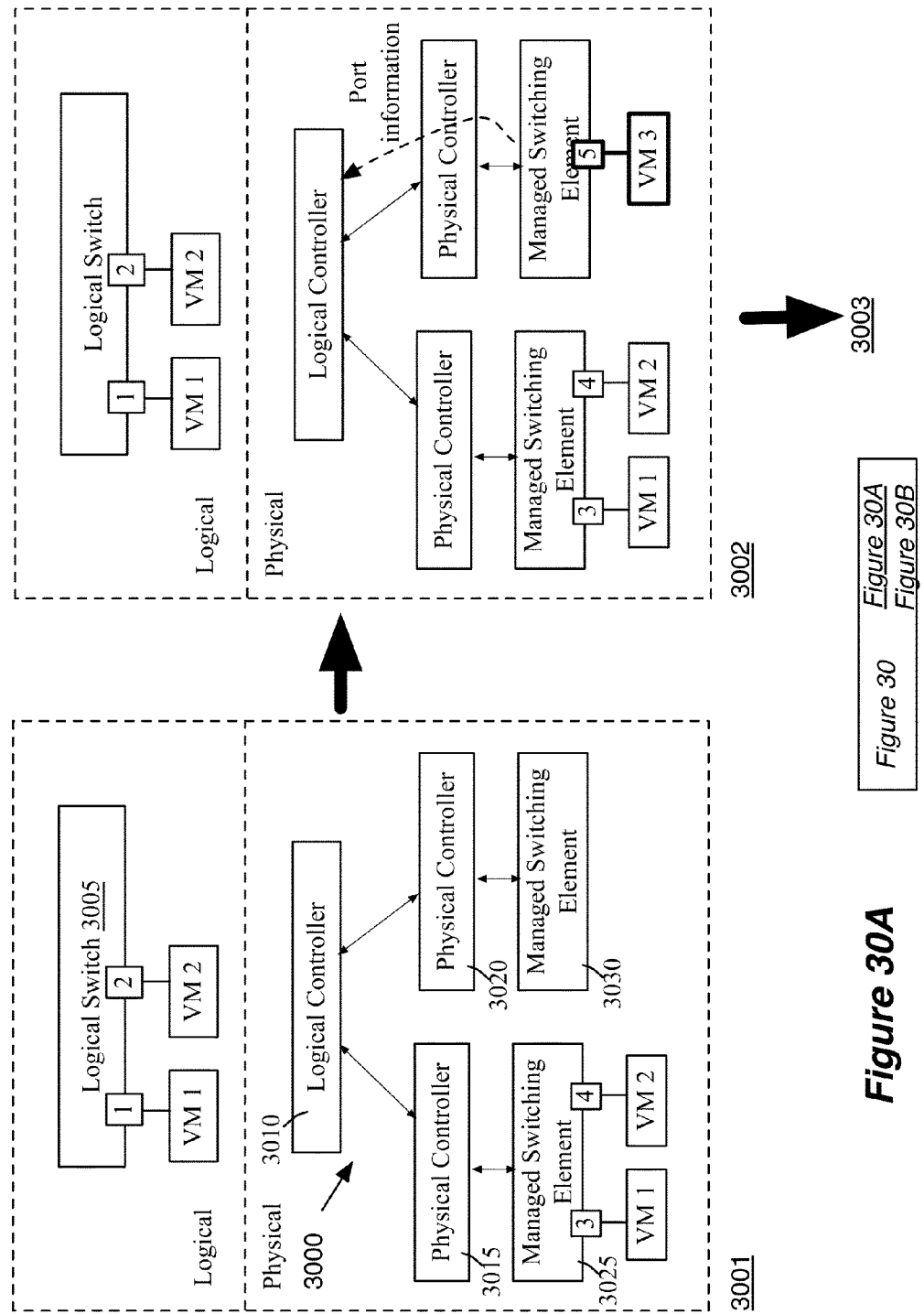
FIGS. 30A-30B illustrate an example creation of a tunnel between two managed switching elements based on universal physical control plane (UPCP) data.
Figure 30B:
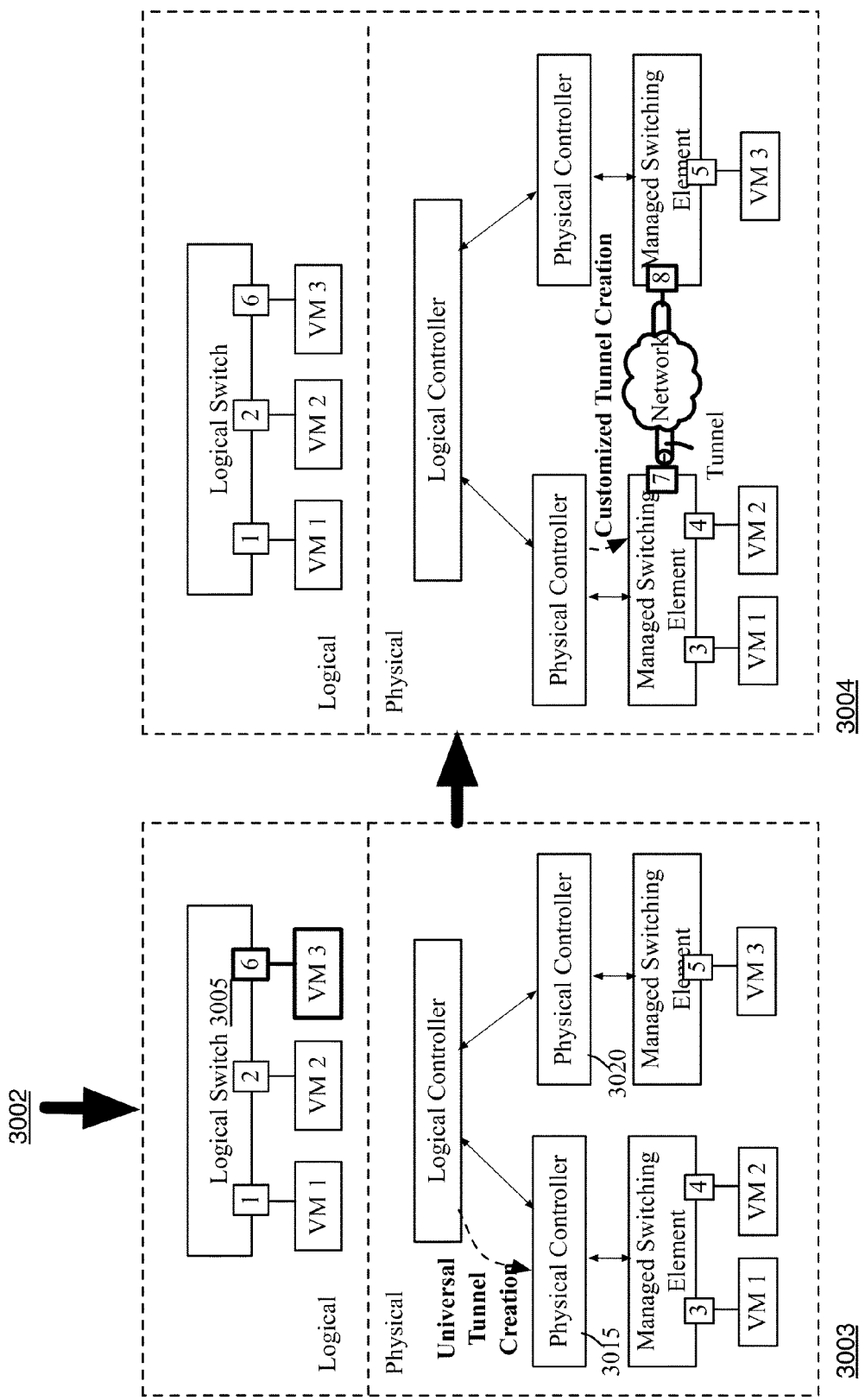

FIGS. 30A-30B illustrate an example creation of a tunnel between two managed switching elements based on UPCP data. Specifically, this figure illustrates in four different stages 3001-3004 a series of operations performed by different components of a network management system 3000 in order to establish a tunnel between two managed switching elements 3025 and 3030. This figure also illustrates a logical switch 3005 and VMs 1 and 2. Each of the four stages 3001-3004 shows the network control system 3000 and the managed switching elements 3025 and 3030 in the bottom portion and a logical switch 3005 and VMs connected to the logical switch 3005 in the top portion. The VMs are shown in both the top and bottom portions of each stage.

As shown in the first stage 3001, the logical switch 3005 forwards data between the VMs 1 and 2. Specifically, data comes to or from VM 1 through a logical port 1 of the logical switch 3005 and data comes to or from VM 2 through a logical port 2 of the logical switch 3005. The logical switch 3005 is implemented by the managed switching element 3025 in this example. That is, the logical port 1 is mapped to port 3 of the managed switching element 3025 and the logical port 2 is mapped to port 4 of the managed switching element 3025.

The network control system 3000 in this example includes a logical controller 3010 and two physical controllers 3015 and 3020. The network control system 3000 also includes input translation controllers (not shown) and other logical and physical controllers (not shown). The physical controllers receive the UPCP data and customize the universal data into physical control plane data that is specific to the managed switching element that each physical controller is managing. The physical controllers 3015 and 3020 pass the CPCP data to the managed switching elements 3025 and 3030, respectively, so that the managed switching elements 3025 and 3030 can generate physical forwarding plane data which the managed switching elements use to forward the data between the managed switching elements 3025 and 3030.

At the second stage 3002, an administrator of the network that includes managed switching element 3030 creates VM 3 in the host (not shown) in which the managed switching element 3030 runs. The administrator creates port 5 of the managed switching element 3030 and attaches VM 3 to the port. Upon creation of port 3, the managed switching element 3030 of some embodiments sends the information about the newly created port to the logical controller 3010. In some embodiments, the information may include port number, network addresses (e.g., IP and MAC addresses), transport zone to which the managed switching element belongs, machine attached to the port, etc. As mentioned above, this configuration information goes through the physical controller managing the managed switching element and then through other physical controllers and logical controllers all the way up to the user that manages the logical switch 3005. To this user, a new VM has become available to be added to the logical switch 3005 that the user is managing.

At stage 3003, the user in this example decides to use VM 3 and attaches VM 3 to the logical switch 3005. As a result, a logical port 6 of the logical switch 3005 is created. Data coming to or from VM 3 therefore will go through the logical port 6. In some embodiments, the logical controller 3010 directs all the managed switching elements that implement the logical switch to create a tunnel between each pair of managed switching elements that has a pair of ports to which a pair of logical ports of the logical switch are mapped. In this example, a tunnel can be established between managed switching elements 3025 and 3030 to facilitate data exchange between the logical port 1 and the logical port 6 (i.e., between VMs 1 and 3) and between the logical port 2 and the logical port 6 (i.e., between VMs 2 and 3). That is, data being exchanged between port 3 of the managed switching element 3025 and port 5 of the managed switching element 3030 and data being exchanged between port 4 of the managed switching element 3025 and port 5 of the managed switching element 3030 can go through the tunnel established between the managed switching elements 3025 and 3030.

A tunnel between two managed switching elements is not needed to facilitate data exchange between the logical port 1 and the logical port 2 (i.e., between VMs 1 and 2) because the logical port 1 and the logical port 2 are mapped onto two ports on the same managed switching element 3025.

The third stage 3003 further shows that the logical controller 3010 sends UPCP data specifying instructions to create a tunnel from the managed switching element 3025 to the managed switching element 3030. In this example, the UPCP data is sent to the physical controller 3015, which will customize the UPCP data to physical control plane data specific to the managed switching element 3025.

The fourth stage 3004 shows that the physical controller 3015 sends the tunnel physical control plane data that specifies instructions to create a tunnel and to forward packets to the tunnel. The managed switching element 3025 creates a tunnel to the managed switching element 3030 based on the CPCP data. More specifically, the managed switching element 3025 creates port 7 and establishes a tunnel (e.g., GRE tunnel) to port 8 of the managed switching element 3030. More detailed operations to create a tunnel between two managed switching elements will be described below.

Figure 31:
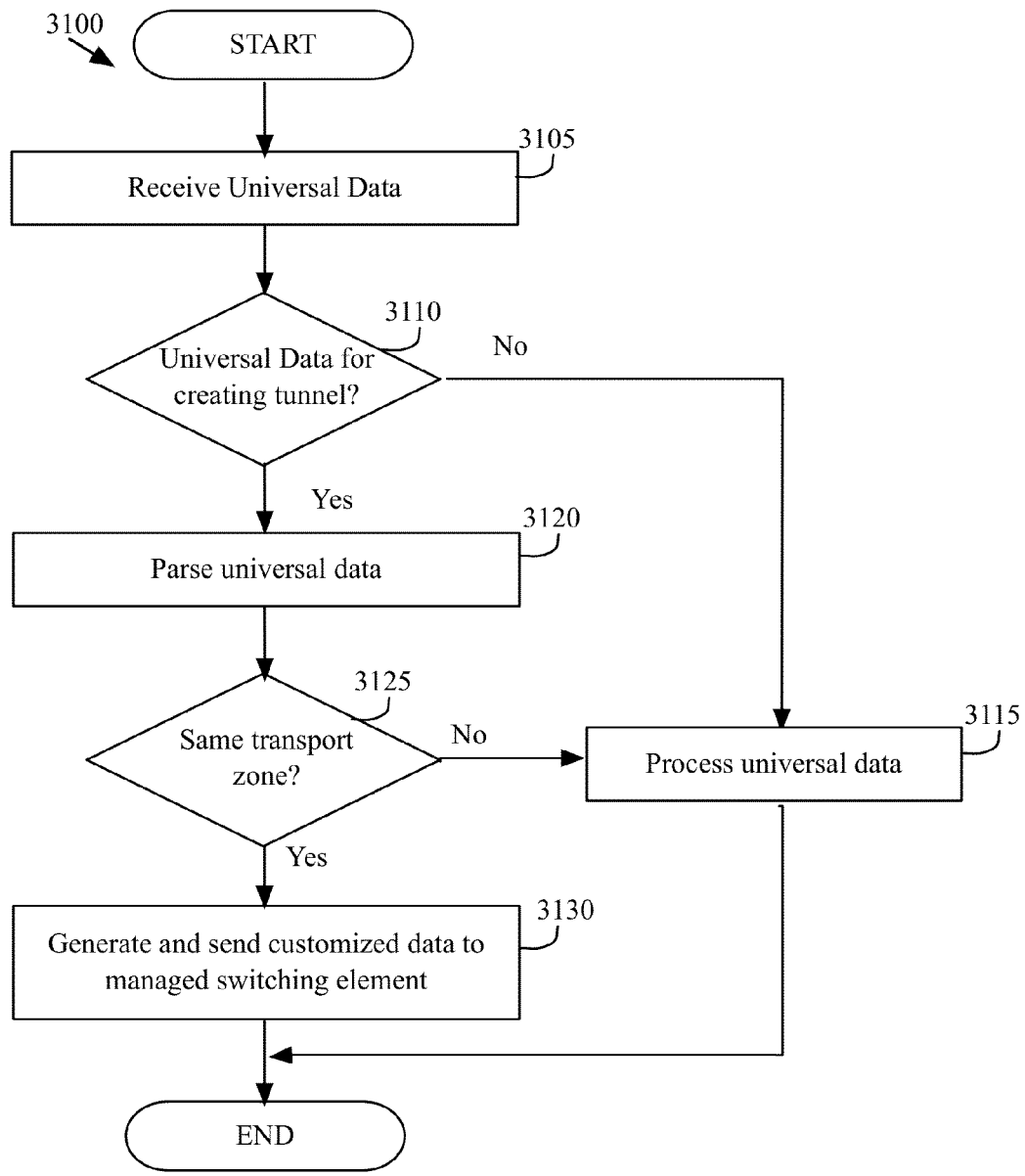
FIG. 31 conceptually illustrates a process that some embodiments perform to generate, from UPCP data, customized physical control plane (CPCP) data.

FIG. 31 conceptually illustrates a process 3100 that some embodiments perform to generate, from UPCP data, CPCP data that specifies the creation and use of a tunnel between two managed switching element elements. In some embodiments, the process 3100 is performed by a physical controller that interfaces with a managed switching element.

The process 3100 begins by receiving UPCP data from a logical controller or another physical controller. In some embodiments, UPCP data have different types. One of the types of UPCP data is universal tunnel flow instructions, which specify creation of a tunnel in a managed switching element and the use of the tunnel. In some embodiments, the universal tunnel flow instructions include information about a port created in a managed switching element in a network. This port is a port of a managed switching element to which a user has mapped a logical port of the logical switch. This port is also a destination port which the tunneled data needs to reach. The information about the port includes (1) a transport zone to which the managed switching element that has the port belongs, (2) a tunnel type, which, in some embodiments, is based on tunnel protocols (e.g., GRE, CAPWAP, etc.) used to build a tunnel to the managed switching element that has the destination port, and (3) a network address (e.g., IP address) of the managed switching element that has the destination port (e.g., IP address of a VIF that will function as one end of the tunnel to establish).

Next, the process 3100 determines (at 3110) whether the received UPCP data is a universal tunnel flow instruction. In some embodiments, the UPCP data specifies its type so that the process 3100 can determine the type of the received universal plane data. When the process 3100 determines (at 3110) that the received universal data is not a universal tunnel flow instruction, the process proceeds to 3115 to process the UPCP data to generate CPCP data and send the generated data to the managed switching element that the process 3100 is managing. The process 3100 then ends.

When the process 3100 determines (at 3110) that the received UPCP data is the universal tunnel flow instructions, the process 3100 proceeds to 3120 to parse the data to obtain the information about the destination port. The process 3100 then determines (at 3125) whether the managed switching element that has the destination port is in the same transport zone in which the managed switching element that has a source port is. The managed switching element that has the source port is the managed switching element that the physical controller that performs the process 3100 manages. In some embodiments, a transport zone includes a group of machines that can communicate with each other without using a second-level managed switching element such as a pool node.

In some embodiments, the logical controller determines whether the managed switching element that has the destination port is in the same transport zone in which the managed switching element that has a source port is. The logical controller takes into account this determination in preparing the universal tunnel flow instructions to send to the physical controller performing the process 3100. Specifically, the universal tunnel flow instructions will include different information for creating different tunnels. These different tunnel examples are described below after the description of FIG. 32. In these embodiments, the process 3100 skips 3125 and proceeds to 3115.

When the process 3100 determines (at 3125) that the managed switching element with the source port and the managed switching element with the destination port are not in the same transport zone, the process 3100 proceeds to 3115, which is described above. Otherwise, the process proceeds to 3130 to customize the universal tunnel flow instructions and send the customized information to the managed switching element that has the source port. Customizing the universal tunnel flow instructions will be described in detail below. The process 3100 then ends.

Figure 32:
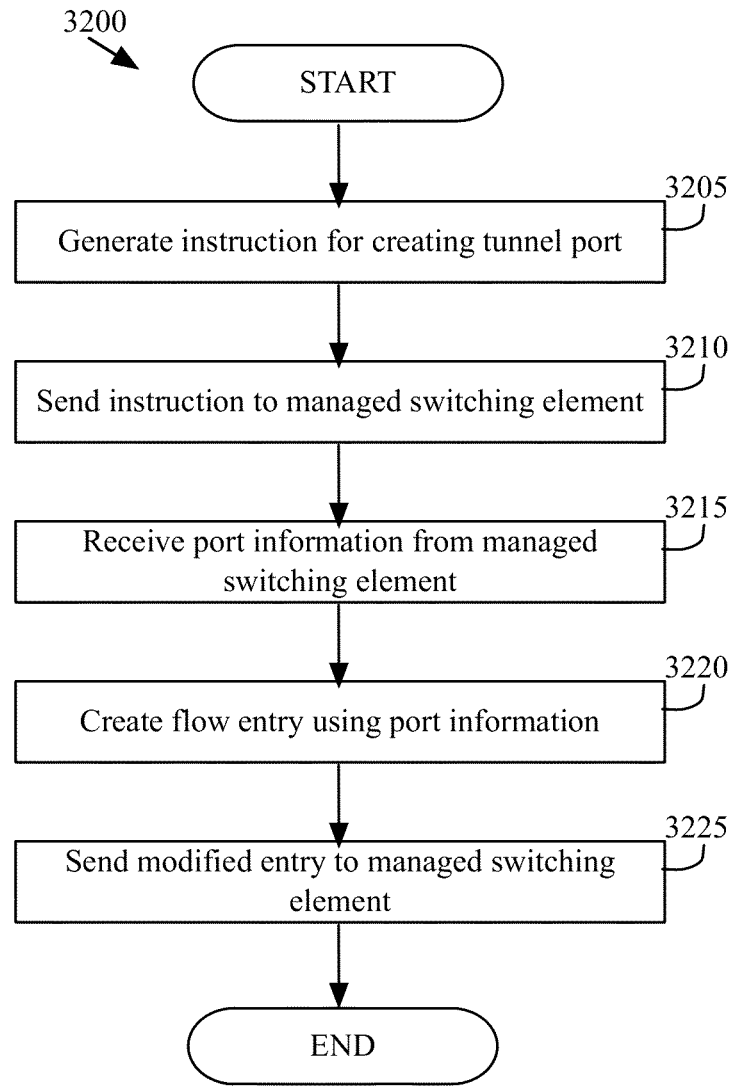
FIG. 32 conceptually illustrates a process that some embodiments perform to generate customized tunnel flow instructions and to send the customized instructions to a managed switching element.

FIG. 32 conceptually illustrates a process 3200 that some embodiments perform to generate customized tunnel flow instructions and to send the customized instructions to a managed switching element so that the managed switching element can create a tunnel and send the data to a destination through the tunnel. In some embodiments, the process 3200 is performed by a controller instance that interfaces with a managed switching element or a physical controller that directly interfaces with a managed switching element. The process 3200 in some embodiments starts when the controller that performs the process 3200 has received universal tunnel flow instructions, parsed the port information about the destination port, and determined that the managed switching element that has the destination port is in the same transport zone as the managed switching element that the controller manages.

The process 3200 begins by generating (at 3205) instructions for creating a tunnel port. In some embodiments, the process 3200 generates instructions for creating a tunnel port in the managed switching element that the controller manages based on the port information. The instructions include, for example, the type of tunnel to establish, and the IP address of the NIC which will be the destination end of the tunnel. The tunnel port of the managed switching element managed by the controller will be the other end of the tunnel.

Next, the process 3200 sends (at 3210) the generated instructions for creating the tunnel port to the managed switching element that the controller manages. As mentioned above, a physical controller of some embodiments that directly interfaces with a managed switching element uses two channels to communicate with the managed switching element. One channel is a configuration channel to exchange configuration information with the managed switching element and the other channel is a switch control channel (e.g., a channel established using OpenFlow protocol) for exchanging flow entries and event data with the managed switching element. In some embodiments, the process uses the configuration channel to send the generated instructions for creating the tunnel port to the managed switching element that the controller manages. Upon receiving the generated instructions, the managed switching element of some embodiments creates the tunnel port in the managed switching element and establishes a tunnel between the tunnel port and a port of the managed switching element that has the destination port using a tunnel protocol specified by the tunnel type. When the tunnel port and the tunnel are created and established, the managed switching element of some embodiments sends the value (e.g., four) of the identifier of the tunnel back to the controller instance.

The process 3200 of some embodiments then receives (at 3215) the value of the identifier of the tunnel port (e.g., "tunnel_port=4") through the configuration channel. The process 3200 then modifies a flow entry that is included in the universal tunnel flow instructions using this received value. This flow entry, when sent to the managed switching element, causes the managed switching element to perform an action. However, being universal data, this flow entry identifies the tunnel port by a universal identifier (e.g., tunnel_port) and not by an actual port number. For instance, this flow entry in the received universal tunnel flow instructions may be "If destination=destination machine's UUID, send to tunnel_port." The process 3200 creates (at 3220) a flow entry with the value of the identifier of the tunnel port. Specifically, the process 3200 replaces the identifier for the tunnel port with the actual value of the identifier that identifies the created port. For instance, the modified flow entry would look like "If destination=destination machine's UUID, send to 4."

The process 3200 then sends (at 3225) this flow entry to the managed switching element. In some embodiments, the process sends this flow entry to the managed switching element over the switch control channel (e.g., OpenFlow channel). The managed switching element will update its flow entries table using this flow entry. The managed switching element from then on forwards the data headed to a destination machine through the tunnel by sending the data to the tunnel port. The process then ends.

Figure 33A:
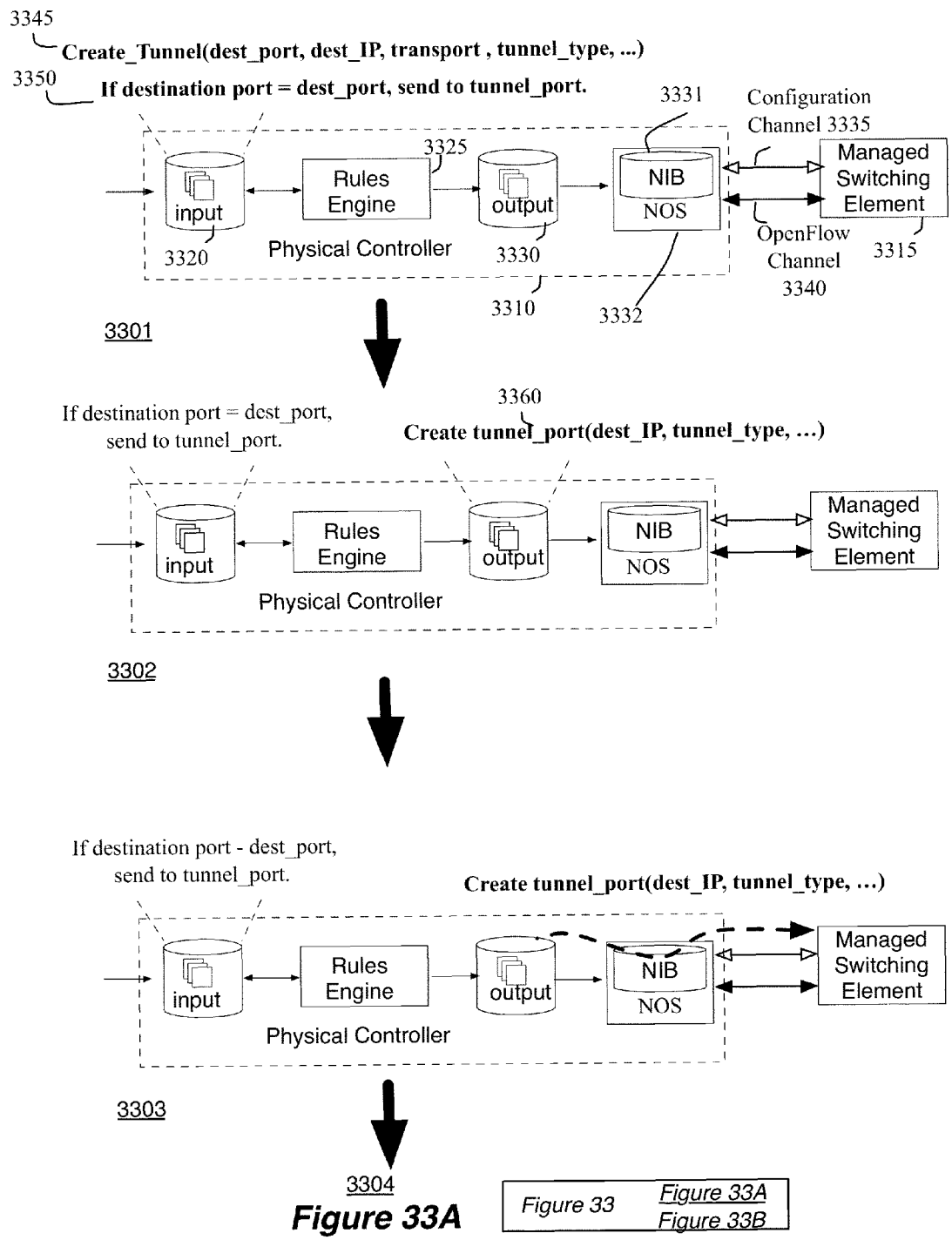
FIGS. 33A-33B conceptually illustrate in seven different stages an example operation of a physical controller that translates universal tunnel flow instructions into customized instructions.
Figure 33B:
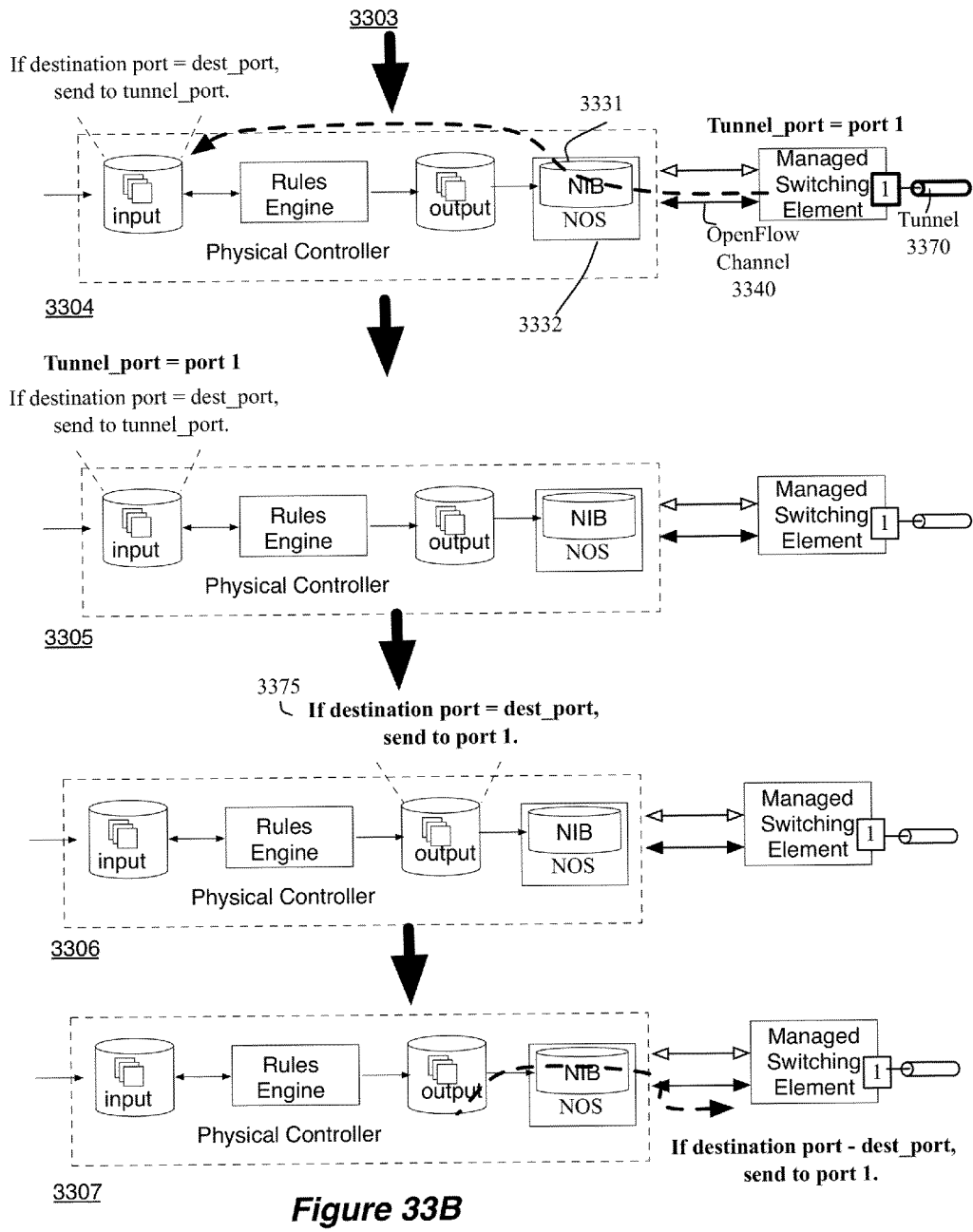

FIGS. 33A-33B conceptually illustrate in seven different stages 3301-3307 an example operation of a physical controller 3310 that translates universal tunnel flow instructions into customized instructions for a managed switching element 3315 to receive and use. The physical controller 3310 is similar to a controller instance that has the integrated application 2600 described above by reference to FIG. 26. However, for simplicity of illustration, not all components of the physical controller 3310 are shown in FIGS. 33A-33B.

As shown, the physical controller 3310 includes input tables 3320, a rules engine 3325, output tables 3330, and a NIB 3331, which are similar to the input tables 2615, the rules engine 2610, the output tables 2645, and the NIB 2635. The physical controller 3310 manages the managed switching element 3315. Two channels 3335 and 3340 are established between the NOS 3332 of the physical controller and the managed switching element 3315 in some embodiment. The channel 3335 is for exchanging configuration data (e.g., data about creating ports, current status of the ports, queues associated with the managed switching element, etc.). The channel 3340 is an OpenFlow channel (OpenFlow control channel) over which to exchange flow entries in some embodiments.

The first stage 3301 shows that the physical controller 3310 has updated the input tables 3320 using universal tunnel flow instructions received from a physical controller (not shown). As shown, the universal tunnel flow instructions include an instruction 3345 for creating a tunnel and a flow entry 3350. As shown, the instruction 3345 includes the type of the tunnel to be created and the IP addresses of the managed switching element that has the destination port. The flow entry 3350 specifies the action to take in terms of universal data that is not specific to the managed switching element 3315. The rules engine performs table mapping operations onto the instruction 3345 and the flow entry 3350.

The second stage 3302 shows the result of the table mapping operations performed by the rules engine 3325. An instruction 3360 results from the instruction 3345. In some embodiments, the instructions 3345 and 3360 may be identical while they may not be in other embodiments. For instance, the values in the instructions 3345 and 3360 that represent the tunnel type may be differ. The instruction 3360 includes the IP address and the type of the tunnel to be created, among other information that may be included in the instruction 3360. The flow entry 3350 did not trigger any table mapping operation and thus remains in the input tables 3320.

The third stage 3303 shows that the instruction 3360 has been pushed to the managed switching element 3315 over the configuration channel 3335. The managed switching element 3315 creates a tunnel port and establishes a tunnel between the managed switching element 3315 and another managed switching element that has the destination port. One end of the tunnel is the tunnel port created and the other end of the tunnel is the port that is associated with the destination IP address in some embodiments. The managed switching element 3315 of some embodiments uses the protocol specified by the tunnel type to establish the tunnel.

The fourth stage 3304 shows that the managed switching element 3315 has created a tunnel port ("port 1" in this example) and a tunnel 3370. This stage also shows that the managed switching element sends back the actual value of the tunnel port identifier. The managed switching element 3315 sends this information over the OpenFlow channel 3340 in this example. The information goes into the input tables 3320 as input event data, via the NIB 3331 of the NOS 3332 and a NIB monitor (not shown). The fifth stage 3305 shows that the input tables 3320 are updated with the information from the managed switching element 3315. This update triggers the rules engine 3325 to perform table mapping operations.

The sixth stage 3306 shows the result of the table mapping operations performed at the previous stage 3304. The output tables 3330 now has a flow entry 3375 that specifies the action to take in terms of information that is specific to the managed switching element 3315. Specifically, the flow entry 3375 specifies that when a packet's destination is the destination port, the managed switching element 3315 should sent out the packet through port 1. The seventh stage 3307 shows that the flow entry 3375 has been pushed by the NOS 3332 to the managed switching element 3315, which will forward packets using the flow entry 3375.

It is to be noted that the instruction 3345 and the data exchanged between the physical controller 3310 and the managed switching element 3315 as shown in FIG. 33A are conceptual representation of the universal tunnel flow instructions and the customized instructions and may not be in actual expressions and formats.

FIGS. 30A-33B illustrate a creation of a tunnel between two managed edge switching elements to facilitate data exchanges between a pair of machines (e.g., VMs) that are using two logical ports of a logical switch that are implemented in the two managed switching elements. This tunnel covers one of the possible uses of a tunnel. Many other uses of a tunnel are possible in a network control system in some embodiments of the invention. Example uses of a tunnel include: (1) a tunnel between a managed edge switching element and a pool node, (2) a tunnel between two managed switching elements with one being an edge switching element and the other providing a layer 3 (L3) gateway service (i.e., a managed switching element that is connected to a router to get routing service at the network layer (L3)), and (3) a tunnel between two managed switching elements in which a logical port and another logical port that is attached to L2 gateway service.

A sequence of events for creating a tunnel in each of the three examples will now be described. For a tunnel between a managed switching element and a pool node, the pool node is first provisioned and then the managed switching element is provisioned. A VM gets connected to a port of the managed switching element. This VM is the first VM that is connected to the managed switching element. This VM is then bound to a logical port of a logical switch by mapping the logical port to the port of the managed switching element. Once the mapping of the logical port to the port of the managed switching element is done, a logical controller sends universal tunnel flow instructions to the physical controller that is a master of the managed switching element.

The physical controller then instructs the managed switching element to create a tunnel to the pool node. Once the tunnel is created, another VM that is subsequently provisioned and connected to the managed switching element will share the same tunnel to exchange data with the pool node if this new VM is bound to a logical port of the same logical switch. If the new node is bound to a logical port of a different logical switch, the logical controller will send the same universal tunnel flow instructions that were passed down when the first VM was connected to the managed switching element. However, the universal tunnel flow instructions will not cause to create a new tunnel to the pool node because, for example, a tunnel has already been created and operational.

If the established tunnel is a unidirectional tunnel, another unidirectional tunnel is established from the pool node side. When the logical port to which the first VM is bounded is mapped to the port of the managed switching element, the logical controller also sends universal tunnel flow instructions to the pool node. Based on the universal tunnel flow instructions, a physical controller that interfaces the pool node will instruct the pool node to create a tunnel to the managed switching element.

For a tunnel between a managed edge switching element and a managed switching element providing L3 gateway service, it is assumed that a logical switch with several VMs of a user have been provisioned and a logical router is implemented in a transport node that provides the L3 gateway service. A logical patch port is created in the logical switch to link the logical router to the logical switch. In some embodiments, an order in which the creation of the logical patch and provisioning of VMs do not make a difference to tunnel creation. The creation of the logical patch port causes a logical controller to send universal tunnel flow instructions to the physical controllers interfacing all the managed switching elements that implement the logical switch (i.e., all the managed switching elements that each has at least one port to which a logical port of the logical switch is mapped). Each physical controller for each of these managed switching elements instructs the managed switching element to create a tunnel to the transport node. Each of the managed switching elements creates a tunnel to the transport node, resulting in as many tunnels as the number of the managed switching elements that implement the logical switch.

If these tunnels are unidirectional, the transport node is to create a tunnel to each of the managed switching elements that implement the logical switch. The logical switch pushes universal tunnel flow instructions to the transport node when the logical patch port is created and connected to the logical router. A physical controller interfacing the transport node instructs the transport node to create tunnels and the transport node creates tunnels to the managed switching elements.

In some embodiments, a tunnel established between two managed switching elements can be used for data exchange between any machine attached to one of the managed switching element and any machine attached to the other managed switching element, regardless of whether these two machines are using logical ports of the same logical switch or of two different switches. That is one example case where tunneling enables different users that are managing different LDP sets to share the managed switching elements while being isolated.

A creation of a tunnel between two managed switching elements in which a logical port and another logical port that is attached to L2 gateway service starts when a logical port gets attached to L2 gateway service. The attachment causes the logical controller to send out universal tunnel flow instructions to all the managed switching elements that implement other logical ports of the logical switch. Based on the instructions, tunnels are established from these managed switching elements to a managed switching element that implements the logical port attached to L2 gateway service.

2. Quality of Service

Figure 34:
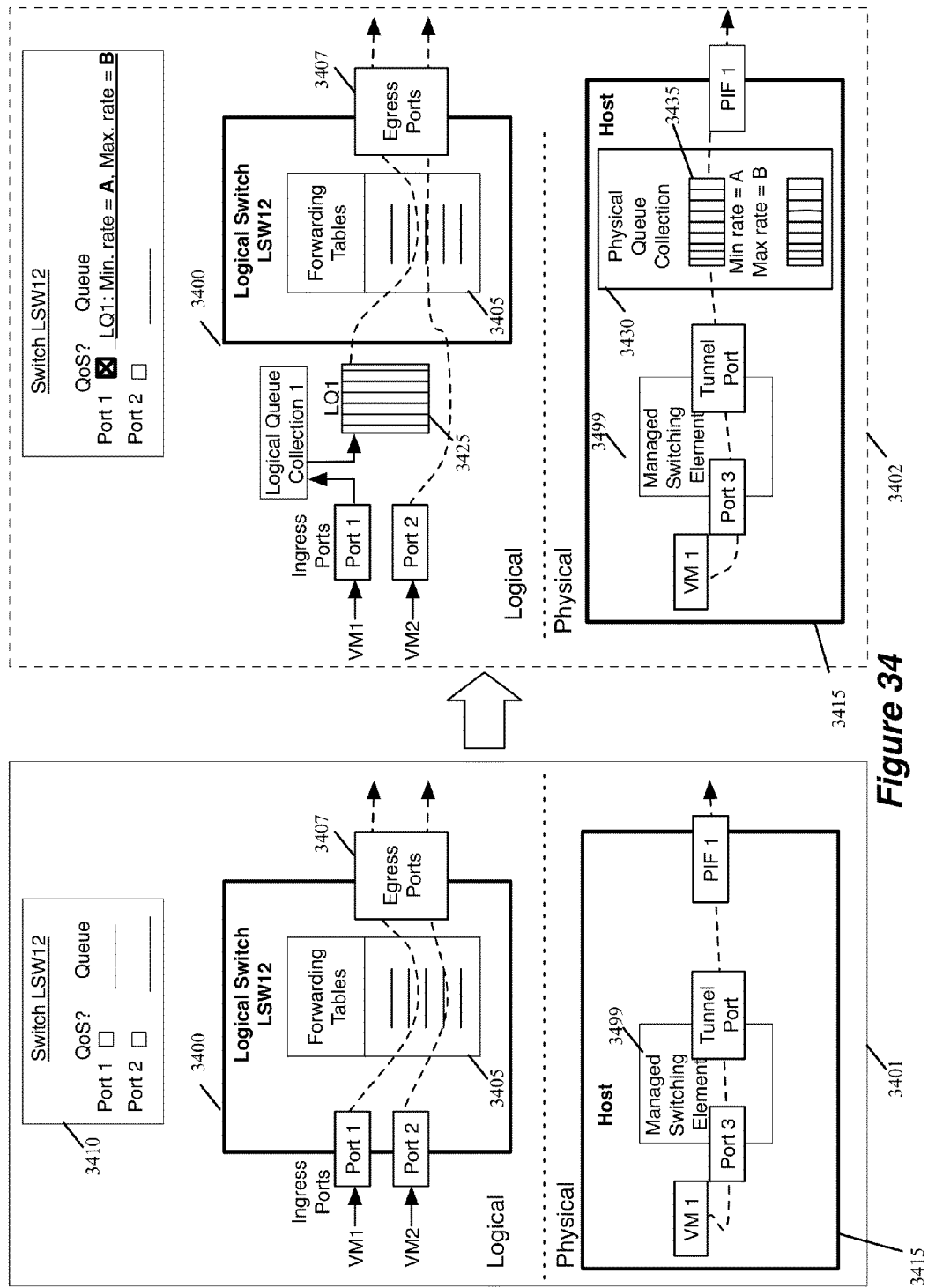
FIG. 34 illustrates an example of enabling Quality of Service (QoS) for a logical port of a logical switch.
Figure 35B:
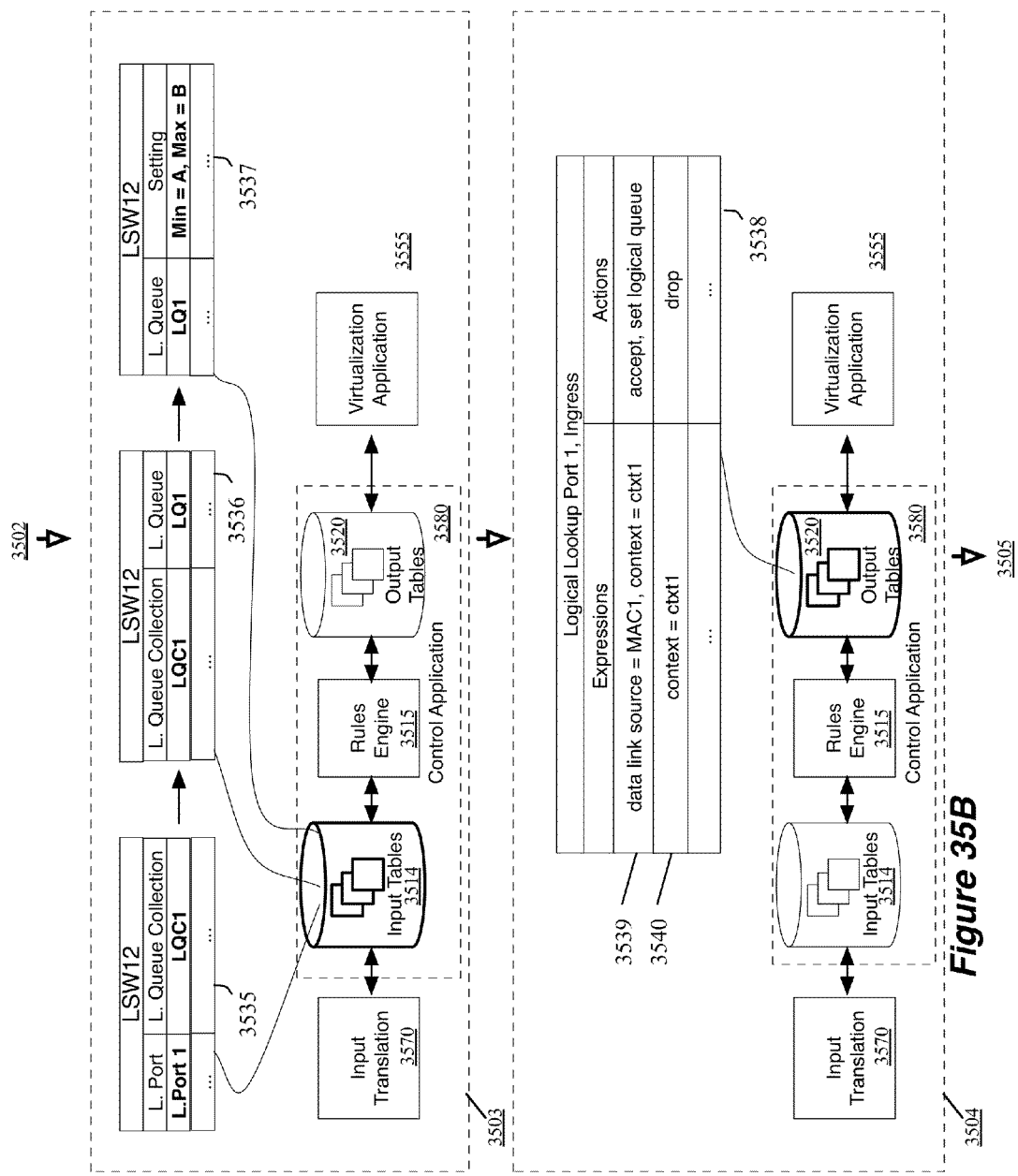
Figure 35C:
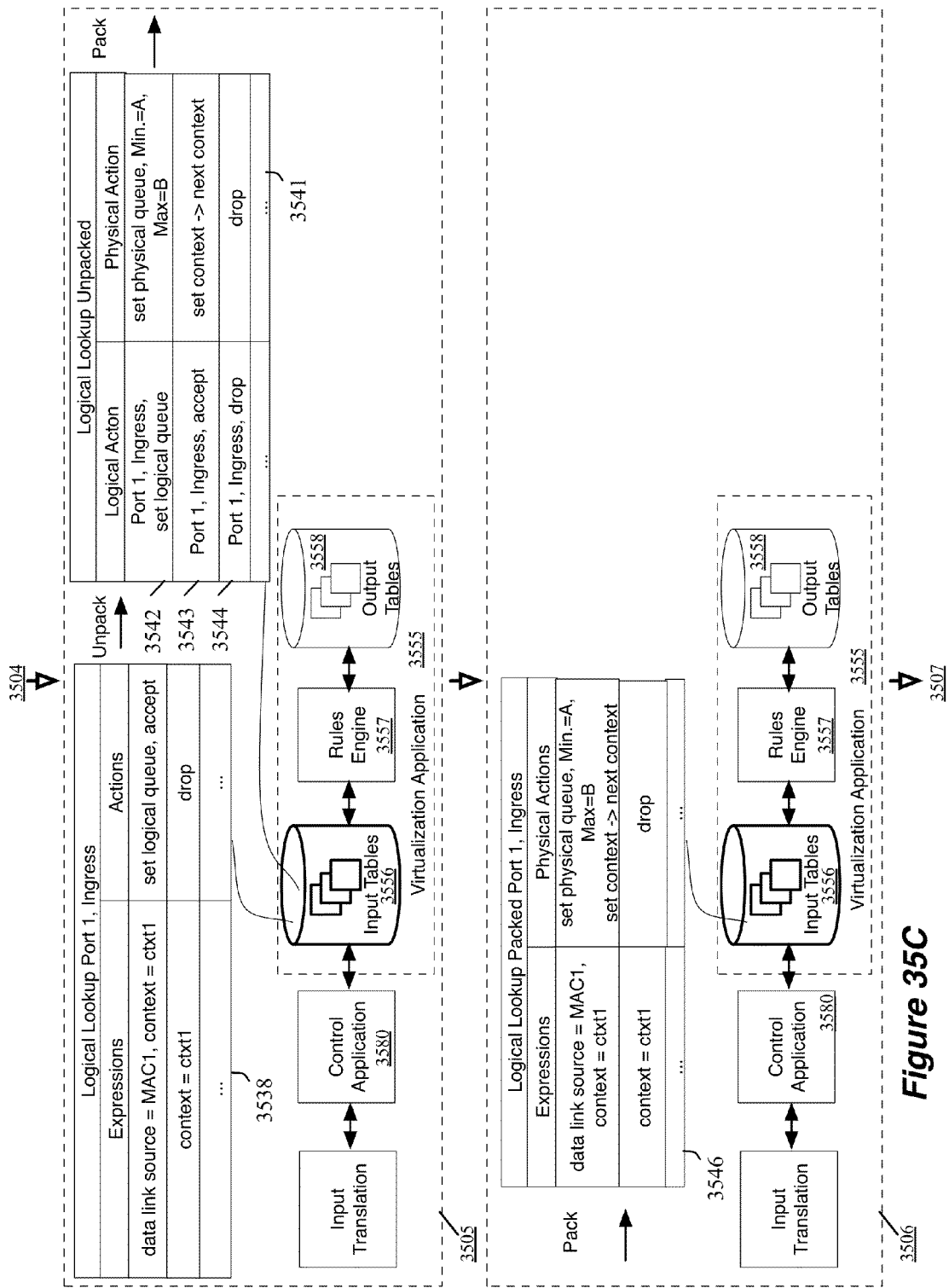
Figure 35D:
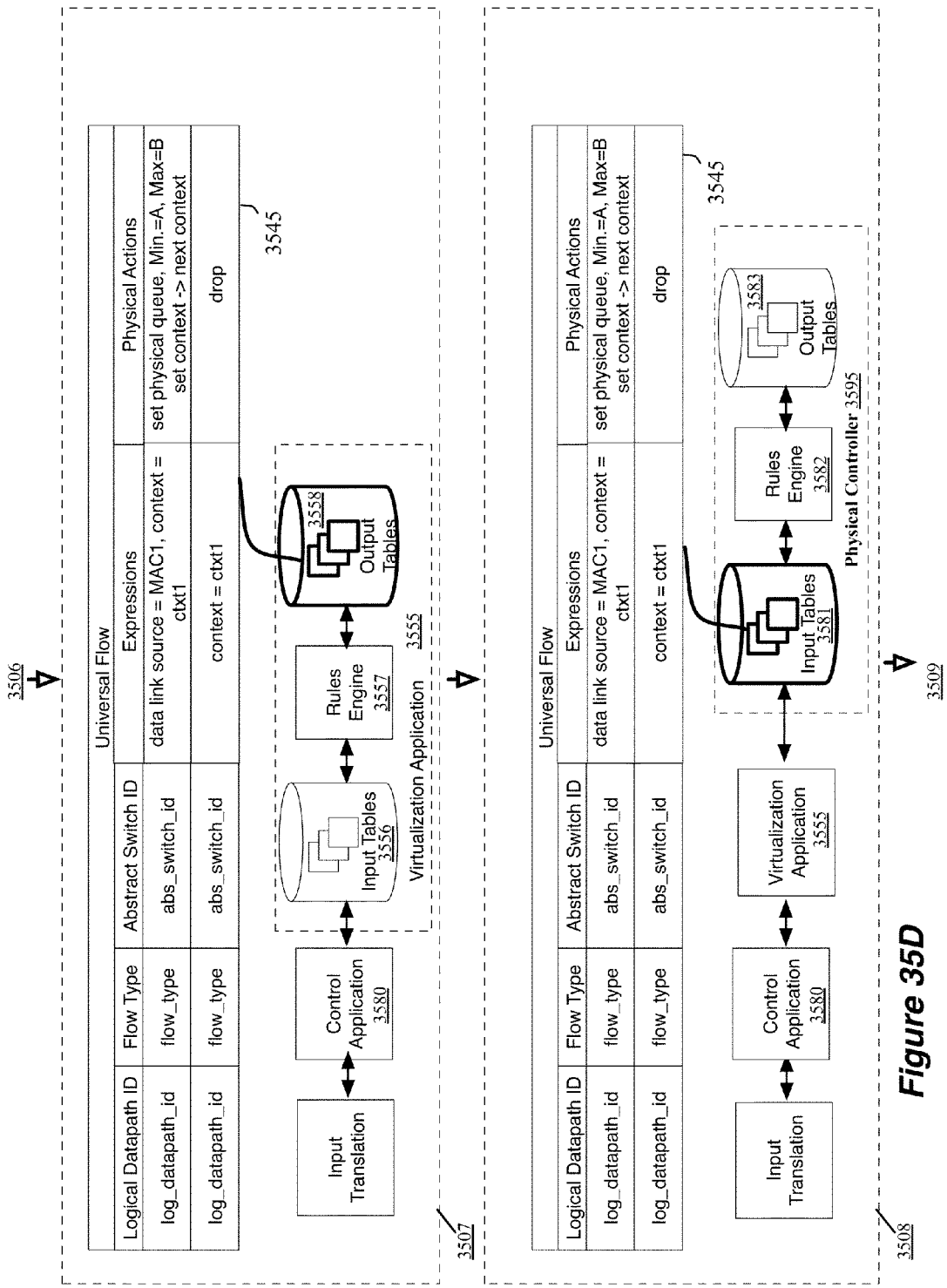
Figure 35E:
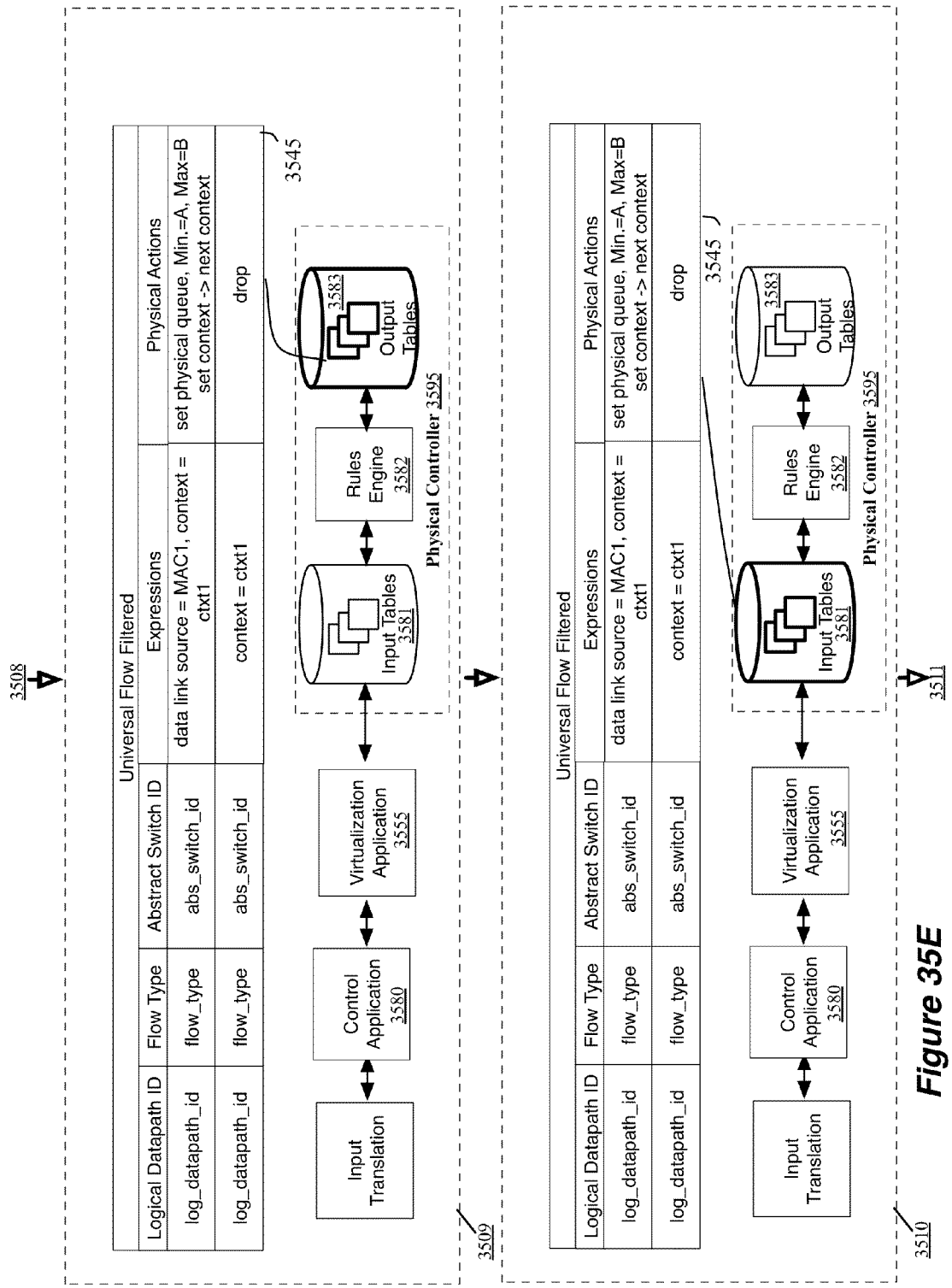
Figure 35F:
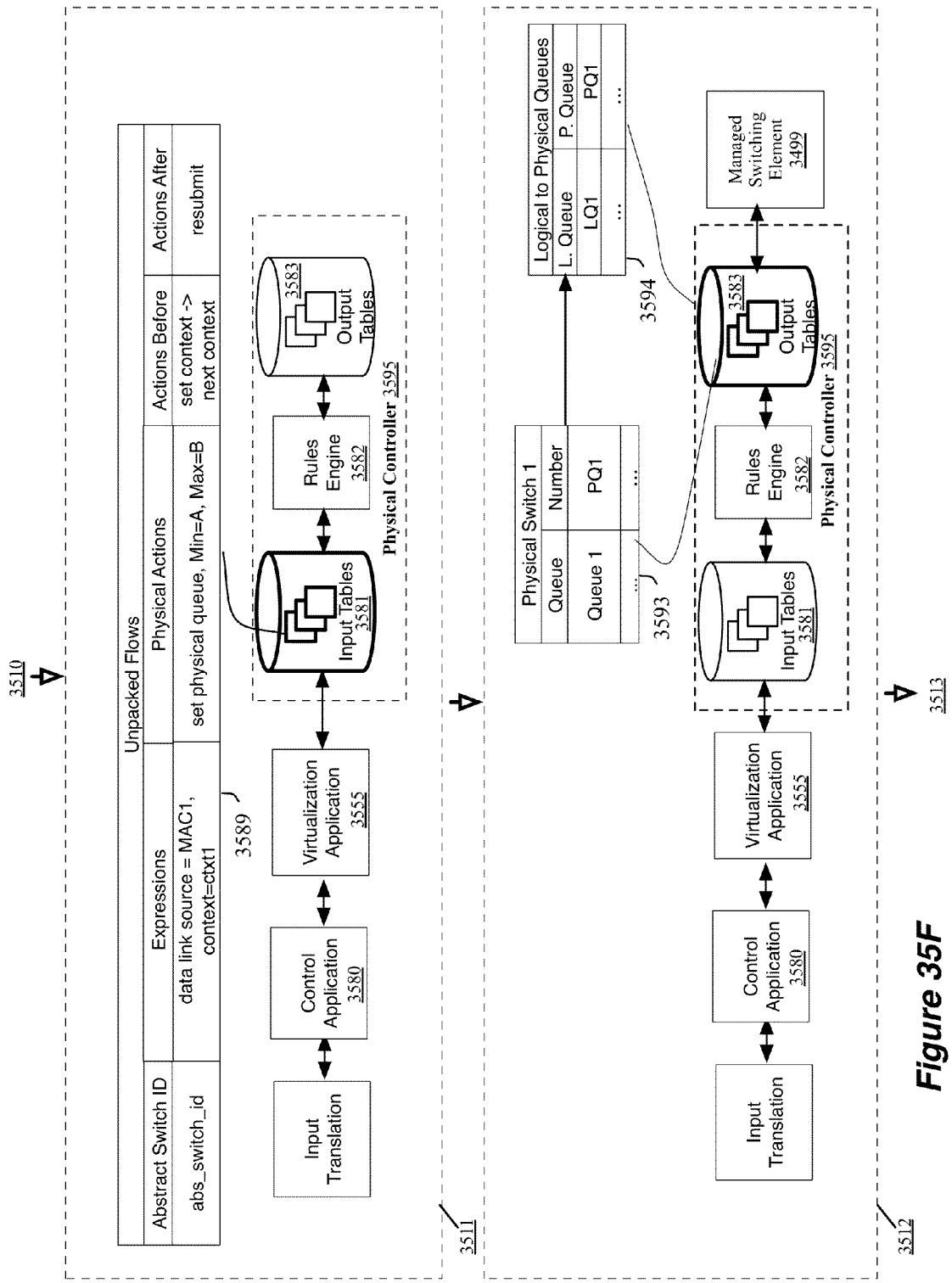
Figure 35G:
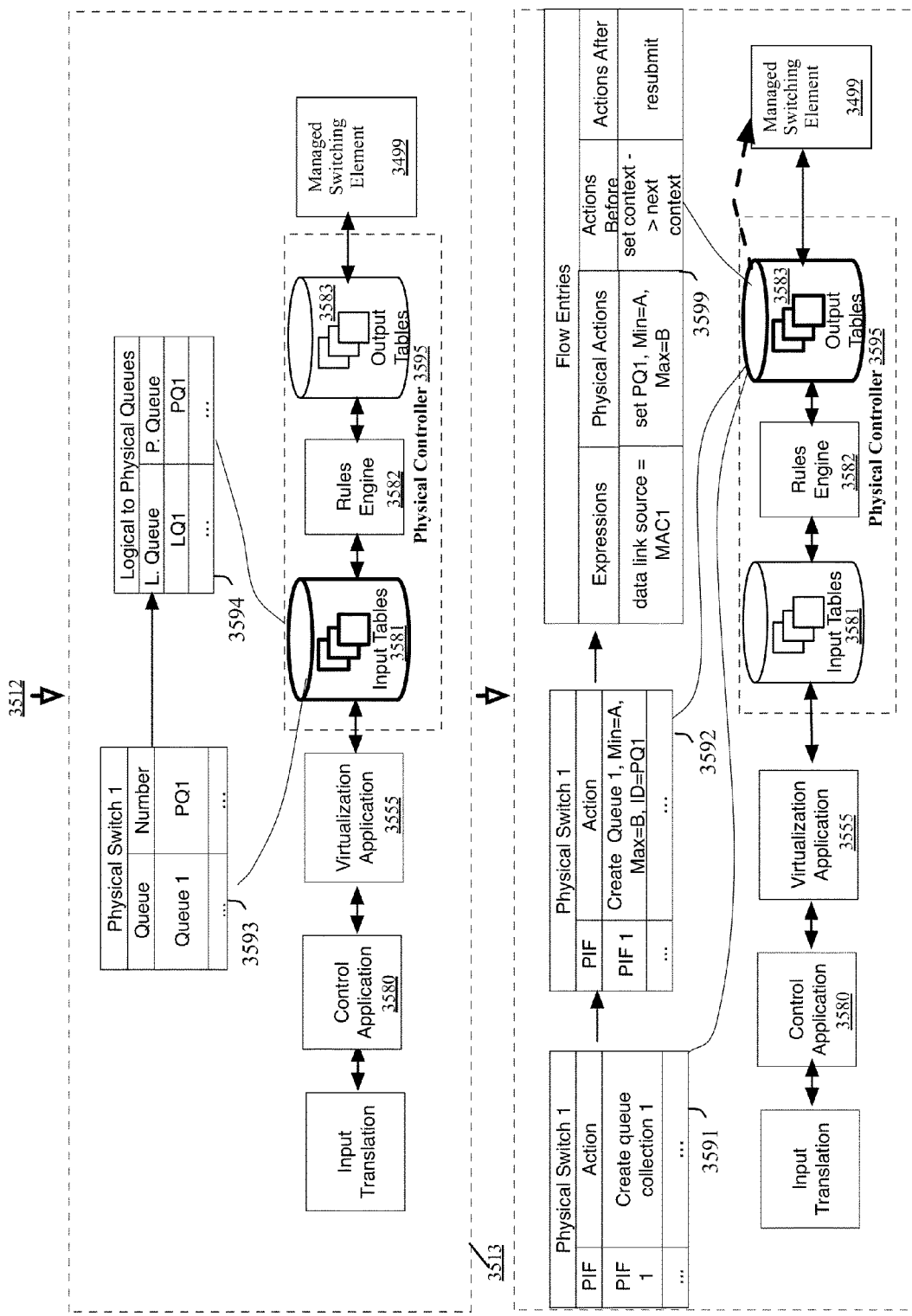

FIG. 34 illustrates an example of enabling Quality of Service (QoS) for a logical port of a logical switch. Specifically, this figure illustrates the logical switch 3400 at two different stages 3401 and 3402 to show that, after port 1 of the logical switch is enabled for QoS, the logical switch 3400 queues network data that comes into the logical switch 3400 through port 1. The logical switch 3400 queues the network data in order to provide QoS to a machine that sends the network data to switching element 3400 through port 1. QoS in some embodiments is a technique to apply to a particular port of a switching element such that the switching element can guarantee a certain level of performance to network data that a machine sends through the particular port. For instance, by enabling QoS for a particular port of a switch, the switching element guarantees a minimum bitrate and/or a maximum bitrate to network data sent by a machine to the network through the switch.

As shown, the logical switch 3400 includes logical ports 1 and 2. These logical ports of some embodiments can be both ingress ports and egress ports. The logical switch 3400 also includes forwarding tables 3405. The logical switch 3400 receives network data (e.g., packets) through the ingress ports and routes the network data based on the logical flow entries specified in the forwarding tables 3405 to the egress ports 3407, through which the logical switch 3400 sends out the network data.

This figure also illustrates a UI 3410. The UI 3410 is provided by a user interface application that allows the user to enter input values. The UI 3410 may be a web application, a command line interface (CLI), or any other form of user interface through which the user can provide inputs. This user application of some embodiments sends the inputs in the form of API calls to an input translation application. As mentioned above, an input translation application of some embodiments supports the API and sends the user input data to one or more logical controllers. The UI 3410 of some embodiments displays the current configuration of the logical switch that the user is managing.

VM 1 is a virtual machine that sends data to the logical switch 3400 through port 1. That is, port 1 of the logical switch 3400 is serving as an ingress port for VM 1. The logical switch 3400 performs logical ingress lookups using an ingress ACL table (not shown), which is one of forwarding tables 3405, in order to control the data (e.g., packets) coming through the ingress ports. For instance, the logical switch 3400 reads information stored in the header of a packet that is received through an ingress port, looks up the matching flow entry or entries in the ingress ACL table, and determines an action to perform on the received packet. As described above, a logical switch may perform further logical lookups using other forwarding tables that are storing flow entries. Also mentioned above, the operation of a logical switch is performed by a set of managed switching elements that implement the logical switch by performing a logical processing pipeline.

FIG. 34 also illustrates a host 3415 in the bottom of each stage. The host 3415 in this example is a server on which VM 1 and a managed switching element 3499 runs. The host 3415 in some embodiments includes a network interface (e.g., a network interface card (NIC) with an Ethernet port, etc.) through which one or more VMs hosted in the host 3415 send out packets. The managed switching element 3499 has port 3 and a tunnel port. These ports of the managed switching element 3499 are VIFs in some embodiments. In this example, port 1 of the logical switch 3400 is mapped to port 3 of the managed switching element 3499. The tunnel port of the managed switching element 3499 is mapped to the network interface (i.e., PIF 1) of the host 3415.

When a logical port is enabled for QoS, the logical port needs a logical queue to en-queue the packets that are going into the logical switch through the logical port. In some embodiments, the user assigns a logical queue to a logical port. A logical queue may be created based on the inputs in some embodiments. The user may also specify the minimum and maximum bitrates for the queue. When enabling a logical port for QoS, the user may then point the logical port to the logical queue. In some embodiments, multiple logical ports can share the same logical queue. By sharing the same logical queue, the machines that send data to the logical switch through these logical ports can share the minimum and maximum bitrates associated with the logical queue.

In some embodiments, the control application of a logical controller creates a logical queue collection for the logical port. The control application then has the logical queue collection point to the logical queue. The logical port and the logical queue collection have a one-to-one relationship in some embodiments. However, in some embodiments, several logical ports (and corresponding logical queue collections) can share one logical queue. That is, the traffic coming through these several logical ports together are guaranteed for some level of performance specified for the logical queue.

Once a logical port points to a logical queue (once the relationship between logical port, the logical queue collection, and the logical queue is established), a physical queue collection and physical queue are created. The steps that lead to the creation of a physical queue collection and a physical queue will be described in detail further below by reference to FIGS. 35A-35G.

In some embodiments, the logical queue collection and the logical queue are mapped to a physical queue collection and a physical queue, respectively. When the packets are coming into the logical switch through a logical port that points to a logical queue, the packets are actually queued in the physical queue to which the logical queue is mapped. That is, a logical queue is a logical concept that does not actually queue packets. Instead, a logical queue indicates that the logical port that is associated with the logical queue is enabled for QoS.

In the first stage 3401, neither of the logical ports 1 and 2 of the logical switch 3400 is enabled for QoS. The logical switch 3400 routes packets that are coming from VM1 and VM2 through ports 1 and 2 to the egress ports 3407 without guaranteeing certain performance level because logical ports 1 and 2 are not enabled for QoS. On the physical side, packets from VM1 are sent through port 3 of the managed switching element 3499.

In the second stage 3402, a user using the UI 3410 enables port 1 of the logical switch 3400 for QoS by specifying information in the box next to "port 1" in the UI 3410 in this example. The user specifies "LQ1" as the ID of the logical queue to which to point port 1. The user also specifies "A" and "B" as the minimum and maximum bitrates, respectively, of the logical queue. "A" and "B" here represent bitrates, which are numerical values that quantify the amount of data that the port allows to go through per unit of time (e.g., 1,024 bit/second, etc.).

The control application creates a logical queue according to the specified information. The control application also creates a logical queue collection that would be set between port 1 and the logical queue LQ1. The logical queue LQ1 queues the packets coming into the logical switch 3400 through port 1 in order to guarantee that the packets are routed at a bitrate between the minimum and the maximum bitrates. For instance, the logical queue LQ1 will hold some of the packets in the queue when the packets are coming into the logical queue LQ1 through port 1 at a higher bitrate than the maximum bitrate. The logical switch 3400 will send the packets to the egress ports 3407 at a bitrate that is lower than the maximum bitrate (but at a higher bitrate than the minimum bitrate). Conversely, when the packets coming through port 1 are routed at a bitrate above but close to the minimum bitrate, the logical queue LQ1 may prioritize the packets in the queue such that the logical switch 3400 routes these packets first over other packets in some embodiments.

On the physical side, the managed switching element 3415 creates a physical queue collection 3430 and a physical queue 3435 in the host 3435 and associates the physical queue collection and the physical queue with PIF 1. A physical queue collection of some embodiments may include more than one physical queue in some embodiments. The physical queue collection 3430 in this example includes physical queue 3435. The logical queue 3425 is mapped to the physical queue 3435 actual queuing takes place. That is, the packets coming through port 1 of the logical switch 3400 in this example are queued in the physical queue 3430. The physical queue 3430 in some embodiments is implemented as a storage structure for storing packets. The packets from VM 1 are queued in the physical queue before the packets are sent out through PIF 1 so that the packets that come in through port 3 are sent out at a bitrate between the minimum and maximum bitrates.

FIGS. 35A-35G conceptually illustrate an example of enabling QoS for a port of a logical switch. In particular, this figure illustrates in fourteen different stages 3501-3514 that a logical controller generates UPCP data for enabling QoS for port 1 of the logical switch 3400 in FIG. 34 and a physical controller 3595 customizes the universal data to have the managed switching element 3499 implement the logical switch 3400, with QoS enabled for port 1. For simplicity of illustration, the NIB and NOS of the controllers are not depicted in this figure.

The input translation application 3570, the control application 3580, and the virtualization application 3555 are similar to the input translation application 1400, the control application 1600, the virtualization application 1800, and the virtualization application 1800 described above, respectively. In this example, the input translation application 3570 runs in an input translation controller, and the control application 3580 and the virtualization application 3555 run in a logical controller.

The first stage 3501 shows that the control application 3580 includes, input tables 3514, rules engine 3515, and an output tables 3520, which are similar to their corresponding components of the control application 1600 in FIG. 16. Not all components of the control application 1600 are shown for the control application 3580, for simplicity of illustration. This stage also shows a UI 3521, which is similar to the UI 3410 in FIG. 34.

In the first stage 3501, the UI 3521 displays QoS information of ports 1 and 2 of the logical switch 3400. As indicated by the UI 3521, the logical ports of the logical switch 3400 are not enabled for QoS. The UI 3521 displays whether ports 1 and 2 of the logical switch 3400, which is identified by an identifier "LSW12," are enabled for QoS. The unchecked boxes in the UI 3521 indicate that ports 1 and 2 of the logical switch 3410 are not enabled for QoS. In some embodiments, the UI 3521 allows the user to specify a logical queue to which to point a logical port.

In the second stage 3502, the user provides input to indicate that user wishes to enable port 1 of the logical switch 3400 for QoS. As shown, the user has checked a box next to "port 1" in the UI 3521 and entered "LQ1" as the logical queue ID to which to point port 1. The user has also entered a command to create the logical queue with "A" and "B" as the minimum and maximum bitrates, respectively. The input translation application 3570 receives the user's inputs in the form of API calls. The input translation application 3570 translates the user's inputs into data that can be used by the control application 3580 and sends the translated inputs to the control application 3580 because the logical controller on which the control application 3580 runs is the master of the LDPS.

In the third stage 3503, the control application 3580 receives the inputs from the input translation application 3570. Based on the received inputs, the control application 3580 modifies three input tables 3535-3537. The input table 3535 shows whether a logical port of the logical switch 3400 has a logical queue collection for the logical port. In this example, the control application 3580 first creates a logical queue collection identifier "LQC1" for the logical queue that the user wants to create. The control application 3580 updates the entry in the input table 3535 for the logical port 1 to indicate that the logical queue collection identifier is created and associated with the logical port 1.

Upon creation of the logical queue collection identifier for the logical queue (i.e., for the logical port 1), the rules engine 3580 performs table mapping operations to modify the input table 3536. The input table 3536 shows whether a logical queue collection identifier is associated with a logical queue identifier. The control application 3580 creates a logical queue identifier "LQ1" as the user has specified. The control application 3580 updates the input table 3536 to indicate the logical queue collection identifier LQC1 is related to the logical queue identifier LQ1.

The control application 3580 also updates the input table 3537, which has a list of logical queue identifiers of the logical switch 3400 and each logical queue's minimum and the maximum bitrates. The control application 3580 creates an entry in the input table 3537 for the logical queue LQ1 having the minimum bitrate "A" and the maximum bitrate "B" that the user has specified. Based on the updates to the input tables 3535-3537, the rules engine 3515 performs table mapping operations.

The fourth stage 3504 shows the result of the table mapping operations performed by the rules engine 3515. As shown, the rules engine has modified and/or created an output table 3538. The table 3538 is a table that specifies logical actions to be performed on a packet coming into the logical switch 3400 through the logical port 1 by the logical switch 3400. The entry 3539 of the output table 3538 indicates that logical switch 3400 should accept the packet and set a logical queue for the logical port 1 (i.e., associate a logical queue with the logical port 1) if the packet has correct logical context and has a source mac address that matches to the logical port 1's default MAC address. The entry 3540 of the output table 3538 indicates that the logical switch 3400 should drop the packet if it does not match the conditions specified in the entry 3539.

The fifth stage 3505 shows that the control application has sent the output table 3538 to the input tables 3556 of the virtualization application 3555 directly or via the NIB (not shown) of the control application. Based on a function table (not shown), the rules engine 3557 performs table mapping operations to unpack the table 3538. In some embodiments, unpacking a table means specifying a physical action (i.e., an action that a managed switching element, which has a port to which the logical port is mapped, is to perform) for each logical action specified in the table. The table 3541 shows the unpacked logical actions of the table 3538. The entry 3542 specifies that the matching physical action for setting a logical queue is setting a physical queue with the minimum and maximum bitrates "A" and "B." The entry 3543 specifies that setting context to the next context (i.e., moving to the next operation of the logical processing pipeline) is the matching physical action of the logical accept action. The entry 3544 specifies that the managed switching element should drop the packet when the logical switch's action is dropping the packet.

Once unpacking is done, the rules engine 3555 performs table mapping actions to pack the unpacked table. In some embodiments, packing an unpacked table means gathering all physical actions that match the logical actions in an entry of a table that was originally unpacked. The sixth stage 3506 shows that the table 3546 that results from packing has an expressions column that is identical to the expressions column of the table 3538 that was originally unpacked. Each entry of the table 3546 includes a set of physical actions that matches the set of logical actions specified for the corresponding entry in the table 3538. Thus, the table 3546 specifies all physical actions to be performed on a packet coming into the managed switching element through the port to which the logical port 1 is mapped. The rules engine performs table mapping operations to generate universal flow tables.

The seventh stage 3507 shows a table 3545 which is the result of performing the table mapping operations at the previous stage 3506. As shown, the table 3545 has three columns for LDPS identifiers, flow types, and abstract switch identifiers in addition to the table 3546. A LDPS identifier identifies a LDPS. A flow type specifies the type of UPCP data. As mentioned above, one of the types of UPCP data is universal tunnel flow instructions. An abstract switch identifier identifies a channel between two controller instances. The abstract switch identifiers are used to send the data only to those controller instances that are to get the data.

The eighth stage 3508 shows a physical controller 3595, which is another control instance and a master of the managed switching element 3499 in this example. The virtualization application 3555, along with the control application 3580, is running in a logical controller as mentioned above. The table 3545 is fed into the rules engine 3582 as an input table. The rules engine 3582 performs table mapping operations to determine whether the entries of the table 3545 are implemented by one of the managed switching elements of which the physical controller 3595 is a master. In this example, the rules engine 3582 does not filter out the table 3545 and thus puts into the output tables 3583 as shown in the ninth stage 3509. Next at the tenth stage 3510, the table 3545 is fed back into the rules engine 3582 of the physical controller 3595. The rules engine 3582 performs table mapping operations to parse the entries in the universal flow table 3545.

The eleventh stage 3511 shows a table 3589, which includes entries for specifying a set of actions to be performed by the managed switching element that has a port to which the logical port 1 is mapped. Specifically, physical actions, "actions before," and "actions after" represent the operations in a logical processing pipeline that the managed switching element is to perform. Also, some of these actions are expressed in terms of identifiers that are not specific to the managed switching element that the physical controller 3595 is managing. In other words, the entries in the table 3589 have not been customized by the physical controller. The rules engine 3582 performs table mapping operations to generate physical queue collection identifier and physical queue identifier. The output table 3593 shows a physical queue identifier, PQ1. The output table 3594 shows that the physical queue identifier is mapped to the logical queue identifier.

The next stage 3513 shows that the tables 3593 and 3594 are fed back to the rules engine 3582. The rules engine 3582 performs more table mapping operations to generate several requests to pass down to the managed switching element 3499 that the physical controller 3595 is managing. The generated requests are shown in the next stage 3514. These requests are in separate tables 3591 and 3592. The table 3591 includes a request to create a queue collection for the PIF 1 of the host 3415 (not shown). The table 3592 includes a request to create a queue with the minimum and maximum bitrates of "A" and "B" and identifier PQ1. The physical controller 3595 sends the requests to the managed switching element 3499. In some embodiments, these requests are sent over a configuration channel established between the NOS (not shown) of the physical controller 3595 and the managed switching element 3499.

The fourteenth stage 3514 also shows a table 3599 which is the result of the table mapping operations performed at the previous stage 3513. The table 3599 includes flow entries that are expressed in terms of the information that is specific to the managed switching element 3499 that the physical controller 3595 is managing. The physical controller 3595 sends these flow entries to the managed switching element 3499 over a switch control channel (e.g., OpenFlow channel). The managed switching element 3499 would then forward the packets coming to the managed switching element 3499 based on the flow entries received from the physical controller 3595.

IV. Electronic System

Figure 36:
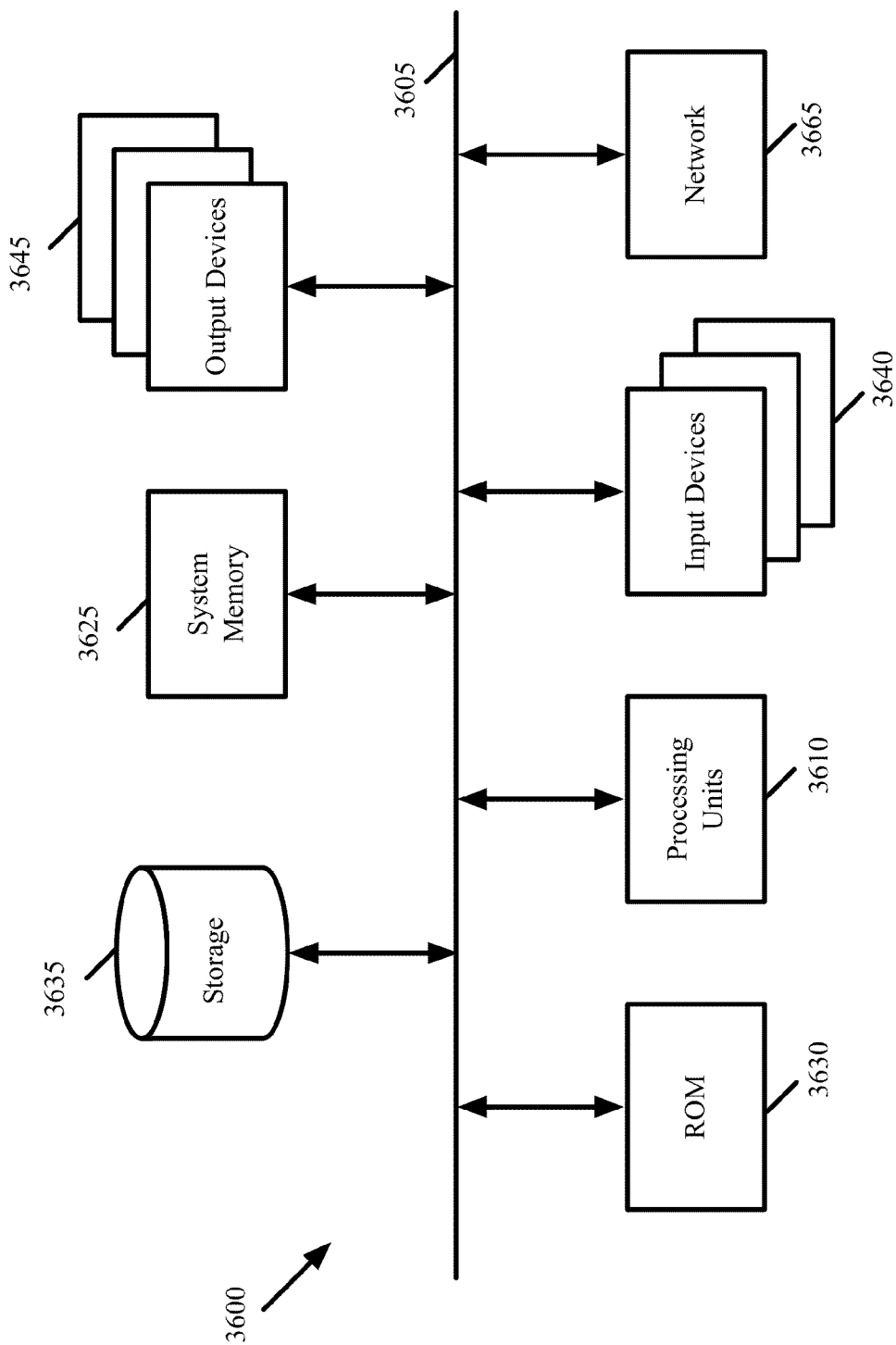
FIG. 36 conceptually illustrates an electronic system with which some embodiments of the invention are implemented.

FIG. 36 conceptually illustrates an electronic system 3600 with which some embodiments of the invention are implemented. The electronic system 3600 can be used to execute any of the control, virtualization, or operating system applications described above. The electronic system 3600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3600 includes a bus 3605, processing unit(s) 3610, a system memory 3625, a read-only memory 3630, a permanent storage device 3635, input devices 3640, and output devices 3645.

The bus 3605 collectively represents all system, peripheral, and chipset buses that communicatively connect the numerous internal devices of the electronic system 3600. For instance, the bus 3605 communicatively connects the processing unit(s) 3610 with the read-only memory 3630, the system memory 3625, and the permanent storage device 3635.

From these various memory units, the processing unit(s) 3610 retrieve instructions to execute and data to process in order to execute the processes of the invention. The processing unit(s) may be a single processor or a multi-core processor in different embodiments.

The read-only-memory (ROM) 3630 stores static data and instructions that are needed by the processing unit(s) 3610 and other modules of the electronic system. The permanent storage device 3635, on the other hand, is a read-and-write memory device. This device is a non-volatile memory unit that stores instructions and data even when the electronic system 3600 is off. Some embodiments of the invention use a mass-storage device (such as a magnetic or optical disk and its corresponding disk drive) as the permanent storage device 3635.

Other embodiments use a removable storage device (such as a floppy disk, flash drive, etc.) as the permanent storage device. Like the permanent storage device 3635, the system memory 3625 is a read-and-write memory device. However, unlike storage device 3635, the system memory is a volatile read-and-write memory, such a random access memory. The system memory stores some of the instructions and data that the processor needs at runtime. In some embodiments, the invention's processes are stored in the system memory 3625, the permanent storage device 3635, and/or the read-only memory 3630. From these various memory units, the processing unit(s) 3610 retrieve instructions to execute and data to process in order to execute the processes of some embodiments.

The bus 3605 also connects to the input and output devices 3640 and 3645. The input devices enable the user to communicate information and select commands to the electronic system. The input devices 3640 include alphanumeric keyboards and pointing devices (also called "cursor control devices"). The output devices 3645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 36, bus 3605 also couples electronic system 3600 to a network 3665 through a network adapter (not shown). In this manner, the computer can be a part of a network of computers (such as a local area network ("LAN"), a wide area network ("WAN"), or an Intranet, or a network of networks, such as the Internet. Any or all components of electronic system 3600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 15, 17, 21, 31, and 32) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provides LDP sets in terms of LCP data. In other embodiments, however, a user may provide LDP sets in terms of LFP data. In addition, several embodiments were described above in which a controller instance provides physical control plane data to a switching element in order to manage the switching element. In other embodiments, however, the controller instance may provide the switching element with physical forwarding plane data. In such embodiments, the NIB would store physical forwarding plane data and the virtualization application would generate such data.

Furthermore, in several examples above, a user specifies one or more logical switches. In some embodiments, the user can provide physical switching element configurations along with such logic switching element configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations.

Also, several examples described above show that a LDPS is associated with one user. One of the ordinary skill in the art will recognize that then a user may be associated with one or more sets of LDP sets in some embodiments. That is, the relationship between a LDPS and a user is not always a one-to-one relationship as a user may be associated with multiple LDP sets. Thus, one of ordinary skill in the art would understand that the invention is not to be limited by the foregoing illustrative details.

What is claimed is:

1. A network control system for generating physical control plane data for managing a set of managed forwarding elements that implement forwarding operations associated with a first logical datapath set, the system comprising:

a first controller computer comprising a first network information base (NIB) storage, the first controller computer for (i) receiving logical control plane data that define the logical datapath set, (ii) converting the logical control plane data to universal physical control plane (UPCP) data that define a first set of forwarding behaviors that is common between every managed forwarding element in the set of managed forwarding elements, and (iii) storing the UPCP data in the first NIB storage; and a second controller computer comprising a second NIB storage, the second controller computer for (i) receiving the UPCP data from the first NIB storage, (ii) converting the UPCP data to customized physical control plane (CPCP) data that define a second set of forwarding behaviors for a particular managed forwarding element in the set of managed forwarding elements, and (iii) storing the CPCP data in the second NIB storage.

2. The network control system of claim 1, wherein the particular managed forwarding element is a first managed forwarding element, the system further comprising a third controller computer comprising a third NIB storage, the third controller computer for (i) receiving the UPCP data from the first NIB storage, (ii) converting the UPCP data to CPCP data that define a third set of forwarding behaviors for a second managed forwarding element, and (iii) storing the CPCP data in the third NIB storage.

3. The network control system of claim 2, wherein the second and third controllers exchange data with one another in order to replicate data records stored in the second and third NIB storages.

4. The network control system of claim 3, wherein each of the second and third controller computers further comprises a secondary data storage, wherein the NIB storages of the second and third controller computers exchange data through the secondary data storages.

5. The network control system of claim 2,
wherein the first controller computer is a master controller computer for the logical datapath set,
wherein the second controller computer is a master controller computer for the first managed forwarding element, and
wherein the third controller computer is a master controller computer for the second managed forwarding element.

6. The network control system of claim 5 further comprising a coordination manager for identifying different controller instances computers as masters of different logical datapath sets and different managed forwarding elements.

7. The network control system of claim 2, wherein each of the second and third controller computers further comprises a secondary data storage that stores records of the second and third NIB storages, wherein each secondary storage is for maintaining a state of a global NIB storage.

8. The network control system of claim 7, wherein each of the
second and third NIB storages comprises a storage structure that is stored in a volatile memory while each secondary storage comprises a storage structure that is stored in a non-volatile memory in order to improve a resiliency of the network control system.

9. The network control system of claim 2, wherein the first managed forwarding element executes on a first host machine while the second managed forwarding element executes on a second different host machine, wherein the second controller computer is a computer separate from the first and second host machines.

10. The network control system of claim 1, the first controller computer further comprising a NIB monitor for receiving a notification of a change in a state of the set of managed forwarding elements and modifying the data records of the first NIB storage accordingly.

11. The network control system of claim 1, wherein the logical datapath set is a first logical datapath set and the set of managed forwarding elements is a first set of managed forwarding elements, the system further comprising a third controller computer comprising a third NIB storage, the third controller computer for (i) receiving logical control plane data that define a second logical datapath set, (ii) converting the logical control plane data that define the second logical datapath set to UPCP data that define a third set of forwarding behaviors that is common between every managed forwarding element in the second set of managed forwarding elements, and (iii) storing the UPCP data that define the third set of forwarding behaviors in the third NIB storage.

12. The network control system of claim 11, wherein the particular managed forwarding element is a first managed forwarding element, wherein the second controller computer is further for (i) receiving the UPCP for the second logical datapath set from the third NIB storage, and (ii) converting the UPCP data for the second logical datapath set to CPCP data for a second managed forwarding element.

13. The network control system of claim 1, wherein the first controller computer converts the received logical control plane data to the UPCP data by mapping the logical control plane data to a set of data records of the first NIB storage that relates to a state of the set of managed forwarding elements.

14. The network control system of claim 1, wherein the second controller computer converts the received UPCP data to the CPCP data by mapping the UPCP data to a set of data records of the second NIB storage that relates to the particular managed forwarding element.

15. The network control system of claim 1, wherein receiving the UPCP data from the first NIB storage by the second controller computer comprises the first NIB storage propagating the UPCP data to the second NIB storage of the second controller computer.

16. The network control system of claim 15, wherein each of the first and second controller computers further comprises a secondary data storage, wherein the first NIB storage of the first controller computer propagates the UPCP data to the second NIB storage of the second controller computer through the secondary data storages of the first and second controller computers.

17. A first controller computer for a network control system that manages a set of managed forwarding elements that implement forwarding operations associated with a logical datapath set comprising a set of logical forwarding elements, the first controller computer comprising:
an inter-controller communication interface for receiving universal physical control plane (UPCP) data from a second controller computer that generates the UPCP data from logical control plane data for the set of logical forwarding elements, wherein the received UPCP data comprises data that define a first set of forwarding behaviors that is common between every managed forwarding element in the set of managed forwarding elements;
a conversion module for converting the UPCP data to customized physical control plane (CPCP) data that define a second set of forwarding behaviors for a particular managed forwarding element in the set of managed forwarding elements, wherein the particular managed forwarding element operates on a host machine separate from the first and second controller computers;
a network information base (NIB) storage for storing the CPCP data for the particular managed forwarding element after the conversion; and
a communication interface for (i) retrieving the CPCP data for the particular managed forwarding element from the NIB storage, and (ii) transmitting the CPCP data to the particular managed forwarding element in the host machine.

18. The first controller computer of claim 17, wherein the particular managed forwarding element is a first managed forwarding element, and the host machine is a first host machine,
- wherein the conversion module is further for converting the UPCP data to CPCP data that define a third set of forwarding behaviors for a second managed forwarding element that operates on a second different host machine;
- wherein the NIB storage is further for storing the CPCP data for the second managed forwarding element; and
- wherein the communication interface is further for (i) retrieving the CPCP data for the second managed forwarding element from the NIB storage, and (ii) transmitting the CPCP data to the second managed forwarding element in the second host machine.

19. The first controller computer of claim 18, wherein the second controller computer is a master controller of the set of logical forwarding elements and the first controller computer is a master controller of the first and second managed forwarding elements.

20. The first controller computer of claim 19 further comprising a coordination manager that interacts with coordination managers of other controller computers to identify different controller computers as masters of different managed forwarding elements.

21. The first controller computer of claim 17, wherein the second controller computer receives the logical control plane data for the set of logical forwarding elements from a user through a set of Application Programming Interface (API) calls.

22. The first controller computer of claim 17, wherein the logical datapath set is a first logical datapath set and the set of logical forwarding elements is a first set of logical forwarding elements, wherein the inter-controller communication interface is further for receiving UPCP data from a third controller computer that generates the UPCP data from logical control plane data for a second logical datapath set comprising a second set of logical forwarding elements.

23. The first controller computer of claim 22, wherein the particular managed forwarding element is a first managed forwarding element, wherein the host machine is a first host machine,
- wherein the conversion module is further for converting the UPCP data received from the third controller computer to CPCP data that define a third set of forwarding behaviors for a second managed forwarding element that operates on a second different host machine,
- wherein the NIB storage is further for storing the CPCP data for the second managed forwarding element.

24. The first controller computer of claim 17 further comprising:
- a NIB monitor for receiving a notification of a change in a state of the particular managed forwarding element and modifying the data records of the NIB storage accordingly.

25. The first controller computer of claim 17 further comprising:
- a secondary storage for maintaining a global NIB storage comprising data that are stored in the NIB storage of the first controller computer as well as NIB storages of other controller computers.

26. A non-transitory machine readable medium of a first controller computer of a network control system for managing a set of managed forwarding elements that implement forwarding operations associated with a logical datapath set, the non-transitory machine readable medium storing sets of instructions for:
- receiving universal physical control plane (UPCP) data from a second controller computer that generated the UPCP data from logical control plane data, wherein the received UPCP data comprise data that define a first set of forwarding behaviors that is common between every managed forwarding element in the set of managed forwarding elements;
- converting the received UPCP data to customized physical control plane (CPCP) data that define a second set of forwarding behaviors for a particular managed forwarding element in the set of managed forwarding elements;
- storing the CPCP data in a network information base (NIB) storage; and
- transmitting the CPCP data from the NIB storage to the first particular managed forwarding element.

27. The non-transitory machine readable medium of claim 26, wherein the second controller computer receives the logical control plane data from a user through a set of Application Programming in Interface (API) calls.

28. The non-transitory machine readable medium of claim 26 further storing a set of instructions for receiving a notification of a change in a state of the particular managed forwarding element and modifying the data records of the NIB storage accordingly.

29. The non-transitory machine readable medium of claim 26, wherein the logical datapath set is a first logical datapath set, the non-transitory machine readable medium further storing a set of instructions for receiving UPCP data from a third controller computer that generated the UPCP data from logical control plane data for a second logical datapath set.

* * * * *